US009756366B2

(12) United States Patent
Park et al.

(10) Patent No.: US 9,756,366 B2
(45) Date of Patent: Sep. 5, 2017

(54) DIGITAL BROADCASTING RECEIVER AND METHOD FOR CONTROLLING THE SAME

(71) Applicant: LG ELECTRONICS INC., Seoul (KR)

(72) Inventors: Sang Kil Park, Seoul (KR); In Hwan Choi, Gwacheon-si (KR); Jae Hyung Song, Seoul (KR); Chul Soo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/190,033

(22) Filed: Jun. 22, 2016

(65) Prior Publication Data

US 2016/0301955 A1 Oct. 13, 2016

Related U.S. Application Data

(63) Continuation of application No. 14/529,037, filed on Oct. 30, 2014, now Pat. No. 9,402,091, which is a
(Continued)

(30) Foreign Application Priority Data

Sep. 19, 2008 (KR) ........................ 10-2008-0092445

(51) Int. Cl.
*H04N 21/236* (2011.01)
*H04N 21/2347* (2011.01)
(Continued)

(52) U.S. Cl.
CPC ...... *H04N 21/23614* (2013.01); *H04H 20/30* (2013.01); *H04H 20/55* (2013.01);
(Continued)

(58) Field of Classification Search
CPC ......... H04N 21/23614; H04N 21/2347; H04N 21/235; H04N 21/23605; H04N 21/23611;
(Continued)

(56) References Cited

U.S. PATENT DOCUMENTS 6,323,909 B1 11/2001 Michener
6,816,204 B2 11/2004 Limberg
(Continued)

FOREIGN PATENT DOCUMENTS

JP 2007-096403 4/2007
WO 2005/043403 5/2005
(Continued)

OTHER PUBLICATIONS

Ratliff, "Digital Audio Broadcasting Going Firm—The Emerging Standard," IEEE Colloquium on Terrestrial DAB—Where is it Going?, pp. 1/1-1/8, Feb. 1993.
(Continued)

*Primary Examiner* — Randy Flynn
(74) *Attorney, Agent, or Firm* — Lee, Hong, Degerman, Kang & Waimey

(57) ABSTRACT

A method of processing broadcast data includes: performing RS encoding and CRC encoding on mobile service data to generate an RS frame belonging to an ensemble including a signaling information table including access information of the mobile service data and identification information for identifying a stream where keys to decrypt the mobile service data are obtained; mapping a portion of data in the RS frame to a group including known data sequences, FIC data, and TPC data, wherein the FIC data includes information for rapid mobile service acquisition, and the TPC data includes FIC version information for indicating an update of the FIC data; and transmitting a broadcast signal including
(Continued)

the group. The group further includes data blocks. First, fourth, fifth and sixth known data sequences are inserted into third, fifth, sixth and seventh data blocks, respectively. Second and third known data sequences are inserted into a fourth data block.

10 Claims, 43 Drawing Sheets

Related U.S. Application Data continuation of application No. 13/182,385, filed on Jul. 13, 2011, now Pat. No. 8,914,830, which is a continuation of application No. 12/235,578, filed on Sep. 22, 2008, now Pat. No. 8,001,572.

(60) Provisional application No. 60/974,084, filed on Sep. 21, 2007, provisional application No. 60/977,379, filed on Oct. 4, 2007, provisional application No. 60/981,520, filed on Oct. 22, 2007, provisional application No. 61/044,504, filed on Apr. 13, 2008, provisional application No. 61/076,686, filed on Jun. 29, 2008.

(51) Int. Cl.
*H04N 21/235* (2011.01)
*H04L 9/30* (2006.01)
*H04N 21/2362* (2011.01)
*H04N 21/2383* (2011.01)
*H04N 21/266* (2011.01)
*H04N 21/61* (2011.01)
*H04N 21/81* (2011.01)
*H04H 20/30* (2008.01)
*H04H 20/55* (2008.01)
*H04H 20/57* (2008.01)

(52) U.S. Cl.
CPC .......... *H04H 20/57* (2013.01); *H04N 21/235* (2013.01); *H04N 21/2347* (2013.01); *H04N 21/2362* (2013.01); *H04N 21/2383* (2013.01); *H04N 21/23605* (2013.01); *H04N 21/23611* (2013.01); *H04N 21/26603* (2013.01); *H04N 21/6131* (2013.01); *H04N 21/8126* (2013.01); *H04L 9/30* (2013.01)

(58) Field of Classification Search
CPC ........... H04N 21/2362; H04N 21/2383; H04N 21/26603; H04N 21/6131; H04N 21/8126; H04H 20/30; H04H 20/55; H04H 20/57; H04L 9/30
See application file for complete search history.

(56) References Cited

U.S. PATENT DOCUMENTS

| | | |
|---|---|---|
| 8,001,572 B2 | 8/2011 | Park et al. |
| 8,914,830 B2 | 12/2014 | Park et al. |
| 9,402,091 B2 | 7/2016 | Park et al. |
| 2003/0009765 A1 | 1/2003 | Linden et al. |
| 2005/0289586 A1 | 12/2005 | Park et al. |
| 2006/0166616 A1 | 7/2006 | Kwak et al. |
| 2006/0233359 A1 | 10/2006 | Jung et al. |
| 2007/0003217 A1 | 1/2007 | Jang |
| 2007/0121681 A1 | 5/2007 | Kang et al. |
| 2007/0206590 A1 | 9/2007 | Baek et al. |
| 2008/0008175 A1 | 1/2008 | Park et al. |
| 2009/0083783 A1 | 3/2009 | Park et al. |
| 2009/0323823 A1 | 12/2009 | Limberg |

FOREIGN PATENT DOCUMENTS

| | | |
|---|---|---|
| WO | 2007/030590 | 3/2007 |
| WO | 2007/066997 | 6/2007 |

OTHER PUBLICATIONS

Koo et al., "Channel Decoder Architecture of OFDM based DMB System," Proceedings of the International Symposium on Circuits and Systems (ISCAS), vol. 2, pp. 73-76, May 2004.
ETSI EN 300 401 V1.4.1, DAB to mobile, portable and fixed receivers, Jun. 2006.
ISO/IEC 13818-1, second edition, Information technology—Generic coding of moving pictures and associated audio information: Systems, Dec. 1, 2000.
ETSI TS 102 367 V1.1.1, Digital Audio Broadcasting (DAB); Conditional access, Jan. 2005.
Federal Information Processing Standards Publication 197, Advanced Encryption Standard (AES). Nov. 26, 2001.
ETSI ETR 289, Support for use of scrambling and Conditional Access (CA) within digital broadcasting systems, Oct. 1996.
DVB Document A092 Rev. 2, DVB-H Implementation Guidelines, May 2007.
Korean Intellectual Property Office Application Serial No. 10-2008-0092445, Notice of Allowance dated Aug. 25, 2015, 2 pages.

FIG. 15

| Syntax | # of bits |
|---|---|
| FIC_Segment () { | |
|     FIC_type | 2 |
|     Reserved | 5 |
|     error_indicator | 1 |
|     FIC_seg_number | 4 |
|     FIC_last_seg_number | 4 |
|     for (i=0;i<N;i++) { | |
|         data_byte | 8 |
|     } | |
| } | |

FIG. 16

| | Syntax | # of bits |
|---|---|---|
| A first region | if (FIC_seg_number == 0) { | |
| |     current_next_indicator | 1 |
| |     Reserved | 2 |
| |     ESG_version | 5 |
| |     transport_stream_id | 16 |
| | } | |
| A second region | while ( ensemble_id != 0xFF ) | |
| |     ensemble_id | 8 |
| |     reserved | 3 |
| |     SI_version | 5 |
| |     num_channel | 3 |
| A third region |     for (i=0;i< num_channel;i++) { | |
| |         channel_type | 5 |
| |         channel_activity | 2 |
| |         CA_indicator | 1 |
| |         Stand_alone_Service_indtcaior | |
| |         major_channel_num | 8 |
| |         minor_channel_num | 8 |
| |     } | |
| | } // end of while | |
| | } | |

FIG. 17

| Syntax | No. of Bits | Format |
|---|---|---|
| service_map_table_section() { | | |
|   table_id | 8 | TBD |
|   section_syntax_indicator | 1 | '0' |
|   private_indicator | 1 | '1' |
|   reserved | 2 | '11' |
|   section_length | 12 | uimsbf |
|   transport_stream_id | 16 | uimsbf |
|   reserved | 2 | '111' |
|   version_number | 5 | uimsbf |
|   current_next_indicator | 1 | bslbf |
|   section_number | 8 | uimsbf |
|   last_section_number | 8 | uimsbf |
|   SMT_protocol_version | 8 | uimsbf |
|   ensemble_id | 8 | uimsbf |
|   num_channels | 8 | uimsbf |
|   for (i=0; i<num_channels; i++) | | |
|   { | | |
|     major_channel_number | 8 | uimsbf |
|     minor_channel_number | 8 | uimsbf |
|     short_channel_name | 8*8 | |
|     service_id | 16 | uimsbf |
|     service_type | 6 | uimsbf |
|     virtual_channel_activity | 2 | uimsbf |
|     num_components | 5 | uimsbf |
|     IP_version_flag | 1 | bslbf |
|     source_IP_address_flag | 1 | bslbf |
|     virtual_channel_target_IP_address_flag | 1 | bslbf |
|     if (source_IP_address_flag) | | |
|       source_IP_address | 32 or 128 | uimsbf |
|     if (virtual_channel_target_IP_address_flag) | | |
|       virtual_channel_target_IP_address | 32 or 128 | uimsbf |
|     for (j=0; j<num_components; j++) | | |
|     { | | |
|       RTP_payload_type | 7 | uimsbf |
|       component_target_IP_address_flag | 1 | bslbf |
|       if (component_target_IP_address_flag) | | |
|         component_target_IP_address | 32 or 128 | uimsbf |
|       reserved | 2 | '11' |
|       port_num_count | 6 | uimsbf |
|       target_UDP_port_num | 16 | uimsbf |
|       descriptors_length | 8 | uimsbf |
|       for (k=0; k<descriptors_length; k++) | | |
|       { | | |
|         component_level_descriptor() | | |
|       } | | |
|     } | | |
|     descriptors_length | 8 | uimsbf |
|     for (m=0; m<descriptors_length; m++) | | |
|     { | | |
|       virtual_channel_level_descriptor() | | |
|     } | | |
|   } | | |
|   descriptors_length | 8 | uimsbf |
|   for (n=0; n<descriptors_length; n++) { | | |
|   { | | |
|     ensemble_level_descriptor() | | |
|   } ensemble_level_descriptor() | | |
| } | | |

FIG. 18

| Syntax | No. of Bits | Format |
|---|---|---|
| MH_audio_descriptor() { | | |
|    descriptor_tag | 8 | TBD |
|    descriptor_length | 8 | uimsbf |
|    channel_configuration | 8 | uimsbf |
|    reserved | 5 | '11111' |
|    sample_rate_code | 3 | uimsbf |
|    reserved | 2 | '11' |
|    bit_rate_code | 6 | uimsbf |
|    ISO_639_language_code | 3*8 | uimsbf |
| } | | |

FIG. 19

| Syntax | No. of Bits | Format |
|---|---|---|
| MH_RTP_payload_type_descriptor() { | | |
|    descriptor_tag | 8 | TBD |
|    descriptor_length | 8 | uimsbf |
|    reserved | 1 | '1' |
|    RTP_payload_type | 7 | uimsbf |
|    MIME_type_length | 8 | uimsbf |
|    MIME_type() | var | |
| } | | |

FIG. 20

| Syntax | No. of Bits | Format |
|---|---|---|
| MH_current_event_descriptor() { | | |
|    descriptor_tag | 8 | TBD |
|    descriptor_length | 8 | uimsbf |
|    event_id | 16 | uimsbf |
|    current_event_start_time | 4*8 | uimsbf |
|    current_event_duration | 3*8 | uimsbf |
|    Title_length | 8 | uimsbf |
|    Title_text() | var | |
| } | | |

FIG. 21

| Syntax | No. of Bits | Format |
|---|---|---|
| MH_next_event_descriptor() { | | |
|    descriptor_tag | 8 | TBD |
|    descriptor_length | 8 | uimsbf |
|    event_id | 16 | uimsbf |
|    next_event_start_time | 4*8 | uimsbf |
|    next_event_duration | 3*8 | uimsbf |
|    title_length | 8 | uimsbf |
|    title_text() | var | |
| } | | |

FIG. 22

| Syntax | No. of Bits | Format |
|---|---|---|
| MH_system_time_descriptor() { | | |
|    descriptor_tag | 8 | TBD |
|    descriptor_length | 8 | uimsbf |
|    system_time | 32 | uimsbf |
|    GPS_UTC_offset | 8 | uimsbf |
|    time_zone_offset_polarity_rate_code | 1 | bslbf |
|    time_zone_offset | 31 | uimsbf |
|    daylight_savings() | 16 | uimsbf |
|    time_zone() | 5*8 | |
| } | | |

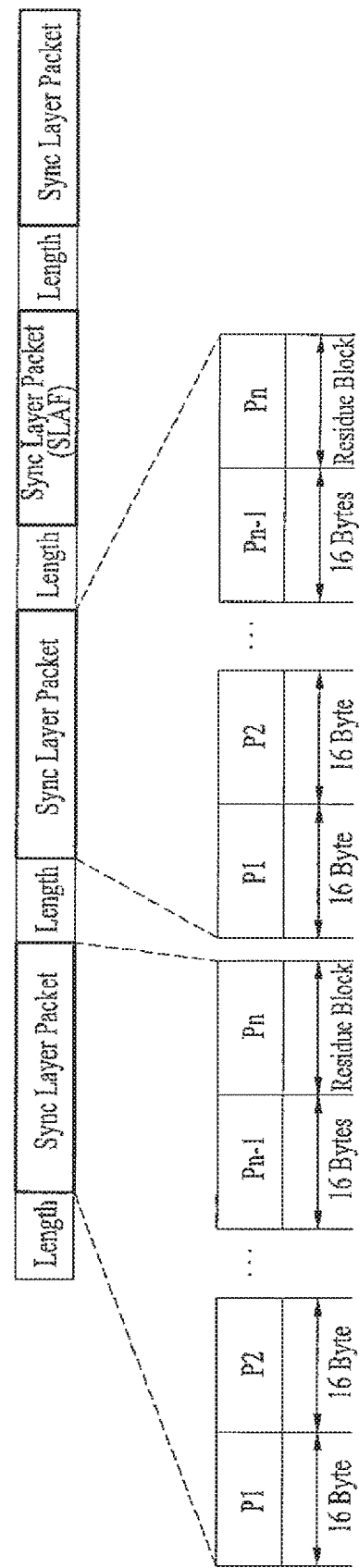

| Bits | Value |
|---|---|
| 0 - 72 | 0 |
| 73 - 75 | Type Indicator |
| 76 - 107 | System Time |
| 108 - 127 | Flow ID |

FIG. 39

| Syntax | No. of Bits | Format |
|---|---|---|
| service_map_table_section() { | | |
|   table_id | 8 | TBD |
|   section_syntax_indicator | 1 | '0' |
|   private_indicator | 1 | '1' |
|   reserved | 2 | '11' |
|   section_length | 12 | uimsbf |
|   reserved | 3 | '111' |
|   version_number | 5 | uimsbf |
|   section_number | 8 | uimsbf |
|   last_section_number | 8 | uimsbf |
|   ensemble_id | 8 | uimsbf |
|   for (i=0; i<NumChannels ; i++) | | |
|   { | | |
|     major_channel_number | 8 | uimsbf |
|     minor_channel_number | 8 | uimsbf |
|     service_id | 16 | uimsbf |
|     first_MH_TP_num | 8 | uimsbf |
|     last_MH_TP_num | 8 | uimsbf |
|     descriptors_length | 8 | uimsbf |
|     for (i=0; i<N; i++) { | | |
|       descriptor() | | |
|     } | | |
|   } | | |
|   additional_descriptors_length | 8 | uimsbf |
|   for (j=0; j<N; j++) { | | |
|     additional_descriptor() | | |
|   } | | |
| } | | |

FIG. 40

| Syntax | No. of Bits | Format |
|---|---|---|
| MH_CA_descriptor() { | | |
|     descriptor_tag | 8 | uimsbf |
|     descriptor_length | 8 | uimsbf |
|     CA_System_ID | 16 | uimsbf |
|     reserved | 12 | '111111111111' |
|     MH_CA_flow_ID | 20 | uimsbf |
|     for (i=0; i<N; i++) { | | |
|         private_data_byte | 8 | uimsbf |
|     } | | |
| } | | |

DIGITAL BROADCASTING RECEIVER AND METHOD FOR CONTROLLING THE SAME

CROSS-REFERENCE TO RELATED APPLICATIONS

This application is a continuation of U.S. patent application Ser. No. 14/529,037, filed on Oct. 30, 2014, now U.S. Pat. No. 9,402,091, which is a continuation of U.S. patent application Ser. No. 13/182,385, filed on Jul. 13, 2011, now U.S. Pat. No. 8,914,830, which is a continuation of U.S. application Ser. No. 12/235,578, filed on Sep. 22, 2008, now U.S. Pat. No. 8,001,572, which claims the benefit of earlier filing date and right of priority to Korean Patent Application No. 10-2008-0092445, filed on Sep. 19, 2008, and also claims the benefit of U.S. Provisional Application No. 60/974,084, filed on Sep. 21, 2007, 60/977,379, filed on Oct. 4, 2007, 60/981,520, filed on Oct. 22, 2007, 61/044,504, filed on Apr. 13, 2008, 61/076,686, filed on Jun. 29, 2008, the contents of all of which are hereby incorporated by reference herein in their entireties.

FIELD OF THE INVENTION

The present invention relates to a digital broadcasting receiver and a method for controlling the same, and more particularly, to a digital broadcasting system and a data processing method.

DISCUSSION OF THE RELATED ART

The Vestigial Sideband (VSB) transmission mode, which is adopted as the standard for digital broadcasting in North America and the Republic of Korea, is a system using a single carrier method. Therefore, the receiving performance of the digital broadcast receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

SUMMARY OF THE INVENTION

Accordingly, the present invention is directed to a digital broadcasting receiver and a method for controlling the same that substantially obviate one or more problems due to limitations and disadvantages of the related art.

Another object of the present invention is to provide a method for processing services having various formats in a mobile digital broadcasting environment.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for processing data in a reception system, the method includes receiving a broadcasting signal including mobile service data and main service data, the mobile service data including first service data and second service data having a format different from that of the first service data, the second service data configuring a Reed Solomon (RS) frame, and the RS frame including a table which describes the second service data and signaling information of the second service data, parsing the table from the RS frame and extracting the signaling information of the second service data, and parsing the second service data from the RS frame on the basis of the extracted signaling information.

At this time, at least one data group configuring the RS frame may include a plurality of known data sequences, a signaling information zone may be included between a first known data sequence and a second known data sequence of the known data sequences, and the signaling information zone may include transmission parameter channel (TPC) signaling and fast information channel (FIC) signaling.

And, the RS frame may be configured by an RS frame header and an RS frame payload, and the RS frame payload may include a transport packet configured by packetizing at least one piece of data, for a second service.

Also, the RS frame header may include at least one of first information for identifying the type of data in the transport packet transmitted via the payload, second information indicating whether or not an error is included in the transport packet transmitted via the payload, third information indicating whether or not stuffing bytes are included in the RS frame, and fourth information indicating a start point of new data in the transport packet transmitted via the payload.

And, the first information may identify the type of the data in the transmitted transport packet, and the type may be identified by data for a first service and data for the second service.

Also, the transport packet transmitted via the RS payload may include a flow packet including the data for the second service.

And, the flow packet may be configured by a flow packet header and a flow packet payload, and the flow packet payload may include a layer packet packetized in at least one layer for the second service and length information indicating the length of the layer packet.

And, the flow packet header may include at least one of an identifier for identifying the layer packet included in the flow packet, information indicating whether the flow packet is transmitted over at least one RS frame, information indicating whether cyclic redundancy check (CRC) is applied to the flow packet, and information indicating the number of layer packets included in the flow packet.

In another aspect of the present invention, there is provided a reception system includes a baseband processor receiving a broadcasting signal including mobile service data and main service data, the mobile service data including first service data and second service data having a format different from that of the first service data, the second service data configuring a Reed Solomon (RS) frame, and the RS frame including a table which describes the second service data and signaling information of the second service data, a table handler parsing the table from the RS frame and extracting the signaling information of the second service data, and service handlers parsing the second service data from the RS frame on the basis of the extracted signaling information of the second service data.

At this time, at least one data group configuring the RS frame may include a plurality of known data sequences, a signaling information zone may be included between a first known data sequence and a second known data sequence of the known data sequences, and the signaling information zone may include transmission parameter channel (TPC) signaling and fast information channel (FIC) signaling.

At this time, the baseband processor may further include a known data detector detecting the known data sequences included in the data group, and the detected known data sequences are used for demodulation and channel equalization of the mobile service data.

And, the table handler may extract the table including the signaling information of the second service data from the RS frame configured by an RS frame header and an RS frame payload, and the RS frame payload may include a transport packet configured by packetizing at least one piece of data, for a second service.

Also, the table handler may extract and use the RS frame header including at least one of first information for identifying the type of data in the transport packet transmitted via the payload, second information indicating whether or not an error is included in the transport packet transmitted via the payload, third information indicating whether or not stuffing bytes are included in the RS frame, and fourth information indicating a start point of new data in the transport packet transmitted via the payload, and one of the service handlers may be selected by identifying whether the type of the data in the transmitted transported packet include the first service data or the second service data from the extracted first information.

And, the selected service handler may process the transport packet transmitted via the RS frame payload, the transport packet may include a flow packet including data for the second service, and the flow packet may include a flow packet header and a flow packet payload including a layer packet packetized in at least one layer for the second service and length information indicating the length of the layer packet.

Also, the service handlers may process the flow packet header including at least one of an identifier for identifying the layer packet included in the flow packet, information indicating whether the flow packet is transmitted over at least one RS frame, information indicating whether cyclic redundancy check (CRC) is applied to the flow packet, and information indicating the number of layer packets included in the flow packet.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 15 illustrates an exemplary bit stream syntax structure with respect to an FIC segment according to an embodiment of the present invention;

FIG. 16 illustrates an exemplary bit stream syntax structure with respect to a payload of an FIC segment according to the present invention, when an FIC type field value is equal to '0';

FIG. 17 illustrates an exemplary bit stream syntax structure of a service map table according to the present invention;

FIG. 18 illustrates an exemplary bit stream syntax structure of an MH audio descriptor according to the present invention;

FIG. 19 illustrates an exemplary bit stream syntax structure of an MH RTP payload type descriptor according to the present invention;

FIG. 20 illustrates an exemplary bit stream syntax structure of an MH current event descriptor according to the present invention;

FIG. 21 illustrates an exemplary bit stream syntax structure of an MH next event descriptor according to the present invention;

FIG. 22 illustrates an exemplary bit stream syntax structure of an MH system time descriptor according to the present invention;

FIGS. 35A and 35B are views showing an encryption algorithm according to an embodiment of the present invention;

FIG. 39 is a view showing the bitstream syntax of a service map table according to another embodiment of the present invention;

FIG. 40 is a view showing the syntax of the bitstream of MH_CA_descriptor( ) according to an embodiment of the present invention;

DETAILED DESCRIPTION OF THE INVENTION

Figure 1:
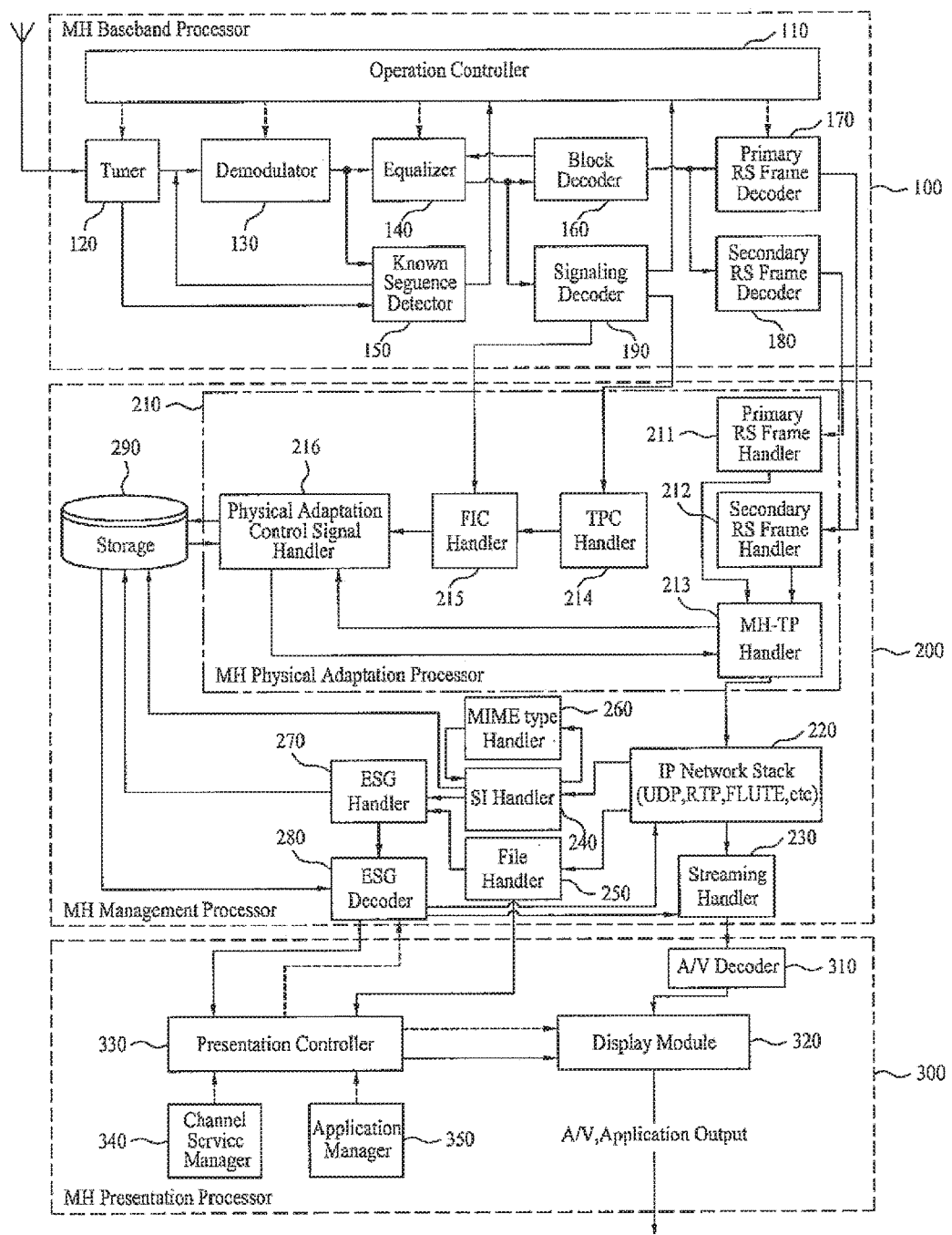
FIG. 1 illustrates a block diagram showing a general structure of a digital broadcasting receiving system according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system. Additionally, among the terms used in the present invention, "MH" corresponds to the initials of "mobile" and "handheld" and represents the opposite concept of a fixed-type system. Furthermore, the MH service data may include at least one of mobile service data and handheld service data, and will also be referred to as "mobile service data" for simplicity. Herein, the mobile service data not only correspond to MH service data but may also include any type of service data with mobile or portable characteristics. Therefore, the mobile service data according to the present invention are not limited only to the MH service data.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be transmitted as the main service data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above. In the present invention, the transmitting system provides backward compatibility in the main service data so as to be received by the conventional receiving system. Herein, the main service data and the mobile service data are multiplexed to the same physical channel and then transmitted.

Furthermore, the digital broadcast transmitting system according to the present invention performs additional encoding on the mobile service data and inserts the data already known by the receiving system and transmitting system (e.g., known data), thereby transmitting the processed data. Therefore, when using the transmitting system according to the present invention, the receiving system may receive the mobile service data during a mobile state and may also receive the mobile service data with stability despite various distortion and noise occurring within the channel.

Receiving System

FIG. 1 illustrates a block diagram showing a general structure of a digital broadcasting receiving system according to an embodiment of the present invention. The digital broadcast receiving system according to the present invention includes a baseband processor 100, a management processor 200, and a presentation processor 300. The baseband processor 100 includes an operation controller 110, a tuner 120, a demodulator 130, an equalizer 140, a known sequence detector (or known data detector) 150, a block decoder (or mobile handheld block decoder) 160, a primary Reed-Solomon (RS) frame decoder 170, a secondary RS frame decoder 180, and a signaling decoder 190. The operation controller 110 controls the operation of each block included in the baseband processor 100.

By tuning the receiving system to a specific physical channel frequency, the tuner 120 enables the receiving system to receive main service data, which correspond to broadcast signals for fixed-type broadcast receiving systems, and mobile service data, which correspond to broadcast signals for mobile broadcast receiving systems. At this point, the tuned frequency of the specific physical channel is down-converted to an intermediate frequency (IF) signal, thereby being outputted to the demodulator 130 and the known sequence detector 150. The passband digital IF signal being outputted from the tuner 120 may only include main service data, or only include mobile service data, or include both main service data and mobile service data.

The demodulator 130 performs self-gain control, carrier wave recovery, and timing recovery processes on the passband digital IF signal inputted from the tuner 120, thereby modifying the IF signal to a baseband signal. Then, the demodulator 130 outputs the baseband signal to the equalizer 140 and the known sequence detector 150. The demodulator 130 uses the known data symbol sequence inputted from the known sequence detector 150 during the timing and/or carrier wave recovery, thereby enhancing the demodulating performance. The equalizer 140 compensates channel-associated distortion included in the signal demodulated by the demodulator 130. Then, the equalizer 140 outputs the distortion-compensated signal to the block decoder 160. By using a known data symbol sequence inputted from the known sequence detector 150, the equalizer 140 may enhance the equalizing performance. Furthermore, the equalizer 140 may receive feed-back on the decoding result from the block decoder 160, thereby enhancing the equalizing performance.

The known sequence detector 150 detects known data place (or position) inserted by the transmitting system from the input/output data (i.e., data prior to being demodulated or data being processed with partial demodulation). Then, the known sequence detector 150 outputs the detected known data position information and known data sequence generated from the detected position information to the demodulator 130 and the equalizer 140. Additionally, in order to allow the block decoder 160 to identify the mobile service data that have been processed with additional encoding by the transmitting system and the main service data that have not been processed with any additional encoding, the known sequence detector 150 outputs such corresponding information to the block decoder 160.

If the data channel-equalized by the equalizer 140 and inputted to the block decoder 160 correspond to data processed with both block-encoding and trellis-encoding by the transmitting system (i.e., data within the RS frame, signaling data), the block decoder 160 may perform trellis-decoding and block-decoding as inverse processes of the transmitting system. On the other hand, if the data channel-equalized by the equalizer 140 and inputted to the block decoder 160 correspond to data processed only with trellis-encoding and not block-encoding by the transmitting system (i.e., main service data), the block decoder 160 may perform only trellis-decoding.

The signaling decoder 190 decoded signaling data that have been channel-equalized and inputted from the equalizer 140. It is assumed that the signaling data inputted to the signaling decoder 190 correspond to data processed with both block-encoding and trellis-encoding by the transmitting system. Examples of such signaling data may include transmission parameter channel (TPC) data and fast information channel (FIC) data. Each type of data will be described in more detail in a later process. The FIC data decoded by the signaling decoder 190 are outputted to the FIC handler 215. And, the TPC data decoded by the signaling decoder 190 are outputted to the TPC handler 214.

Meanwhile, according to the present invention, the transmitting system uses RS frames by encoding units. Herein, the RS frame may be divided into a primary RS frame and a secondary RS frame. However, according to the embodiment of the present invention, the primary RS frame and the secondary RS frame will be divided based upon the level of importance of the corresponding data. The primary RS frame decoder 170 receives the data outputted from the block decoder 160. At this point, according to the embodiment of the present invention, the primary RS frame decoder 170 receives only the mobile service data that have been Reed-Solomon (RS)-encoded and/or cyclic redundancy check (CRC)-encoded from the block decoder 160.

Herein, the primary RS frame decoder 170 receives only the mobile service data and not the main service data. The primary RS frame decoder 170 performs inverse processes of an RS frame encoder (not shown) included in the digital broadcast transmitting system, thereby correcting errors existing within the primary RS frame. More specifically, the primary RS frame decoder 170 forms a primary RS frame by grouping a plurality of data groups and, then, correct errors in primary RS frame units. In other words, the primary RS frame decoder 170 decodes primary RS frames, which are being transmitted for actual broadcast services.

Additionally, the secondary RS frame decoder 180 receives the data outputted from the block decoder 160. At this point, according to the embodiment of the present invention, the secondary RS frame decoder 180 receives only the mobile service data that have been RS-encoded and/or CRC-encoded from the block decoder 160. Herein, the secondary RS frame decoder 180 receives only the mobile service data and not the main service data. The secondary RS frame decoder 180 performs inverse processes of an RS frame encoder (not shown) included in the digital broadcast transmitting system, thereby correcting errors existing within the secondary RS frame. More specifically, the secondary RS frame decoder 180 forms a secondary RS frame by grouping a plurality of data groups and, then, correct errors in secondary RS frame units. In other words, the secondary RS frame decoder 180 decodes secondary RS frames, which are being transmitted for mobile audio service data, mobile video service data, guide data, and so on.

Meanwhile, the management processor 200 according to an embodiment of the present invention includes an MH physical adaptation processor 210, an IP network stack 220, a streaming handler 230, a system information (SI) handler 240, a file handler 250, a multi-purpose internet main extensions (MIME) type handler 260, and an electronic service guide (ESG) handler 270, and an ESG decoder 280, and a storage unit 290. The MH physical adaptation processor 210 includes a primary RS frame handler 211, a secondary RS frame handler 212, an MH transport packet (TP) handler 213, a TPC handler 214, an FIC handler 215, and a physical adaptation control signal handler 216. The TPC handler 214 receives and processes baseband information required by modules corresponding to the MH physical adaptation processor 210. The baseband information is inputted in the form of TPC data. Herein, the TPC handler 214 uses this information to process the FIC data, which have been sent from the baseband processor 100.

The TPC data are transmitted from the transmitting system to the receiving system via a predetermined region of a data group. The TPC data may include at least one of an MH ensemble ID, an MH sub-frame number, a total number of MH groups (TNoG), an RS frame continuity counter, a column size of RS frame (N), and an FIC version number. Herein, the MH ensemble ID indicates an identification number of each MH ensemble carried in the corresponding channel. The MH sub-frame number signifies a number identifying the MH sub-frame number in an MH frame, wherein each MH group associated with the corresponding MH ensemble is transmitted. The TNoG represents the total number of MH groups including all of the MH groups belonging to all MH parades included in an MH sub-frame. The RS frame continuity counter indicates a number that serves as a continuity counter of the RS frames carrying the corresponding MH ensemble. Herein, the value of the RS frame continuity counter shall be incremented by 1 modulo 16 for each successive RS frame. N represents the column size of an RS frame belonging to the corresponding MH ensemble. Herein, the value of N determines the size of each MH TP. Finally, the FIC version number signifies the version number of an FIC body carried on the corresponding physical channel.

As described above, diverse TPC data are inputted to the TPC handler 214 via the signaling decoder 190 shown in FIG. 1. Then, the received TPC data are processed by the TPC handler 214. The received TPC data may also be used by the FIC handler 215 in order to process the FIC data. The FIC handler 215 processes the FIC data by associating the FIC data received from the baseband processor 100 with the TPC data. The physical adaptation control signal handler 216 collects FIC data received through the FIC handler 215 and SI data received through RS frames. Then, the physical adaptation control signal handler 216 uses the collected FIC data and SI data to configure and process IP datagrams and access information of mobile broadcast services. Thereafter, the physical adaptation control signal handler 216 stores the processed IP datagrams and access information to the storage unit 290.

The primary RS frame handler 211 identifies primary RS frames received from the primary RS frame decoder 170 of the baseband processor 100 for each row unit, so as to configure an MH TP. Thereafter, the primary RS frame handler 211 outputs the configured MH TP to the MH TP handler 213. The secondary RS frame handler 212 identifies secondary RS frames received from the secondary RS frame decoder 180 of the baseband processor 100 for each row unit, so as to configure an MH TP. Thereafter, the secondary RS frame handler 212 outputs the configured MH TP to the MH TP handler 213. The MH transport packet (TP) handler 213 extracts a header from each MH TP received from the primary RS frame handler 211 and the secondary RS frame handler 212, thereby determining the data included in the corresponding MH TP. Then, when the determined data correspond to SI data (i.e., SI data that are not encapsulated to IP datagrams), the corresponding data are outputted to the physical adaptation control signal handler 216. Alternatively, when the determined data correspond to an IP datagram, the corresponding data are outputted to the IP network stack 220.

The IP network stack 220 processes broadcast data that are being transmitted in the form of IP datagrams. More specifically, the IP network stack 220 processes data that are inputted via user datagram protocol (UDP), real-time transport protocol (RTP), real-time transport control protocol (RTCP), asynchronous layered coding/layered coding transport (ALC/LCT), file delivery over unidirectional transport (FLUTE), and so on. Herein, when the processed data correspond to streaming data, the corresponding data are outputted to the streaming handler 230. And, when the processed data correspond to data in a file format, the corresponding data are outputted to the file handler 250. Finally, when the processed data correspond to SI-associated data, the corresponding data are outputted to the SI handler 240.

The SI handler 240 receives and processes SI data having the form of IP datagrams, which are inputted to the IP network stack 220. When the inputted data associated with SI correspond to MIME-type data, the inputted data are outputted to the MIME-type handler 260. The MIME-type handler 260 receives the MIME-type SI data outputted from the SI handler 240 and processes the received MIME-type SI data. The file handler 250 receives data from the IP network stack 220 in an object format in accordance with the ALC/LCT and FLUTE structures. The file handler 250 groups the received data to create a file format. Herein, when the corresponding file includes ESG, the file is outputted to the ESG handler 270. On the other hand, when the corresponding file includes data for other file-based services, the file is outputted to the presentation controller 330 of the presentation processor 300.

The ESG handler 270 processes the ESG data received from the file handler 250 and stores the processed ESG data to the storage unit 290. Alternatively, the ESG handler 270 may output the processed ESG data to the ESG decoder 280, thereby allowing the ESG data to be used by the ESG decoder 280. The storage unit 290 stores the system information (SI) received from the physical adaptation control signal handler 210 and the ESG handler 270 therein. Thereafter, the storage unit 290 transmits the stored SI data to each block.

The ESG decoder 280 either recovers the ESG data and SI data stored in the storage unit 290 or recovers the ESG data transmitted from the ESG handler 270. Then, the ESG decoder 280 outputs the recovered data to the presentation controller 330 in a format that can be outputted to the user. The streaming handler 230 receives data from the IP network stack 220, wherein the format of the received data are in accordance with RTP and/or RTCP structures. The streaming handler 230 extracts audio/video streams from the received data, which are then outputted to the audio/video (A/V) decoder 310 of the presentation processor 300. The audio/video decoder 310 then decodes each of the audio stream and video stream received from the streaming handler 230.

The display module 320 of the presentation processor 300 receives audio and video signals respectively decoded by the A/V decoder 310. Then, the display module 320 provides the received audio and video signals to the user through a speaker and/or a screen. The presentation controller 330 corresponds to a controller managing modules that output data received by the receiving system to the user. The channel service manager 340 manages an interface with the user, which enables the user to use channel-based broadcast services, such as channel map management, channel service connection, and so on. The application manager 350 manages an interface with a user using ESG display or other application services that do not correspond to channel-based services.

Data Format Structure

Figure 2:
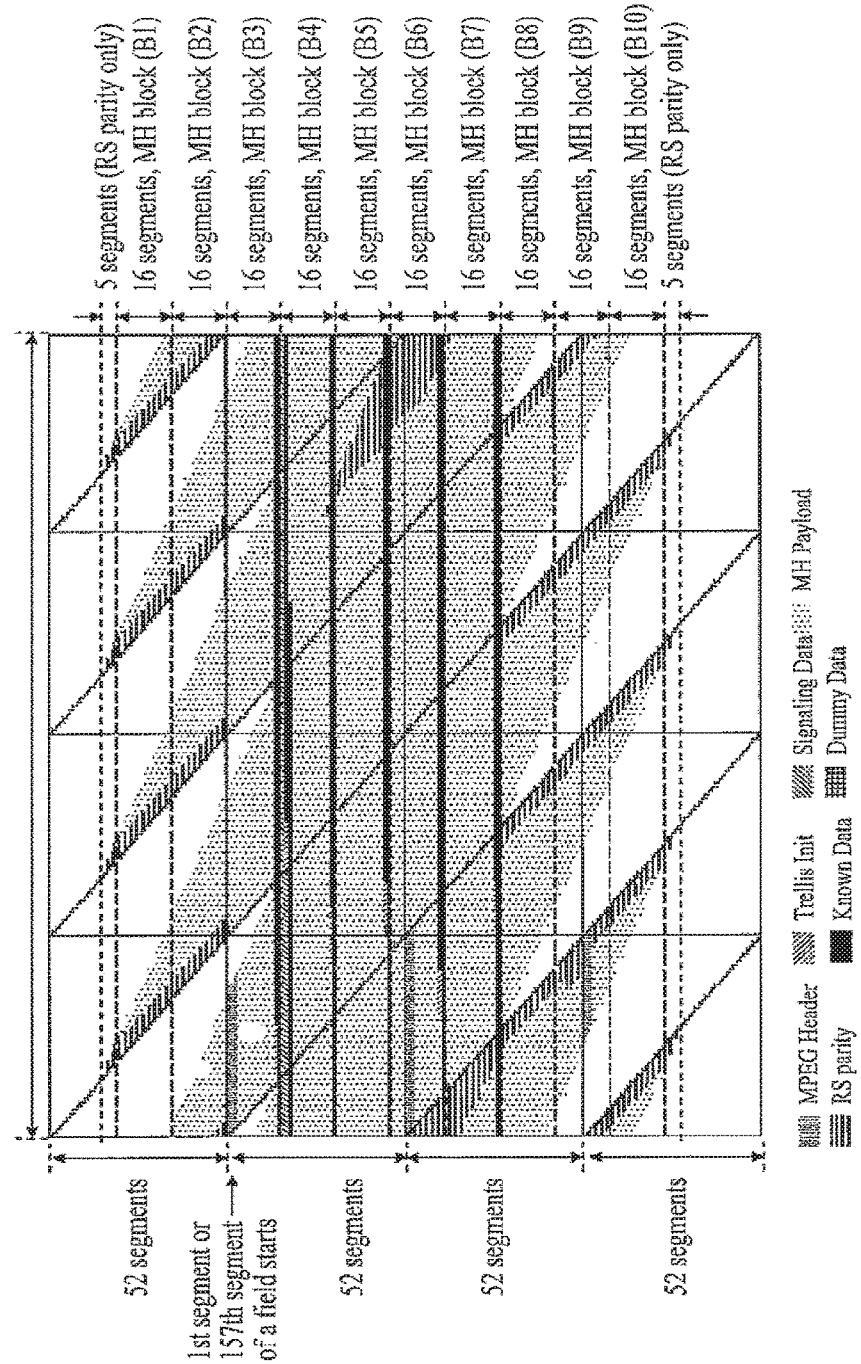
FIG. 2 illustrates an exemplary structure of a data group according to the present invention.

Meanwhile, the data structure used in the mobile broadcasting technology according to the embodiment of the present invention may include a data group structure and an RS frame structure, which will now be described in detail. FIG. 2 illustrates an exemplary structure of a data group according to the present invention. FIG. 2 shows an example of dividing a data group according to the data structure of the present invention into 10 MH blocks (i.e., MH block 1 (B1) to MH block 10 (B10)). In this example, each MH block has the length of 16 segments. Referring to FIG. 2, only the RS parity data are allocated to portions of the first 5 segments of the MH block 1 (B1) and the last 5 segments of the MH block 10 (B10). The RS parity data are excluded in regions A to D of the data group. More specifically, when it is assumed that one data group is divided into regions A, B, C, and D, each MH block may be included in any one of region A to region D depending upon the characteristic of each MH block within the data group.

Herein, the data group is divided into a plurality of regions to be used for different purposes. More specifically, a region of the main service data having no interference or a very low interference level may be considered to have a more resistant (or stronger) receiving performance as compared to regions having higher interference levels. Additionally, when using a system inserting and transmitting known data in the data group, wherein the known data are known based upon an agreement between the transmitting system and the receiving system, and when consecutively long known data are to be periodically inserted in the mobile service data, the known data having a predetermined length may be periodically inserted in the region having no interference from the main service data (i.e., a region wherein the main service data are not mixed). However, due to interference from the main service data, it is difficult to periodically insert known data and also to insert consecutively long known data to a region having interference from the main service data.

Referring to FIG. 2, MH block 4 (B4) to MH block 7 (B7) correspond to regions without interference of the main service data. MH block 4 (B4) to MH block 7 (B7) within the data group shown in FIG. 2 correspond to a region where no interference from the main service data occurs. In this example, a long known data sequence is inserted at both the beginning and end of each MH block. In the description of the present invention, the region including MH block 4 (B4) to MH block 7 (B7) will be referred to as "region A (=B4+B5+B6+B7)". As described above, when the data group includes region A having a long known data sequence inserted at both the beginning and end of each MH block, the receiving system is capable of performing equalization by using the channel information that can be obtained from the known data. Therefore, the strongest equalizing performance may be yielded (or obtained) from one of region A to region D.

In the example of the data group shown in FIG. 2, MH block 3 (B3) and MH block 8 (B8) correspond to a region having little interference from the main service data. Herein, a long known data sequence is inserted in only one side of each MH block B3 and B8. More specifically, due to the interference from the main service data, a long known data sequence is inserted at the end of MH block 3 (B3), and another long known data sequence is inserted at the beginning of MH block 8 (B8). In the present invention, the region including MH block 3 (B3) and MH block 8 (B8) will be referred to as "region B (=B3+B8)". As described above, when the data group includes region B having a long known data sequence inserted at only one side (beginning or end) of each MH block, the receiving system is capable of performing equalization by using the channel information that can be obtained from the known data. Therefore, a stronger equalizing performance as compared to region C/D may be yielded (or obtained).

Referring to FIG. 2, MH block 2 (B2) and MH block 9 (B9) correspond to a region having more interference from the main service data as compared to region B. A long known data sequence cannot be inserted in any side of MH block 2 (B2) and MH block 9 (B9). Herein, the region including MH block 2 (B2) and MH block 9 (B9) will be referred to as "region C (=B2+B9)". Finally, in the example shown in FIG. 2, MH block 1 (B1) and MH block 10 (B10) correspond to a region having more interference from the main service data as compared to region C. Similarly, a long known data sequence cannot be inserted in any side of MH block 1 (B1) and MH block 10 (B10). Herein, the region including MH block 1 (B1) and MH block 10 (B10) will be referred to as "region D (=B1+B10)". Since region C/D is spaced further apart from the known data sequence, when the channel environment undergoes frequent and abrupt changes, the receiving performance of region C/D may be deteriorated.

Additionally, the data group includes a signaling information area wherein signaling information is assigned (or allocated). In the present invention, the signaling information area may start from the $1^{st}$ segment of the $4^{th}$ MH block (B4) to a portion of the $2^{nd}$ segment. According to an embodiment of the present invention, the signaling information area for inserting signaling information may start from the $1^{st}$ segment of the $4^{th}$ MH block (B4) to a portion of the $2^{nd}$ segment. More specifically, 276(=207+69) bytes of the $4^{th}$ MH block (B4) in each data group are assigned as the signaling information area. In other words, the signaling information area consists of 207 bytes of the $1^{st}$ segment and the first 69 bytes of the $2^{nd}$ segment of the $4^{th}$ MH block (B4). The $1^{st}$ segment of the $4^{th}$ MH block (B4) corresponds to the $17^{th}$ or $173^{rd}$ segment of a VSB field.

Herein, the signaling information may be identified by two different types of signaling channels: a transmission parameter channel (TPC) and a fast information channel (FIC). Herein, the TPC data may include at least one of an MH ensemble ID, an MH sub-frame number, a total number of MH groups (TNoG), an RS frame continuity counter, a column size of RS frame (N), and an FIC version number. However, the TPC data (or information) presented herein are merely exemplary. And, since the adding or deleting of signaling information included in the TPC data may be easily adjusted and modified by one skilled in the art, the present invention will, therefore, not be limited to the examples set forth herein. Furthermore, the FIC is provided to enable a fast service acquisition of data receivers, and the FIC includes cross layer information between the physical layer and the upper layer(s).

For example, when the data group includes 6 known data sequences, as shown in FIG. 2, the signaling information area is located between the first known data sequence and the second known data sequence. More specifically, the first known data sequence is inserted in the last 2 segments of the 3$^{rd}$ MH block (B3), and the second known data sequence in inserted in the 2$^{nd}$ and 3$^{rd}$ segments of the 4$^{th}$ MH block (B4). Furthermore, the 3$^{rd}$ to 6$^{th}$ known data sequences are respectively inserted in the last 2 segments of each of the 4$^{th}$, 5$^{th}$, 6$^{th}$, and 7$^{th}$ MH blocks (B4, B5, B6, and B7). The 1$^{st}$ and 3$^{rd}$ to 6$^{th}$ known data sequences are spaced apart by 16 segments.

Hereinafter, transmission/reception of service data having a format different from the existing MH format in an MH system according to another embodiment of the present invention will be described. At this time, the service having the different format includes a MediaFLO™ service for providing a mobile broadcasting service of a subscription base via a single physical channel. Hereinafter, for convenience of description, for example, the MediaFLO™ service will be described, but the present invention is not limited thereto.

Figure 3:
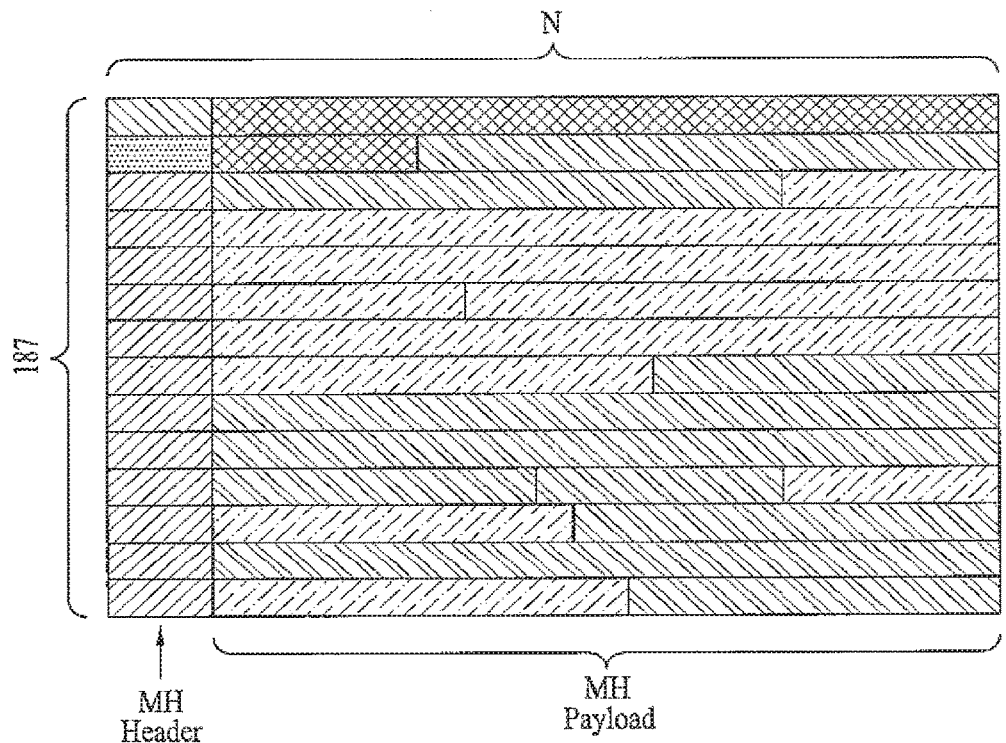
FIG. 3 illustrates an RS frame according to an embodiment of the present invention.

FIG. 3 illustrates an RS frame according to an embodiment of the present invention. The RS frame shown in FIG. 3 corresponds to a collection of one or more data groups. The RS frame is received for each MH frame in a condition where the receiving system receives the FIC and processes the received FIC and where the receiving system is switched to a time-slicing mode so that the receiving system can receive MH ensembles including ESG entry points. Each RS frame includes IP streams of each service or ESG, and SMT section data may exist in all RS frames. The RS frame according to the embodiment of the present invention consists of at least one MH transport packet (TP). Herein, the MH TP includes an MH header and an MH payload.

The MH payload may include mobile service data as well as signaling data. More specifically, an MH payload may include only mobile service data, or may include only signaling data, or may include both mobile service data and signaling data. According to the embodiment of the present invention, the MH header may identify (or distinguish) the data types included in the MH payload. More specifically, when the MH TP includes a first MH header, this indicates that the MH payload includes only the signaling data. Also, when the MH TP includes a second MH header, this indicates that the MH payload includes both the signaling data and the mobile service data. Finally, when MH TP includes a third MH header, this indicates that the MH payload includes only the mobile service data. In the example shown in FIG. 3, the RS frame is assigned with IP datagrams (IP datagram 1 and IP datagram 2) for two service types.

Data Transmission Structure

Figure 4:
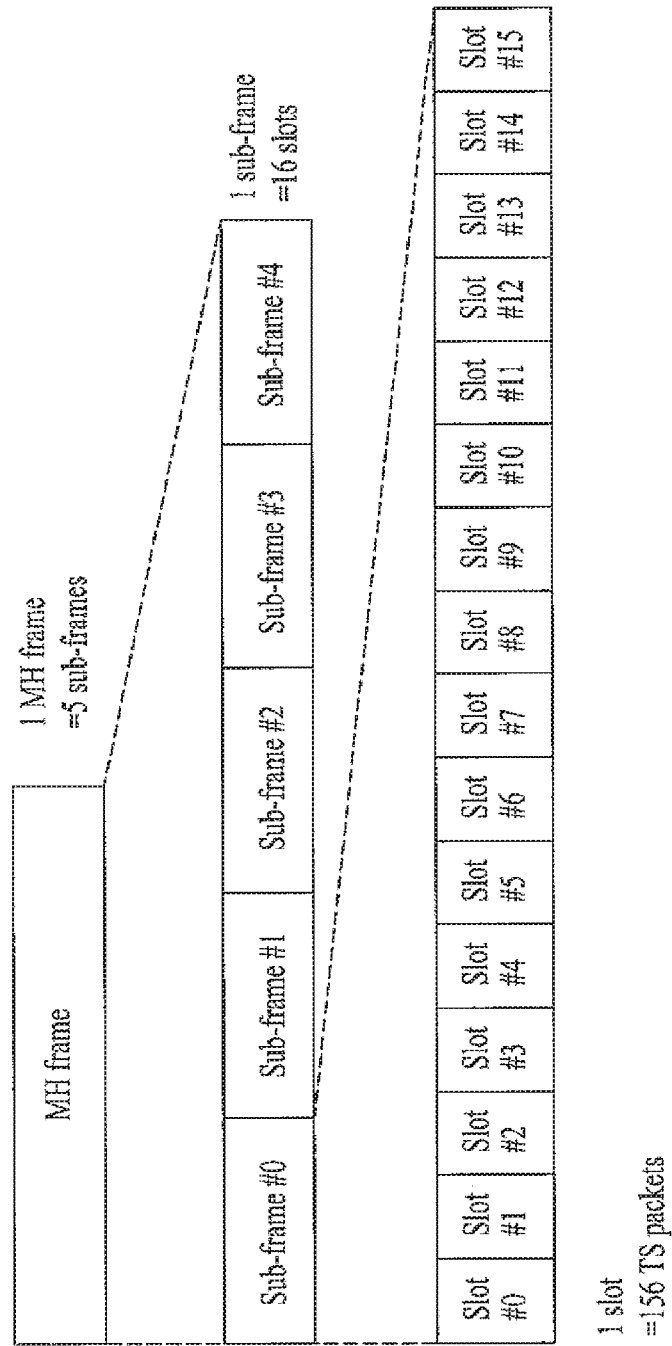
FIG. 4 illustrates an example of an MH frame structure for transmitting and receiving mobile service data according to the present invention.

FIG. 4 illustrates a structure of a MH frame for transmitting and receiving mobile service data according to the present invention. In the example shown in FIG. 4, one MH frame consists of 5 sub-frames, wherein each sub-frame includes 16 slots. In this case, the MH frame according to the present invention includes 5 sub-frames and 80 slots. Also, in a packet level, one slot is configured of 156 data packets (i.e., transport stream packets), and in a symbol level, one slot is configured of 156 data segments. Herein, the size of one slot corresponds to one half (½) of a VSB field. More specifically, since one 207-byte data packet has the same amount of data as a data segment, a data packet prior to being interleaved may also be used as a data segment. At this point, two VSB fields are grouped to form a VSB frame.

Figure 5:
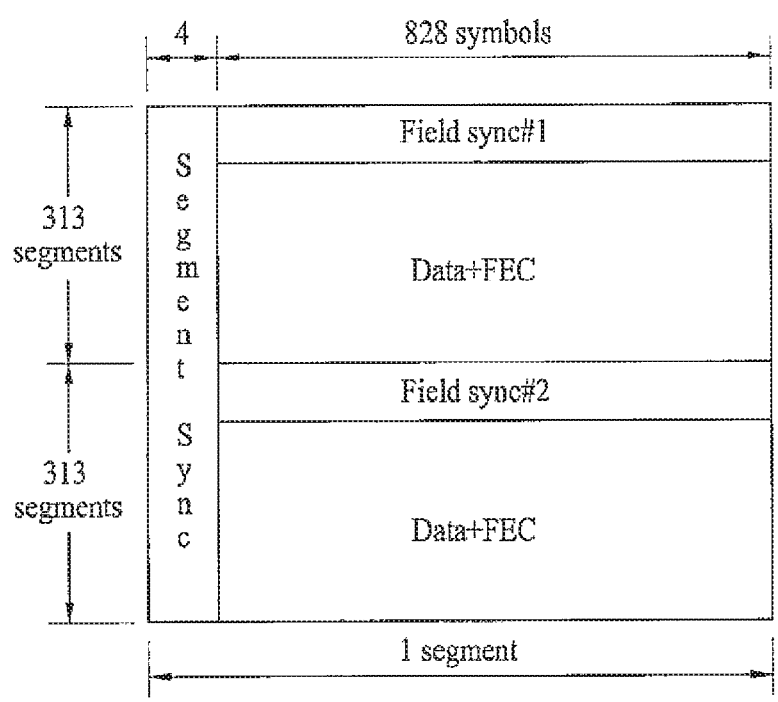
FIG. 5 illustrates an example of a general VSB frame structure.

FIG. 5 illustrates an exemplary structure of a VSB frame, wherein one VSB frame consists of 2 VSB fields (i.e., an odd field and an even field). Herein, each VSB field includes a field synchronization segment and 312 data segments. The slot corresponds to a basic time unit for multiplexing the mobile service data and the main service data. Herein, one slot may either include the mobile service data or be configured only of the main service data. If the first 118 data packets within the slot correspond to a data group, the remaining 38 data packets become the main service data packets. In another example, when no data group exists in a slot, the corresponding slot is configured of 156 main service data packets. Meanwhile, when the slots are assigned to a VSB frame, an off-set exists for each assigned position.

Figure 6:
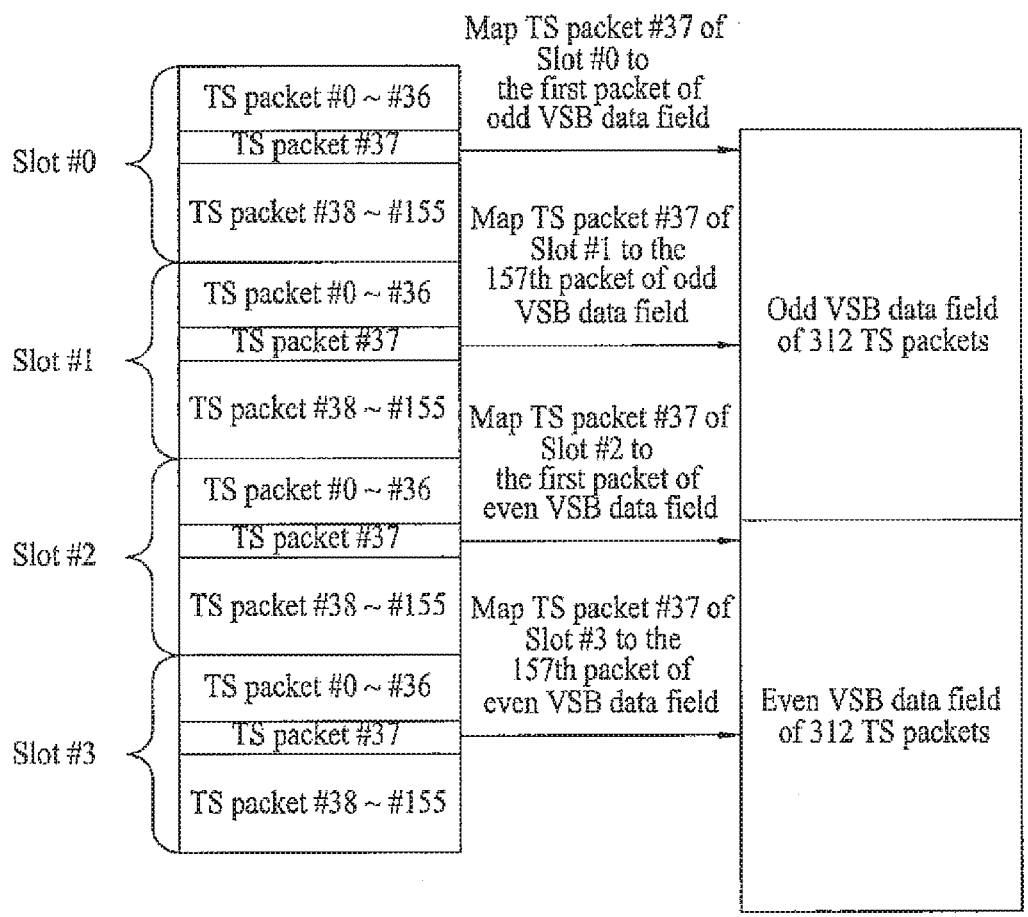
FIG. 6 illustrates an example of mapping positions of the first 4 slots of a sub-frame in a spatial area with respect to a VSB frame.
Figure 7:
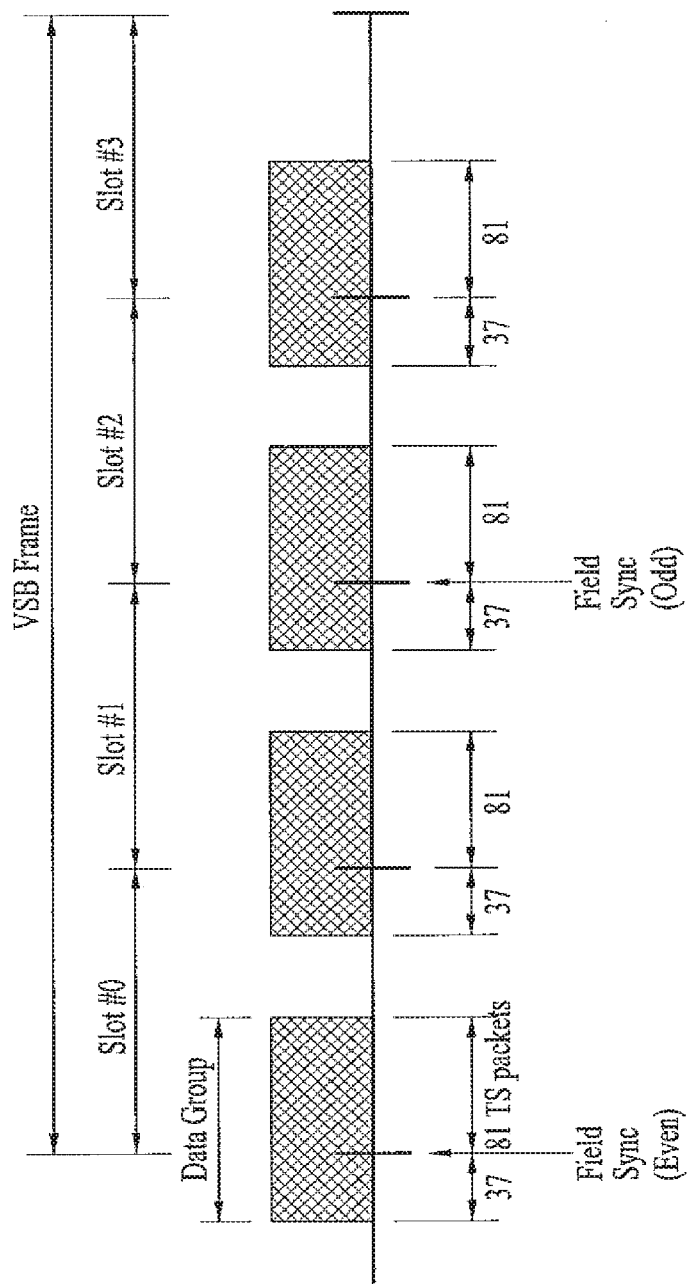
FIG. 7 illustrates an example of mapping positions of the first 4 slots of a sub-frame in a chronological (or time) area with respect to a VSB frame.

FIG. 6 illustrates a mapping example of the positions to which the first 4 slots of a sub-frame are assigned with respect to a VSB frame in a spatial area. And, FIG. 7 illustrates a mapping example of the positions to which the first 4 slots of a sub-frame are assigned with respect to a VSB frame in a chronological (or time) area. Referring to FIG. 6 and FIG. 7, a 38$^{th}$ data packet (TS packet #37) of a 1$^{st}$ slot (Slot #0) is mapped to the 1$^{st}$ data packet of an odd VSB field. A 38$^{th}$ data packet (TS packet #37) of a 2$^{nd}$ slot (Slot #1) is mapped to the 157$^{th}$ data packet of an odd VSB field. Also, a 38$^{th}$ data packet (TS packet #37) of a 3$^{rd}$ slot (Slot #2) is mapped to the 1$^{st}$ data packet of an even VSB field. And, a 38$^{th}$ data packet (TS packet #37) of a 4$^{th}$ slot (Slot #3) is mapped to the 157$^{th}$ data packet of an even VSB field. Similarly, the remaining 12 slots within the corresponding sub-frame are mapped in the subsequent VSB frames using the same method.

Figure 8:
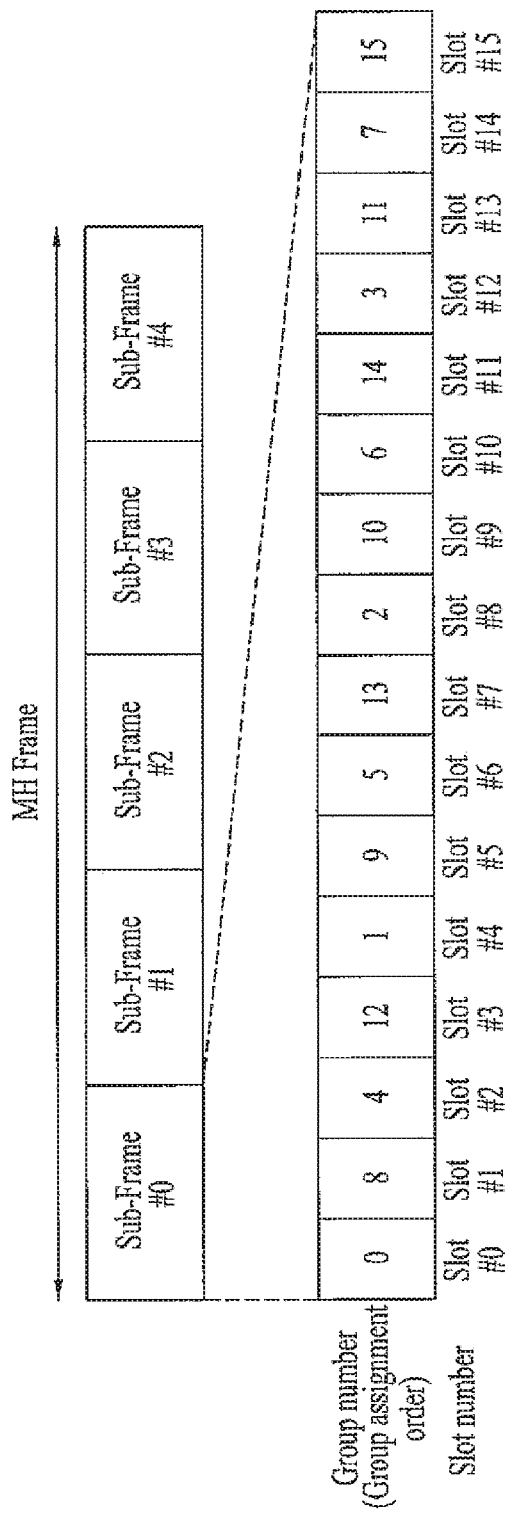
FIG. 8 illustrates an exemplary order of data groups being assigned to one of 5 sub-frames configuring an MH frame according to the present invention.

FIG. 8 illustrates an exemplary assignment order of data groups being assigned to one of 5 sub-frames, wherein the 5 sub-frames configure an MH frame. For example, the method of assigning data groups may be identically applied to all MH frames or differently applied to each MH frame. Furthermore, the method of assigning data groups may be identically applied to all sub-frames or differently applied to each sub-frame. At this point, when it is assumed that the data groups are assigned using the same method in all sub-frames of the corresponding MH frame, the total number of data groups being assigned to an MH frame is equal to a multiple of '5'. According to the embodiment of the present invention, a plurality of consecutive data groups is assigned to be spaced as far apart from one another as possible within the MH frame. Thus, the system can be capable of responding promptly and effectively to any burst error that may occur within a sub-frame.

For example, when it is assumed that 3 data groups are assigned to a sub-frame, the data groups are assigned to a 1$^{st}$ slot (Slot #0), a 5$^{th}$ slot (Slot #4), and a 9$^{th}$ slot (Slot #8) in the sub-frame, respectively. FIG. 8 illustrates an example of assigning 16 data groups in one sub-frame using the above-described pattern (or rule). In other words, each data group is serially assigned to 16 slots corresponding to the following numbers: 0, 8, 4, 12, 1, 9, 5, 13, 2, 10, 6, 14, 3, 11, 7, and 15. Equation 1 below shows the above-described rule (or pattern) for assigning data groups in a sub-frame.

$$j = (4i+0) \bmod 16 \qquad \text{Equation 1}$$

Herein, O=0 if i<4,
 O=2 else if i<8,
 O=1 else if i<12,
 O=3 else.

Herein, j indicates the slot number within a sub-frame. The value of j may range from 0 to 15 (i.e., 0≤j≤15). Also, variable i indicates the data group number. The value of i may range from 0 to 15 (i.e., 0≤i≤15).

In the present invention, a collection of data groups included in a MH frame will be referred to as a "parade".

Based upon the RS frame mode, the parade transmits data of at least one specific RS frame. The mobile service data within one RS frame may be assigned either to all of regions A/B/C/D within the corresponding data group, or to at least one of regions A/B/C/D. In the embodiment of the present invention, the mobile service data within one RS frame may be assigned either to all of regions A/B/C/D, or to at least one of regions A/B and regions C/D. If the mobile service data are assigned to the latter case (i.e., one of regions A/B and regions C/D), the RS frame being assigned to regions A/B and the RS frame being assigned to regions C/D within the corresponding data group are different from one another.

According to the embodiment of the present invention, the RS frame being assigned to regions A/B within the corresponding data group will be referred to as a "primary RS frame", and the RS frame being assigned to regions C/D within the corresponding data group will be referred to as a "secondary RS frame", for simplicity. Also, the primary RS frame and the secondary RS frame form (or configure) one parade. More specifically, when the mobile service data within one RS frame are assigned either to all of regions A/B/C/D within the corresponding data group, one parade transmits one RS frame. Conversely, when the mobile service data within one RS frame are assigned either to at least one of regions A/B and regions C/D, one parade may transmit up to 2 RS frames. More specifically, the RS frame mode indicates whether a parade transmits one RS frame, or whether the parade transmits two RS frames. Such RS frame mode is transmitted as the above-described TPC data. Table 1 below shows an example of the RS frame mode.

TABLE 1

| RS frame mode | Description |
| --- | --- |
| 00 | There is only one primary RS frame for all group regions |
| 01 | There are two separate RS frames. Primary RS frame for group regions A and B Secondary RS frame for group regions C and D |
| 10 | Reserved |
| 11 | Reserved |

Table 1 illustrates an example of allocating 2 bits in order to indicate the RS frame mode. For example, referring to Table 1, when the RS frame mode value is equal to '00', this indicates that one parade transmits one RS frame. And, when the RS frame mode value is equal to '01', this indicates that one parade transmits two RS frames, i.e., the primary RS frame and the secondary RS frame. More specifically, when the RS frame mode value is equal to '01', data of the primary RS frame for regions A/B are assigned and transmitted to regions A/B of the corresponding data group. Similarly, data of the secondary RS frame for regions C/D are assigned and transmitted to regions C/D of the corresponding data group.

As described in the assignment of data groups, the parades are also assigned to be spaced as far apart from one another as possible within the sub-frame. Thus, the system can be capable of responding promptly and effectively to any burst error that may occur within a sub-frame. Furthermore, the method of assigning parades may be identically applied to all MH frames or differently applied to each MH frame. According to the embodiment of the present invention, the parades may be assigned differently for each MH frame and identically for all sub-frames within an MH frame. More specifically, the MH frame structure may vary by MH frame units. Thus, an ensemble rate may be adjusted on a more frequent and flexible basis.

Figure 9:
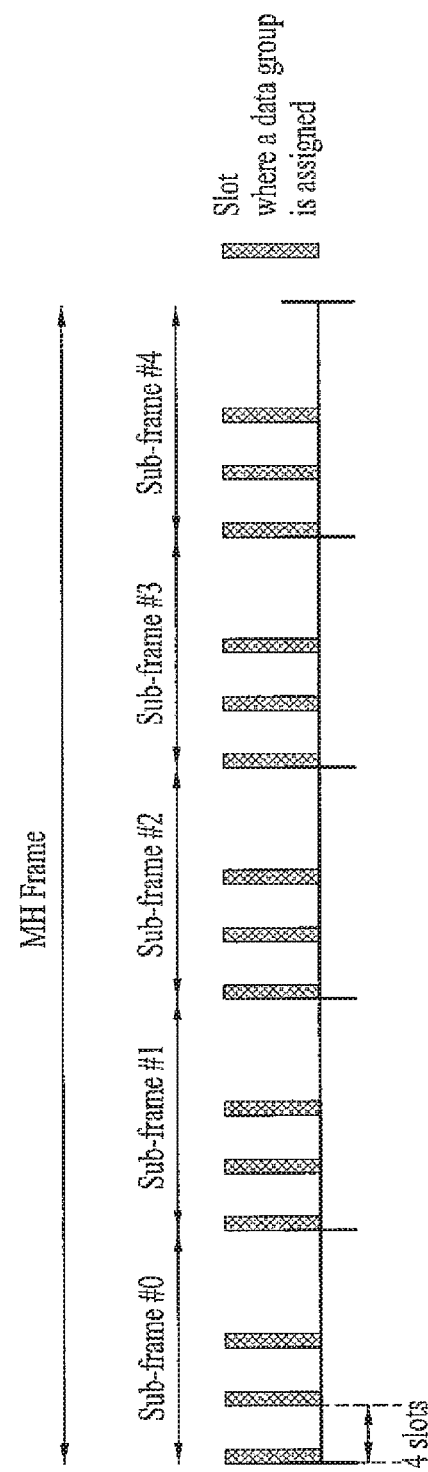
FIG. 9 illustrates an example of a single parade being assigned to an MH frame according to the present invention.

FIG. 9 illustrates an example of multiple data groups of a single parade being assigned (or allocated) to an MH frame. More specifically, FIG. 9 illustrates an example of a plurality of data groups included in a single parade, wherein the number of data groups included in a sub-frame is equal to '3', being allocated to an MH frame. Referring to FIG. 9, 3 data groups are sequentially assigned to a sub-frame at a cycle period of 4 slots. Accordingly, when this process is equally performed in the 5 sub-frames included in the corresponding MH frame, 15 data groups are assigned to a single MH frame. Herein, the 15 data groups correspond to data groups included in a parade. Therefore, since one sub-frame is configured of 4 VSB frame, and since 3 data groups are included in a sub-frame, the data group of the corresponding parade is not assigned to one of the 4 VSB frames within a sub-frame.

For example, when it is assumed that one parade transmits one RS frame, and that a RS frame encoder (not shown) included in the transmitting system performs RS-encoding on the corresponding RS frame, thereby adding 24 bytes of parity data to the corresponding RS frame and transmitting the processed RS frame, the parity data occupy approximately 11.37% (=24/(187+24)×100) of the total code word length. Meanwhile, when one sub-frame includes 3 data groups, and when the data groups included in the parade are assigned, as shown in FIG. 9, a total of 15 data groups form an RS frame. Accordingly, even when an error occurs in an entire data group due to a burst noise within a channel, the percentile is merely 6.67% (=1/15×100). Therefore, the receiving system may correct all errors by performing an erasure RS decoding process. More specifically, when the erasure RS decoding is performed, a number of channel errors corresponding to the number of RS parity bytes may be corrected. By doing so, the receiving system may correct the error of at least one data group within one parade. Thus, the minimum burst noise length correctable by a RS frame is over 1 VSB frame.

Meanwhile, when data groups of a parade are assigned as shown in FIG. 9, either main service data may be assigned between each data group, or data groups corresponding to different parades may be assigned between each data group. More specifically, data groups corresponding to multiple parades may be assigned to one MH frame. Basically, the method of assigning data groups corresponding to multiple parades is very similar to the method of assigning data groups corresponding to a single parade. In other words, data groups included in other parades that are to be assigned to an MH frame are also respectively assigned according to a cycle period of 4 slots. At this point, data groups of a different parade may be sequentially assigned to the respective slots in a circular method. Herein, the data groups are assigned to slots starting from the ones to which data groups of the previous parade have not yet been assigned. For example, when it is assumed that data groups corresponding to a parade are assigned as shown in FIG. 9, data groups corresponding to the next parade may be assigned to a sub-frame starting either from the $12^{th}$ slot of a sub-frame. However, this is merely exemplary. In another example, the data groups of the next parade may also be sequentially assigned to a different slot within a sub-frame at a cycle period of 4 slots starting from the $3^{rd}$ slot.

Figure 10:
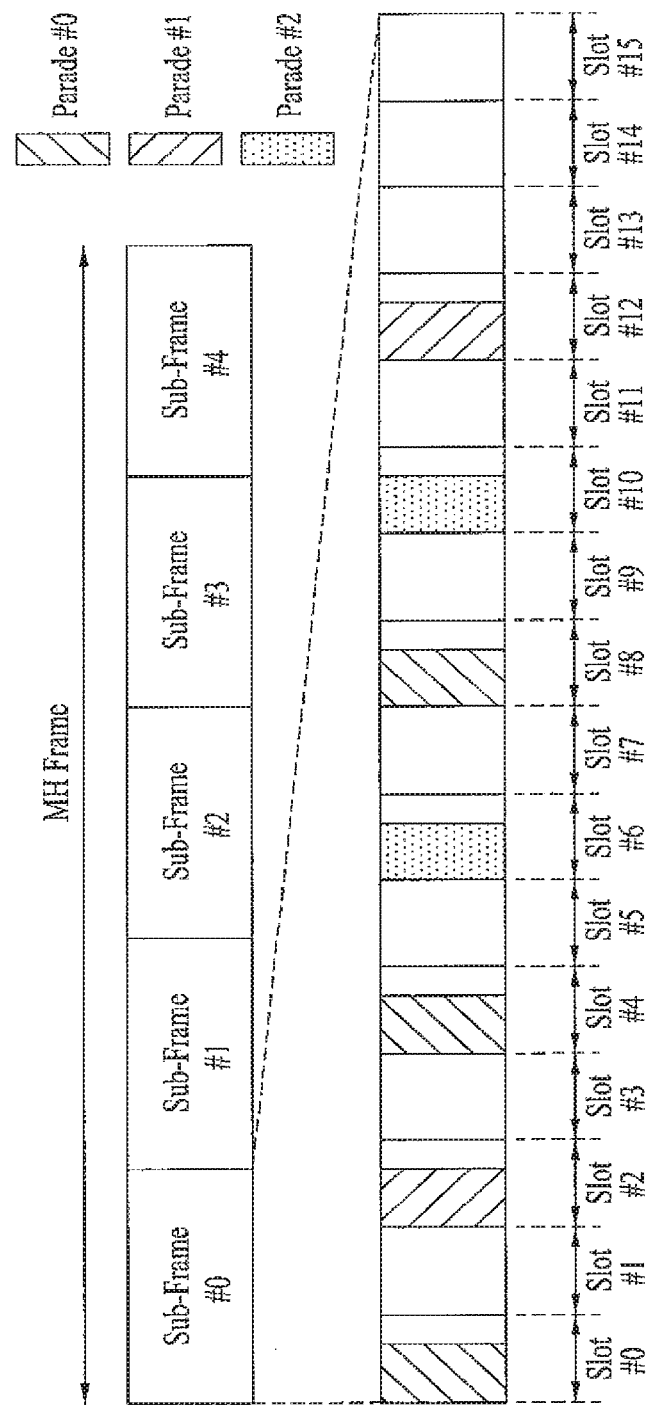
FIG. 10 illustrates an example of 3 parades being assigned to an MH frame according to the present invention.

FIG. 10 illustrates an example of transmitting 3 parades (Parade #0, Parade #1, and Parade #2) to an MH frame. More specifically, FIG. 10 illustrates an example of transmitting parades included in one of 5 sub-frames, wherein the 5 sub-frames configure one MH frame. When the $1^{st}$ parade (Parade #0) includes 3 data groups for each sub-frame, the positions of each data groups within the sub-frames may be obtained by substituting values '0' to '2' for i in Equation 1. More specifically, the data groups of the $1^{st}$ parade (Parade #0) are sequentially assigned to the $1^{st}$, $5^{th}$, and $9^{th}$ slots (Slot #0, Slot #4, and Slot #8) within the sub-frame. Also, when the $2^{nd}$ parade includes 2 data groups for each sub-frame, the positions of each data groups within the sub-frames may be obtained by substituting values '3' and '4' for i in Equation 1. More specifically, the data groups of the $2^{nd}$ parade (Parade #1) are sequentially assigned to the $2^{nd}$ and $12^{th}$ slots (Slot #3 and Slot #11) within the sub-frame. Finally, when the $3^{rd}$ parade includes 2 data groups for each sub-frame, the positions of each data groups within the sub-frames may be obtained by substituting values '5' and '6' for i in Equation 1. More specifically, the data groups of the $3^{rd}$ parade (Parade #2) are sequentially assigned to the $7^{th}$ and $11^{th}$ slots (Slot #6 and Slot #10) within the sub-frame.

As described above, data groups of multiple parades may be assigned to a single MH frame, and, in each sub-frame, the data groups are serially allocated to a group space having 4 slots from left to right. Therefore, a number of groups of one parade per sub-frame (NoG) may correspond to any one integer from '1' to '8'. Herein, since one MH frame includes 5 sub-frames, the total number of data groups within a parade that can be allocated to an MH frame may correspond to any one multiple of '5' ranging from '5' to '40'.

Figure 11:
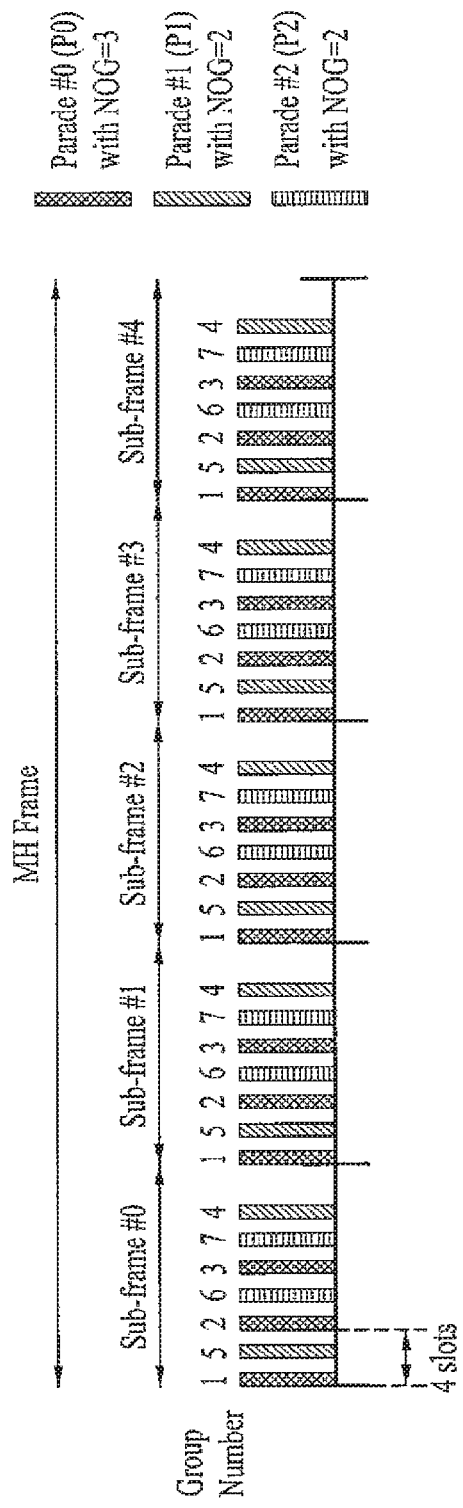
FIG. 11 illustrates an example of the process of assigning 3 parades shown in FIG. 10 being expanded to 5 sub-frames within an MH frame.
Figure 12:
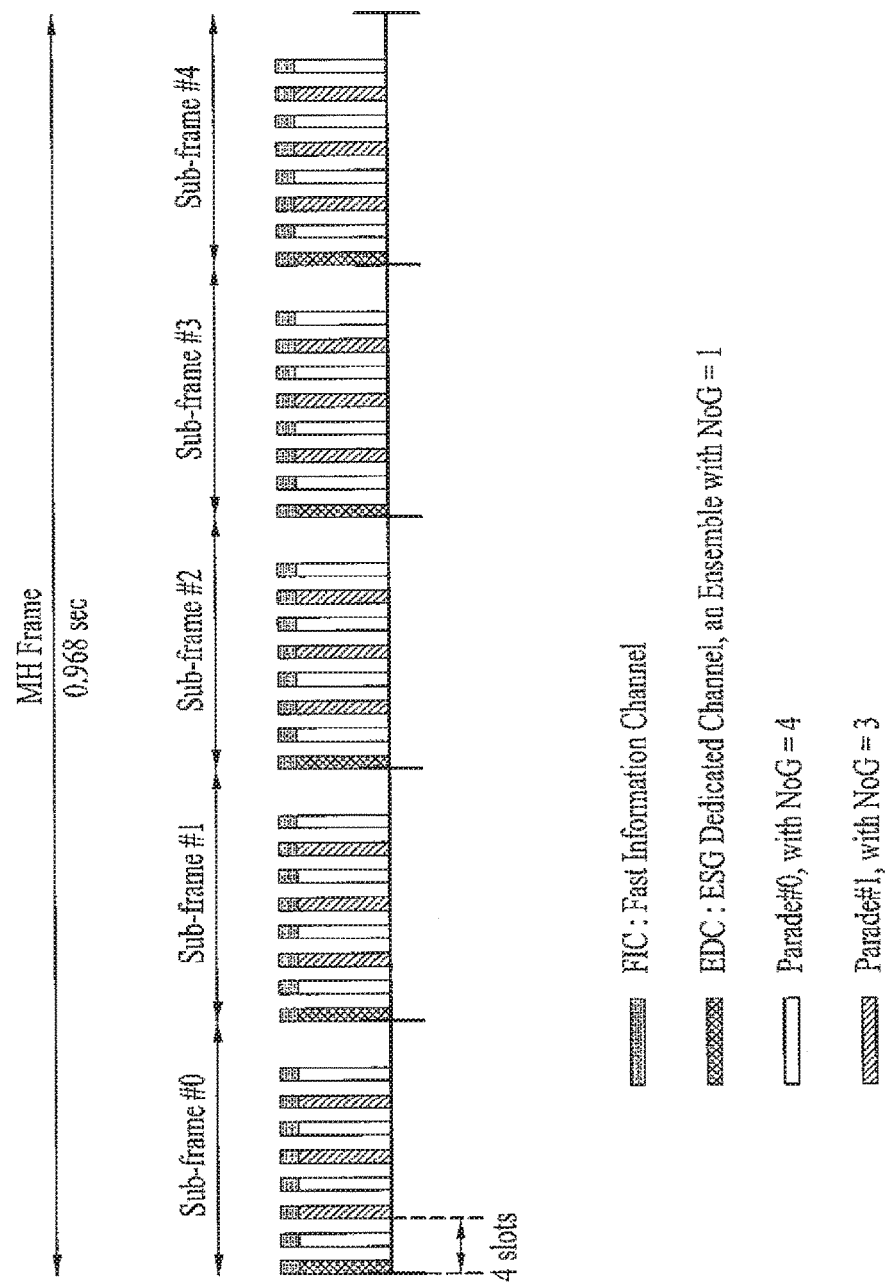
FIG. 12 illustrates a data transmission structure according to an embodiment of the present invention, wherein signaling data are included in a data group so as to be transmitted.

FIG. 11 illustrates an example of expanding the assignment process of 3 parades, shown in FIG. 10, to 5 sub-frames within an MH frame. FIG. 12 illustrates a data transmission structure according to an embodiment of the present invention, wherein signaling data are included in a data group so as to be transmitted. As described above, an MH frame is divided into 5 sub-frames. Data groups corresponding to a plurality of parades co-exist in each sub-frame. Herein, the data groups corresponding to each parade are grouped by MH frame units, thereby configuring a single parade.

The data structure shown in FIG. 12 includes 3 parades, one ESG dedicated channel (EDC) parade (i.e., parade with NoG=1), and 2 service parades (i.e., parade with NoG=4 and parade with NoG=3). Also, a predetermined portion of each data group (i.e., 37 bytes/data group) is used for delivering (or sending) FIC information associated with mobile service data, wherein the FIC information is separately encoded from the RS-encoding process. The FIC region assigned to each data group consists of one FIC segments. Herein, each segment is interleaved by MH sub-frame units, thereby configuring an FIC body, which corresponds to a completed FIC transmission structure. However, whenever required, each segment may be interleaved by MH frame units and not by MH sub-frame units, thereby being completed in MH frame units.

Meanwhile, the concept of an MH ensemble is applied in the embodiment of the present invention, thereby defining a collection (or group) of services. Each MH ensemble carries the same QoS and is coded with the same FEC code. Also, each MH ensemble has the same unique identifier (i.e., ensemble ID) and corresponds to consecutive RS frames. As shown in FIG. 12, the FIC segment corresponding to each data group described service information of an MH ensemble to which the corresponding data group belongs. When FIC segments within a sub-frame are grouped and deinterleaved, all service information of a physical channel through which the corresponding FICs are transmitted may be obtained. Therefore, the receiving system may be able to acquire the channel information of the corresponding physical channel, after being processed with physical channel tuning, during a sub-frame period. Furthermore, FIG. 12 illustrates a structure further including a separate EDC parade apart from the service parade and wherein electronic service guide (ESG) data are transmitted in the $1^{st}$ slot of each sub-frame.

Hierarchical Signaling Structure

Figure 13:
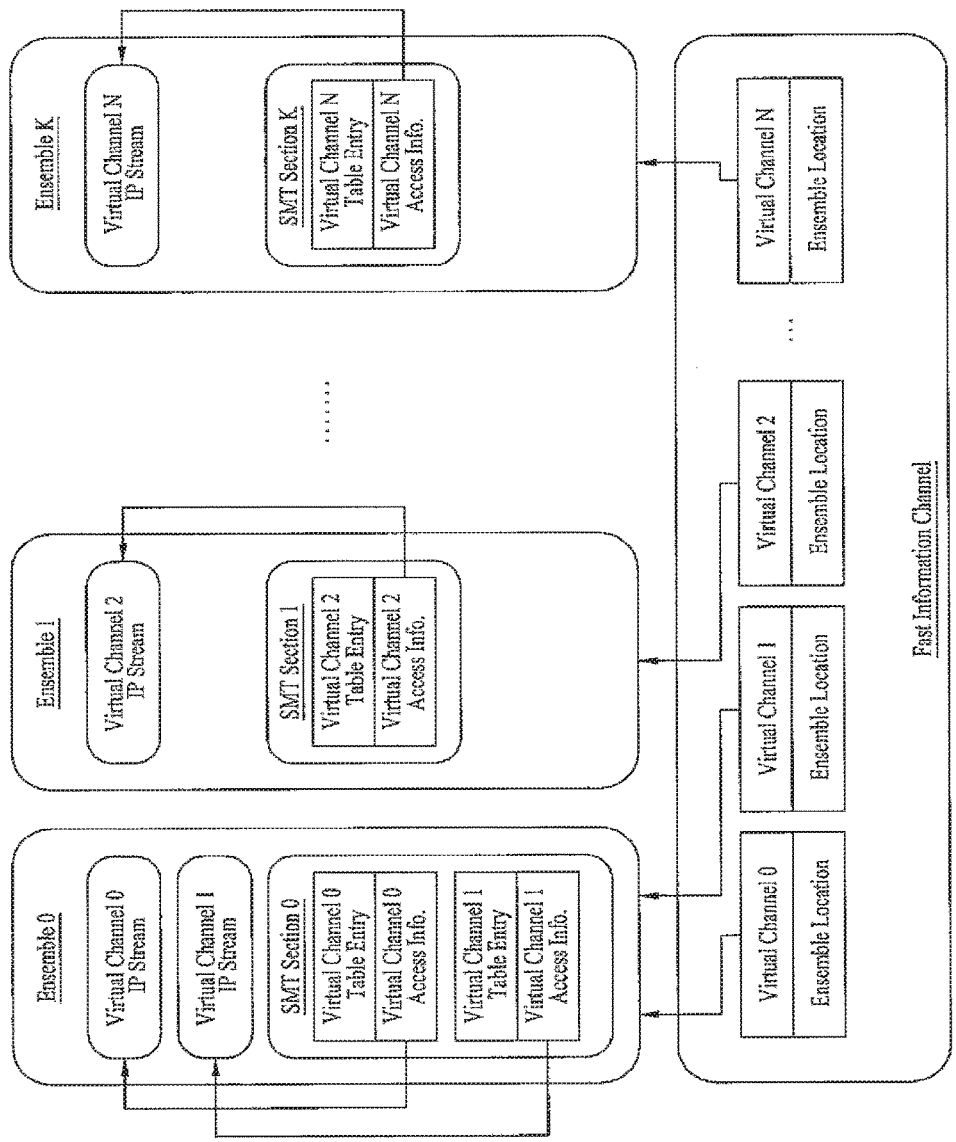
FIG. 13 illustrates a hierarchical signaling structure according to an embodiment of the present invention.

FIG. 13 illustrates a hierarchical signaling structure according to an embodiment of the present invention. As shown in FIG. 13, the mobile broadcasting technology according to the embodiment of the present invention adopts a signaling method using FIC and SMT. In the description of the present invention, the signaling structure will be referred to as a hierarchical signaling structure. Hereinafter, a detailed description on how the receiving system accesses a virtual channel via FIC and SMT will now be given with reference to FIG. 13. The FIC body defined in an MH transport (M1) identifies the physical location of each the data stream for each virtual channel and provides very high level descriptions of each virtual channel. Being MH ensemble level signaling information, the service map table (SMT) provides MH ensemble level signaling information. The SMT provides the IP access information of each virtual channel belonging to the respective MH ensemble within which the SMT is carried. The SMT also provides all IP stream component level information required for the virtual channel service acquisition.

Referring to FIG. 13, each MH ensemble (i.e., Ensemble 0, Ensemble 1, ..., Ensemble K) includes a stream information on each associated (or corresponding) virtual channel (e.g., virtual channel 0 IP stream, virtual channel 1 IP stream, and virtual channel 2 IP stream). For example, Ensemble 0 includes virtual channel 0 IP stream and virtual channel 1 IP stream. And, each MH ensemble includes diverse information on the associated virtual channel (i.e., Virtual Channel 0 Table Entry, Virtual Channel 0 Access Info, Virtual Channel 1 Table Entry, Virtual Channel 1 Access Info, Virtual Channel 2 Table Entry, Virtual Channel 2 Access Info, Virtual Channel N Table Entry, Virtual Channel N Access Info, and so on). The FIC body payload includes information on MH ensembles (e.g., ensemble_id field, and referred to as "ensemble location" in FIG. 13) and information on a virtual channel associated with the corresponding MH ensemble (e.g., when such information corresponds to a major_channel_num field and a minor_channel_num field, the information is expressed as Virtual Channel 0, Virtual Channel 1, ..., Virtual Channel N in FIG. 13).

The application of the signaling structure in the receiving system will now be described in detail. When a user selects a channel he or she wishes to view (hereinafter, the user-selected channel will be referred to as "channel θ" for simplicity), the receiving system first parses the received FIC. Then, the receiving system acquires information on an MH ensemble (i.e., ensemble location), which is associated with the virtual channel corresponding to channel θ (hereinafter, the corresponding MH ensemble will be referred to as "MH ensemble θ" for simplicity). By acquiring slots only corresponding to the MH ensemble θ using the time-slicing method, the receiving system configures ensemble θ. The ensemble θ configured as described above, includes an SMT on the associated virtual channels (including channel θ) and IP streams on the corresponding virtual channels. Therefore, the receiving system uses the SMT included in the MH ensemble θ in order to acquire various information on channel θ (e.g., Virtual Channel θ Table Entry) and stream access information on channel θ (e.g., Virtual Channel θ Access Info). The receiving system uses the stream access information on channel θ to receive only the associated IP streams, thereby providing channel θ services to the user.

Fast Information Channel (FIC)

Figure 14:
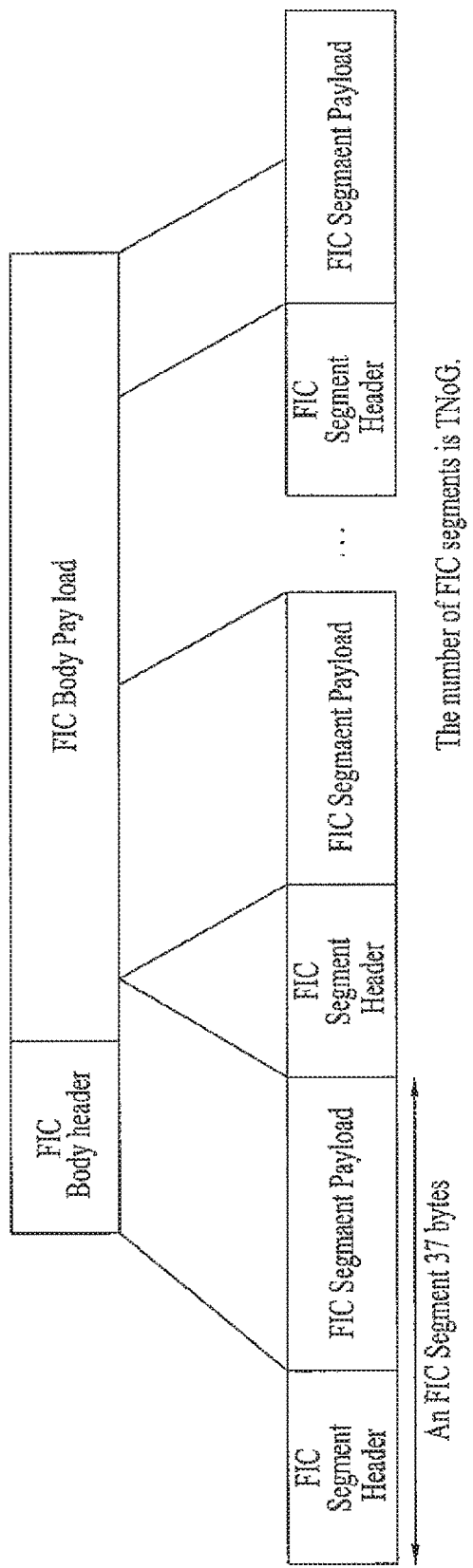
FIG. 14 illustrates an exemplary FIC body format according to an embodiment of the present invention.

The digital broadcast receiving system according to the present invention adopts the fast information channel (FIC) for a faster access to a service that is currently being broadcasted. More specifically, the FIC handler 215 of FIG. 1 parses the FIC body, which corresponds to an FIC transmission structure, and outputs the parsed result to the physical adaptation control signal handler 216. FIG. 14 illustrates an exemplary FIC body format according to an embodiment of the present invention. According to the embodiment of the present invention, the FIC format consists of an FIC body header and an FIC body payload.

Meanwhile, according to the embodiment of the present invention, data are transmitted through the FIC body header and the FIC body payload in FIC segment units. Each FIC segment has the size of 37 bytes, and each FIC segment consists of a 2-byte FIC segment header and a 35-byte FIC segment payload. More specifically, an FIC body configured of an FIC body header and an FIC body payload is segmented in units of 35 data bytes, which are then carried in at least one FIC segment within the FIC segment payload, so as to be transmitted. In the description of the present invention, an example of inserting one FIC segment in one data group, which is then transmitted, will be given. In this case, the receiving system receives a slot corresponding to each data group by using a time-slicing method.

The signaling decoder 190 included in the receiving system shown in FIG. 1 collects each FIC segment inserted in each data group. Then, the signaling decoder 190 uses the collected FIC segments to created a single FIC body. Thereafter, the signaling decoder 190 performs a decoding process on the FIC body payload of the created FIC body, so that the decoded FIC body payload corresponds to an encoded result of a signaling encoder (not shown) included in the transmitting system. Subsequently, the decoded FIC body payload is outputted to the FIC handler 215. The FIC handler 215 parses the FIC data included in the FIC body payload, and then outputs the parsed FIC data to the physical adaptation control signal handler 216. The physical adaptation control signal handler 216 uses the inputted FIC data to perform processes associated with MH ensembles, virtual channels, SMTs, and so on.

According to an embodiment of the present invention, when an FIC body is segmented, and when the size of the last segmented portion is smaller than 35 data bytes, it is assumed that the lacking number of data bytes in the FIC segment payload is completed with by adding the same number of stuffing bytes therein, so that the size of the last FIC segment can be equal to 35 data bytes. However, it is apparent that the above-described data byte values (i.e., 37 bytes for the FIC segment, 2 bytes for the FIC segment header, and 35 bytes for the FIC segment payload) are merely exemplary, and will, therefore, not limit the scope of the present invention.

FIG. 15 illustrates an exemplary bit stream syntax structure with respect to an FIC segment according to an embodiment of the present invention. Herein, the FIC segment signifies a unit used for transmitting the FIC data. The FIC segment consists of an FIC segment header and an FIC segment payload. Referring to FIG. 15, the FIC segment payload corresponds to the portion starting from the 'for' loop statement. Meanwhile, the FIC segment header may include a FIC_type field, an error_indicator field, an FIC_seg_number field, and an FIC_last_seg_number field. A detailed description of each field will now be given.

The FIC_type field is a 2-bit field indicating the type of the corresponding FIC. The error_indicator field is a 1-bit field, which indicates whether or not an error has occurred within the FIC segment during data transmission. If an error has occurred, the value of the error_indicator field is set to '1'. More specifically, when an error that has failed to be recovered still remains during the configuration process of the FIC segment, the error_indicator field value is set to '1'. The error_indicator field enables the receiving system to recognize the presence of an error within the FIC data. The FIC_seg_number field is a 4-bit field. Herein, when a single FIC body is divided into a plurality of FIC segments and transmitted, the FIC_seg_number field indicates the number of the corresponding FIC segment. Finally, the FIC_last_seg_number field is also a 4-bit field. The FIC_last_seg_number field indicates the number of the last FIC segment within the corresponding FIC body.

FIG. 16 illustrates an exemplary bit stream syntax structure with respect to a payload of an FIC segment according to the present invention, when an FIC type field value is equal to '0'. According to the embodiment of the present invention, the payload of the FIC segment is divided into 3 different regions. A first region of the FIC segment payload exists only when the FIC_seg_number field value is equal to '0'. Herein, the first region may include a current_next_indicator field, an ESG_version field, and a transport_stream_id field. However, depending upon the embodiment of the present invention, it may be assumed that each of the 3 fields exists regardless of the FIC_seg_number field.

The current_next_indicator field is a 16-bit field. The current_next_indicator field acts as an indicator identifying whether the corresponding FIC data carry MH ensemble configuration information of an MH frame including the current FIC segment, or whether the corresponding FIC data carry MH ensemble configuration information of a next MH frame. The ESG_version field is a 5-bit field indicating ESG version information. Herein, by providing version information on the service guide providing channel of the corresponding ESG, the ESG_version field enables the receiving system to notify whether or not the corresponding ESG has been updated. Finally, the transport_stream_id field is a 16-bit field acting as a unique identifier of a broadcast stream through which the corresponding FIC segment is being transmitted.

A second region of the FIC segment payload corresponds to an ensemble loop region, which includes an ensemble_id field, an SI_version field, and a num_channel field. More specifically, the ensemble_id field is an 8-bit field indicating identifiers of an MH ensemble through which MH services are transmitted. The MH services will be described in more detail in a later process. Herein, the ensemble_id field binds the MH services and the MH ensemble. The SI_version field is a 4-bit field indicating version information of SI data included in the corresponding ensemble, which is being transmitted within the RS frame. Finally, the num_channel field is an 8-bit field indicating the number of virtual channel being transmitted via the corresponding ensemble.

A third region of the FIC segment payload a channel loop region, which includes a channel_type field, a channel_activity field, a CA_indicator field, a stand_alone_service_indicator field, a major_channel_num field, and a minor_channel_num field. The channel_type field is a 5-bit field indicating a service type of the corresponding virtual channel. For example, the channel_type field may indicates an audio/video channel, an audio/video and data channel, an audio-only channel, a data-only channel, a file download channel, an ESG delivery channel, a notification channel, and so on. The channel_activity field is a 2-bit field indicating activity information of the corresponding virtual channel. More specifically, the channel_activity field may indicate whether the current virtual channel is providing the current service.

The CA_indicator field is a 1-bit field indicating whether or not a conditional access (CA) is applied to the current virtual channel. The stand_alone_service_indicator field is also a 1-bit field, which indicates whether the service of the corresponding virtual channel corresponds to a stand alone service. The major_channel_num field is an 8-bit field indicating a major channel number of the corresponding virtual channel. Finally, the minor_channel_num field is also an 8-bit field indicating a minor channel number of the corresponding virtual channel.

Service Table Map

FIG. 17 illustrates an exemplary bit stream syntax structure of a service map table (hereinafter referred to as "SMT") according to the present invention. According to the embodiment of the present invention, the SMT is configured in an MPEG-2 private section format. However, this will not limit the scope and spirit of the present invention. The SMT according to the embodiment of the present invention includes description information for each virtual channel within a single MH ensemble. And, additional information may further be included in each descriptor area. Herein, the SMT according to the embodiment of the present invention includes at least one field and is transmitted from the transmitting system to the receiving system.

As described in FIG. 3, the SMT section may be transmitted by being included in the MH TP within the RS frame. In this case, each of the RS frame decoders 170 and 180, shown in FIG. 1, decodes the inputted RS frame, respectively. Then, each of the decoded RS frames is outputted to the respective RS frame handler 211 and 212. Thereafter, each RS frame handler 211 and 212 identifies the inputted RS frame by row units, so as to create an MH TP, thereby outputting the created MH TP to the MH TP handler 213. When it is determined that the corresponding MH TP includes an SMT section based upon the header in each of the inputted MH TP, the MH TP handler 213 parses the corresponding SMT section, so as to output the SI data within the parsed SMT section to the physical adaptation control signal handler 216. However, this is limited to when the SMT is not encapsulated to IP datagrams.

Meanwhile, when the SMT is not encapsulated to IP datagrams, and when it is determined that the corresponding MH TP includes an SMT section based upon the header in each of the inputted MH TP, the MH TP handler 213 outputs the SMT section to the IP network stack 220. Accordingly, the IP network stack 220 performs IP and UDP processes on the inputted SMT section and, then, outputs the processed SMT section to the SI handler 240. The SI handler 240 parses the inputted SMT section and controls the system so that the parsed SI data can be stored in the storage unit 290. The following corresponds to example of the fields that may be transmitted through the SMT.

The table_id field corresponds to an 8-bit unsigned integer number, which indicates the type of table section. The table_id field allows the corresponding table to be defined as the service map table (SMT). The ensemble_id field is an 8-bit unsigned integer field, which corresponds to an ID value associated to the corresponding MH ensemble. Herein, the ensemble_id field may be assigned with a value ranging from range '0x00' to '0x3F'. It is preferable that the value of the ensemble_id field is derived from the parade_id of the TPC data, which is carried from the baseband processor of MH physical layer subsystem. When the corresponding MH ensemble is transmitted through (or carried over) the primary RS frame, a value of '0' may be used for the most significant bit (MSB), and the remaining 7 bits are used as the parade_id value of the associated MH parade (i.e., for the least significant 7 bits). Alternatively, when the corresponding MH ensemble is transmitted through (or carried over) the secondary RS frame, a value of '1' may be used for the most significant bit (MSB).

The num_channels field is an 8-bit field, which specifies the number of virtual channels in the corresponding SMT section. Meanwhile, the SMT according to the embodiment of the present invention provides information on a plurality of virtual channels using the 'for' loop statement. The major_channel_num field corresponds to an 8-bit field, which represents the major channel number associated with the corresponding virtual channel. Herein, the major_channel_num field may be assigned with a value ranging from '0x00' to '0xFF'. The minor_channel_num field corresponds to an 8-bit field, which represents the minor channel number associated with the corresponding virtual channel. Herein, the minor_channel_num field may be assigned with a value ranging from '0x00' to '0xFF'.

The short_channel_name field indicates the short name of the virtual channel. The service_id field is a 16-bit unsigned integer number (or value), which identifies the virtual channel service. The service_type field is a 6-bit enumerated type field, which designates the type of service carried in the corresponding virtual channel as defined in Table 2 below.

TABLE 2

| | |
|---|---|
| 0x00 | [Reserved] |
| 0x01 | MH_digital_television field: the virtual channel carries television programming (audio, video and optional associated data) conforming to ATSC standards. |
| 0x02 | MH_audio field: the virtual channel carries audio programming (audio service and optional associated data) conforming to ATSC standards. |
| 0x03 | MH_data_only_service field: the virtual channel carries a data service conforming to ATSC standards, but no video or audio component. |
| 0x04 to 0xFF | [Reserved for future ATSC usage] |

The virtual_channel_activity field is a 2-bit enumerated field identifying the activity status of the corresponding virtual channel. When the most significant bit (MSB) of the virtual_channel_activity field is '1', the virtual channel is active, and when the most significant bit (MSB) of the virtual_channel_activity field is '0', the virtual channel is inactive. Also, when the least significant bit (LSB) of the virtual_channel_activity field is '1', the virtual channel is hidden (when set to 1), and when the least significant bit (LSB) of the virtual_channel_activity field is '0', the virtual channel is not hidden. The num_components field is a 5-bit field, which specifies the number of IP stream components in the corresponding virtual channel. The IP_version_flag field corresponds to a 1-bit indicator. More specifically, when the value of the IP_version_flag field is set to '1', this indicates that a source_IP_address field, a virtual_channel_target_IP_address field, and a component_target_IP_address field are IPv6 addresses. Alternatively, when the value of the IP_version_flag field is set to '0', this indicates that the source_IP_address field, the virtual_channel_target_IP_address field, and the component_target_IP_address field are IPv4.

The source_IP_address_flag field is a 1-bit Boolean flag, which indicates, when set, that a source IP address of the corresponding virtual channel exist for a specific multicast source. The virtual_channel_target_IP_address_flag field is a 1-bit Boolean flag, which indicates, when set, that the corresponding IP stream component is delivered through IP datagrams with target IP addresses different from the virtual_channel_target_IP_address. Therefore, when the flag is set, the receiving system (or receiver) uses the component_target_IP_address as the target_IP_address in order to access the corresponding IP stream component. Accordingly, the receiving system (or receiver) may ignore the virtual_channel_target_IP_address field included in the num_channels loop.

The source_IP_address field corresponds to a 32-bit or 128-bit field. Herein, the source_IP_address field will be significant (or present), when the value of the source_IP_address_flag field is set to '1'. However, when the value of the source_IP_address_flag field is set to '0', the source_IP_address field will become insignificant (or absent). More specifically, when the source_IP_address_flag field value is set to '1', and when the IP_version_flag field value is set to '0', the source_IP_address field indicates a 32-bit IPv4 address, which shows the source of the corresponding virtual channel. Alternatively, when the IP_version_flag field value is set to '1', the source_IP_address field indicates a 128-bit IPv6 address, which shows the source of the corresponding virtual channel.

The virtual_channel_target_IP_address field also corresponds to a 32-bit or 128-bit field. Herein, the virtual_channel_target_IP_address field will be significant (or present), when the value of the virtual_channel_target_IP_address_flag field is set to '1'. However, when the value of the virtual_channel_target_IP_address_flag field is set to '0', the virtual_channel_target_IP_address_field will become insignificant (or absent). More specifically, when the virtual_channel_target_IP_address_flag field value is set to '1', and when the IP_version_flag field value is set to '0', the virtual_channel_target_IP_address field indicates a 32-bit target IPv4 address associated to the corresponding virtual channel. Alternatively, when the virtual_channel_target_IP_address_flag field value is set to '1', and when the IP_version_flag field value is set to '1', the virtual_channel_target_IP_address field indicates a 64-bit target IPv6 address associated to the corresponding virtual channel. If the virtual_channel_target_IP_address field is insignificant (or absent), the component_target_IP_address field within the num_channels loop should become significant (or present). And, in order to enable the receiving system to access the IP stream component, the component_target_IP_address field should be used.

Meanwhile, the SMT according to the embodiment of the present invention uses a 'for' loop statement in order to provide information on a plurality of components. Herein, the RTP_payload_type field, which is assigned with 7 bits, identifies the encoding format of the component based upon Table 3 shown below. When the IP stream component is not encapsulated to RTP, the RTP_payload_type field shall be ignored (or deprecated). Table 3 below shows an example of an RTP payload type.

TABLE 3

| RTP_payload_type | Meaning |
| --- | --- |
| 35 | AVC video |
| 36 | MH audio |
| 37 to 72 | [Reserved for future ATSC use] |

The component_target_IP_address_flag field is a 1-bit Boolean flag, which indicates, when set, that the corresponding IP stream component is delivered through IP datagrams with target IP addresses different from the virtual_channel_target_IP_address. Furthermore, when the component_target_IP_address_flag is set, the receiving system (or receiver) uses the component_target_IP_address field as the target IP address for accessing the corresponding IP stream component. Accordingly, the receiving system (or receiver) will ignore the virtual_channel_target_IP_address field included in the num_channels loop. The component_target_IP_address field corresponds to a 32-bit or 128-bit field. Herein, when the value of the IP_version_flag field is set to '0', the component_target_IP_address field indicates a 32-bit target IPv4 address associated to the corresponding IP stream component. And, when the value of the IP_version_flag field is set to '1', the component_target_IP_address field indicates a 128-bit target IPv6 address associated to the corresponding IP stream component.

The port_num_count field is a 6-bit field, which indicates the number of UDP ports associated with the corresponding IP stream component. A target UDP port number value starts from the target_UDP_port_num field value and increases (or is incremented) by 1. For the RTP stream, the target UDP port number should start from the target_UDP_port_num field value and shall increase (or be incremented) by 2. This is to incorporate RTCP streams associated with the RTP streams.

The target_UDP_port_num field is a 16-bit unsigned integer field, which represents the target UDP port number for the corresponding IP stream component. When used for RTP streams, the value of the target_UDP_port_num field shall correspond to an even number. And, the next higher value shall represent the target UDP port number of the associated RTCP stream. The component_level_descriptor( ) represents zero or more descriptors providing additional information on the corresponding IP stream component. The virtual_channel_level_descriptor( ) represents zero or more descriptors providing additional information for the corresponding virtual channel. The ensemble_level_descriptor( ) represents zero or more descriptors providing additional information for the MH ensemble, which is described by the corresponding SMT.

FIG. 18 illustrates an exemplary bit stream syntax structure of an MH audio descriptor according to the present invention. When at least one audio service is present as a component of the current event, the MH_audio_descriptor( ) shall be used as a component_level_descriptor of the SMT. The MH_audio_descriptor( ) may be capable of informing the system of the audio language type and stereo mode status. If there is no audio service associated with the current event, then it is preferable that the MH_audio_descriptor( ) is considered to be insignificant (or absent) for the current event. Each field shown in the bit stream syntax of FIG. 18 will now be described in detail.

The descriptor_tag field is an 8-bit unsigned integer having a TBD value, which indicates that the corresponding descriptor is the MH_audio_descriptor( ). The descriptor_length field is also an 8-bit unsigned integer, which indicates the length (in bytes) of the portion immediately following the descriptor_length field up to the end of the MH_audio_descriptor( ). The channel_configuration field corresponds to an 8-bit field indicating the number and configuration of audio channels. The values ranging from '1' to '6' respectively indicate the number and configuration of audio channels as given for "Default bit stream index number" in Table 42 of ISO/IEC 13818-7:2006. All other values indicate that the number and configuration of audio channels are undefined.

The sample_rate_code field is a 3-bit field, which indicates the sample rate of the encoded audio data. Herein, the indication may correspond to one specific sample rate, or may correspond to a set of values that include the sample rate of the encoded audio data as defined in Table A3.3 of ATSC A/52B. The bit_rate_code field corresponds to a 6-bit field. Herein, among the 6 bits, the lower 5 bits indicate a nominal bit rate. More specifically, when the most significant bit (MSB) is '0', the corresponding bit rate is exact. On the other hand, when the most significant bit (MSB) is '0', the bit rate corresponds to an upper limit as defined in Table A3.4 of ATSC A/53B. The ISO_639_language_code field is a 24-bit (i.e., 3-byte) field indicating the language used for the audio stream component, in conformance with ISO 639.2/B [x]. When a specific language is not present in the corresponding audio stream component, the value of each byte will be set to '0x00'.

FIG. 19 illustrates an exemplary bit stream syntax structure of an MH RTP payload type descriptor according to the present invention. The MH_RTP_payload_type_descriptor( ) specifies the RTP payload type. Yet, the MH_RTP_payload_type_descriptor( ) exists only when the dynamic value of the RTP_payload_type field within the num_components loop of the SMT is in the range of '96' to '127'. The MH_RTP_payload_type_descriptor( ) is used as a component_level_descriptor of the SMT. The MH_RTP_payload_type_descriptor translates (or matches) a dynamic RTP_payload_type field value into (or with) a MIME type. Accordingly, the receiving system (or receiver) may collect (or gather) the encoding format of the IP stream component, which is encapsulated in RTP. The fields included in the MH_RTP_payload_type_descriptor( ) will now be described in detail.

The descriptor_tag field corresponds to an 8-bit unsigned integer having the value TBD, which identifies the current descriptor as the MH_RTP_payload_type_descriptor( ). The descriptor_length field also corresponds to an 8-bit unsigned integer, which indicates the length (in bytes) of the portion immediately following the descriptor_length field up to the end of the MH_RTP_payload_type_descriptor( ). The RTP_payload_type field corresponds to a 7-bit field, which identifies the encoding format of the IP stream component. Herein, the dynamic value of the RTP_payload_type field is in the range of '96' to '127'. The MIME_type_length field specifies the length (in bytes) of the MIME_type field. The MIME_type field indicates the MIME type corresponding to the encoding format of the IP stream component, which is described by the MH_RTP_payload_type_descriptor( ).

FIG. 20 illustrates an exemplary bit stream syntax structure of an MH current event descriptor according to the present invention. The MH_current_event_descriptor( ) shall be used as the virtual_channel_level_descriptor( ) within the SMT. Herein, the MH_current_event_descriptor( ) provides basic information on the current event (e.g., the start time, duration, and title of the current event, etc.), which is transmitted via the respective virtual channel.

The fields included in the MH_current_event_descriptor( ) will now be described in detail.

The descriptor_tag field corresponds to an 8-bit unsigned integer having a value that identifies the current descriptor as the MH_current_event_descriptor( ). The descriptor_length field also corresponds to an 8-bit unsigned integer, which indicates the length (in bytes) of the portion immediately following the descriptor_length field up to the end of the MH_current_event_descriptor( ). The current_event_start_time field corresponds to a 32-bit unsigned integer quantity. The current_event_start_time field represents the start time of the current event and, more specifically, as the number of GPS seconds since 00:00:00 UTC, Jan. 6, 1980. The current_event_duration field corresponds to a 24-bit field. Herein, the current_event_duration field indicates the duration of the current event in hours, minutes, and seconds (wherein the format is in 6 digits, 4-bit BCD=24 bits). The title_length field specifies the length (in bytes) of the title_text field. Herein, the value '0' indicates that there are no titles existing for the corresponding event. The title_text field indicates the title of the corresponding event in event title in the format of a multiple string structure as defined in ATSC A/65C [x].

FIG. 21 illustrates an exemplary bit stream syntax structure of an MH next event descriptor according to the present invention. The optional MH_next_event_descriptor( ) shall be used as the virtual_channel_level_descriptor( ) within the SMT. Herein, the MH_next_event_descriptor( ) provides basic information on the next event (e.g., the start time, duration, and title of the next event, etc.), which is transmitted via the respective virtual channel. The fields included in the MH_next_event_descriptor( ) will now be described in detail.

The descriptor_tag field corresponds to an 8-bit unsigned integer having the value TBD, which identifies the current descriptor as the MH_next_event_descriptor( ). The descriptor_length field also corresponds to an 8-bit unsigned integer, which indicates the length (in bytes) of the portion immediately following the descriptor_length field up to the end of the MH_next_event_descriptor( ). The next_event_start_time field corresponds to a 32-bit unsigned integer quantity. The next_event_start_time field represents the start time of the next event and, more specifically, as the number of GPS seconds since 00:00:00 UTC, Jan. 6, 1980. The next_event_duration field corresponds to a 24-bit field. Herein, the next_event_duration field indicates the duration of the next event in hours, minutes, and seconds (wherein the format is in 6 digits, 4-bit BCD=24 bits). The title_length field specifies the length (in bytes) of the title_text field. Herein, the value '0' indicates that there are no titles existing for the corresponding event. The title_text field indicates the title of the corresponding event in event title in the format of a multiple string structure as defined in ATSC A/65C [x].

FIG. 22 illustrates an exemplary bit stream syntax structure of an MH system time descriptor according to the present invention. The MH_system_time_descriptor( ) shall be used as the ensemble_level_descriptor( ) within the SMT. Herein, the MH_system_time_descriptor( ) provides information on current time and date. The MH_system_time_descriptor( ) also provides information on the time zone in which the transmitting system (or transmitter) transmitting the corresponding broadcast stream is located, while taking into consideration the mobile/portable characteristics of the MH service data. The fields included in the MH_system_time_descriptor( ) will now be described in detail.

The descriptor_tag field corresponds to an 8-bit unsigned integer having the value TBD, which identifies the current descriptor as the MH_system_time_descriptor( ). The descriptor_length field also corresponds to an 8-bit unsigned integer, which indicates the length (in bytes) of the portion immediately following the descriptor_length field up to the end of the MH_system_time_descriptor( ). The system_time field corresponds to a 32-bit unsigned integer quantity. The system_time field represents the current system time and, more specifically, as the number of GPS seconds since 00:00:00 UTC, Jan. 6, 1980. The GPS_UTC_offset field corresponds to an 8-bit unsigned integer, which defines the current offset in whole seconds between GPS and UTC time standards. In order to convert GPS time to UTC time, the GPS_UTC_offset is subtracted from GPS time. Whenever the International Bureau of Weights and Measures decides that the current offset is too far in error, an additional leap second may be added (or subtracted). Accordingly, the GPS_UTC_offset field value will reflect the change.

The time_zone_offset_polarity field is a 1-bit field, which indicates whether the time of the time zone, in which the broadcast station is located, exceeds (or leads or is faster) or falls behind (or lags or is slower) than the UTC time. When the value of the time_zone_offset_polarity field is equal to '0', this indicates that the time on the current time zone exceeds the UTC time. Therefore, the time_zone_offset_polarity field value is added to the UTC time value. Conversely, when the value of the time_zone_offset_polarity field is equal to '1', this indicates that the time on the current time zone falls behind the UTC time. Therefore, the time_zone_offset_polarity field value is subtracted from the UTC time value.

The time_zone_offset field is a 31-bit unsigned integer quantity. More specifically, the time_zone_offset field represents, in GPS seconds, the time offset of the time zone in which the broadcast station is located, when compared to the UTC time. The daylight_savings field corresponds to a 16-bit field providing information on the Summer Time (i.e., the Daylight Savings Time). The time_zone field corresponds to a (5×8)-bit field indicating the time zone, in which the transmitting system (or transmitter) transmitting the corresponding broadcast stream is located.

Figure 23:
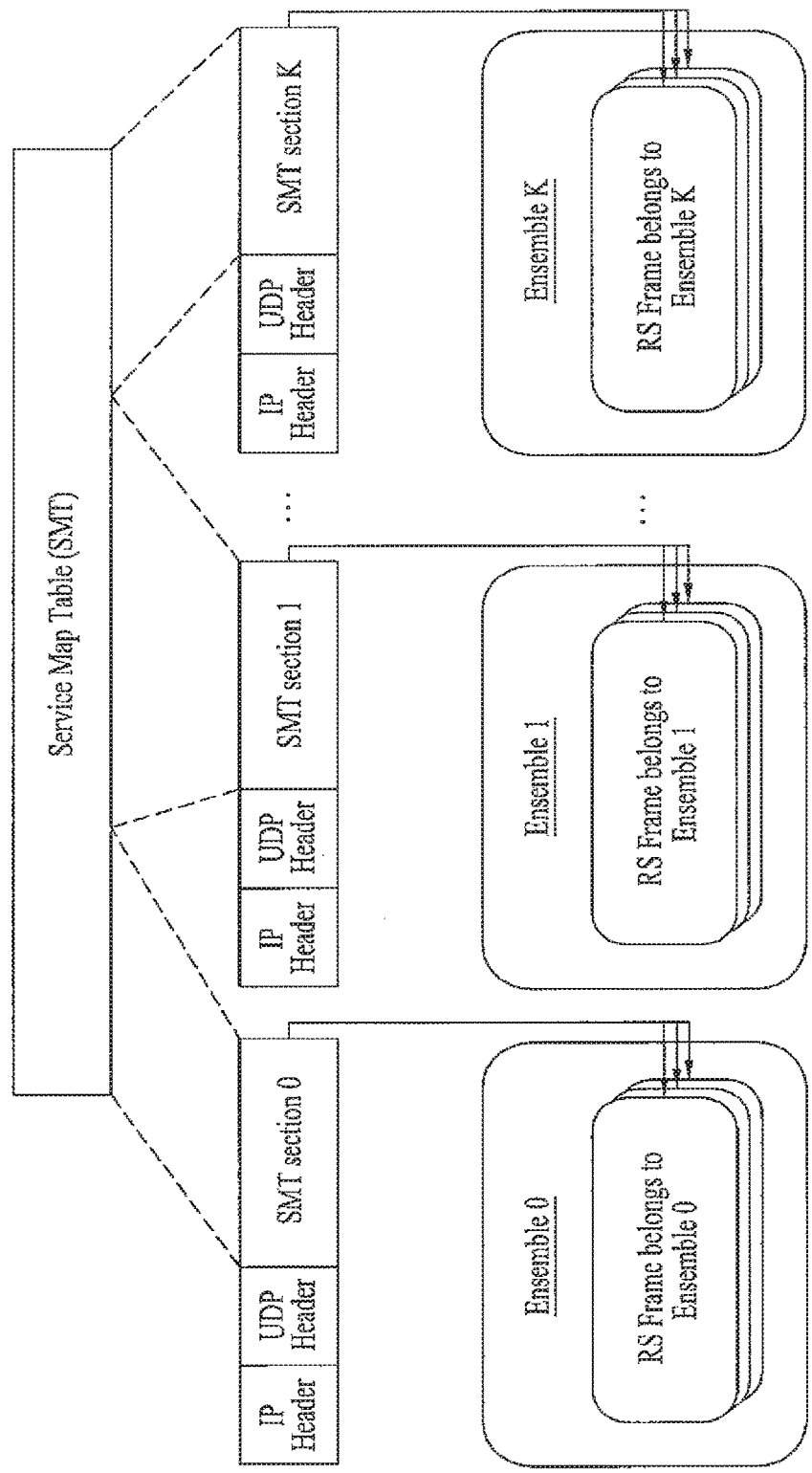
FIG. 23 illustrates segmentation and encapsulation processes of a service map table according to the present invention.

FIG. 23 illustrates segmentation and encapsulation processes of a service map table (SMT) according to the present invention. According to the present invention, the SMT is encapsulated to UDP, while including a target IP address and a target UDP port number within the IP datagram. More specifically, the SMT is first segmented into a predetermined number of sections, then encapsulated to a UDP header, and finally encapsulated to an IP header. In addition, the SMT section provides signaling information on all virtual channel included in the MH ensemble including the corresponding SMT section. At least one SMT section describing the MH ensemble is included in each RS frame included in the corresponding MH ensemble. Finally, each SMT section is identified by an ensemble_id included in each section. According to the embodiment of the present invention, by informing the receiving system of the target IP address and target UDP port number, the corresponding data (i.e., target IP address and target UDP port number) may be parsed without having the receiving system to request for other additional information.

Figure 24:
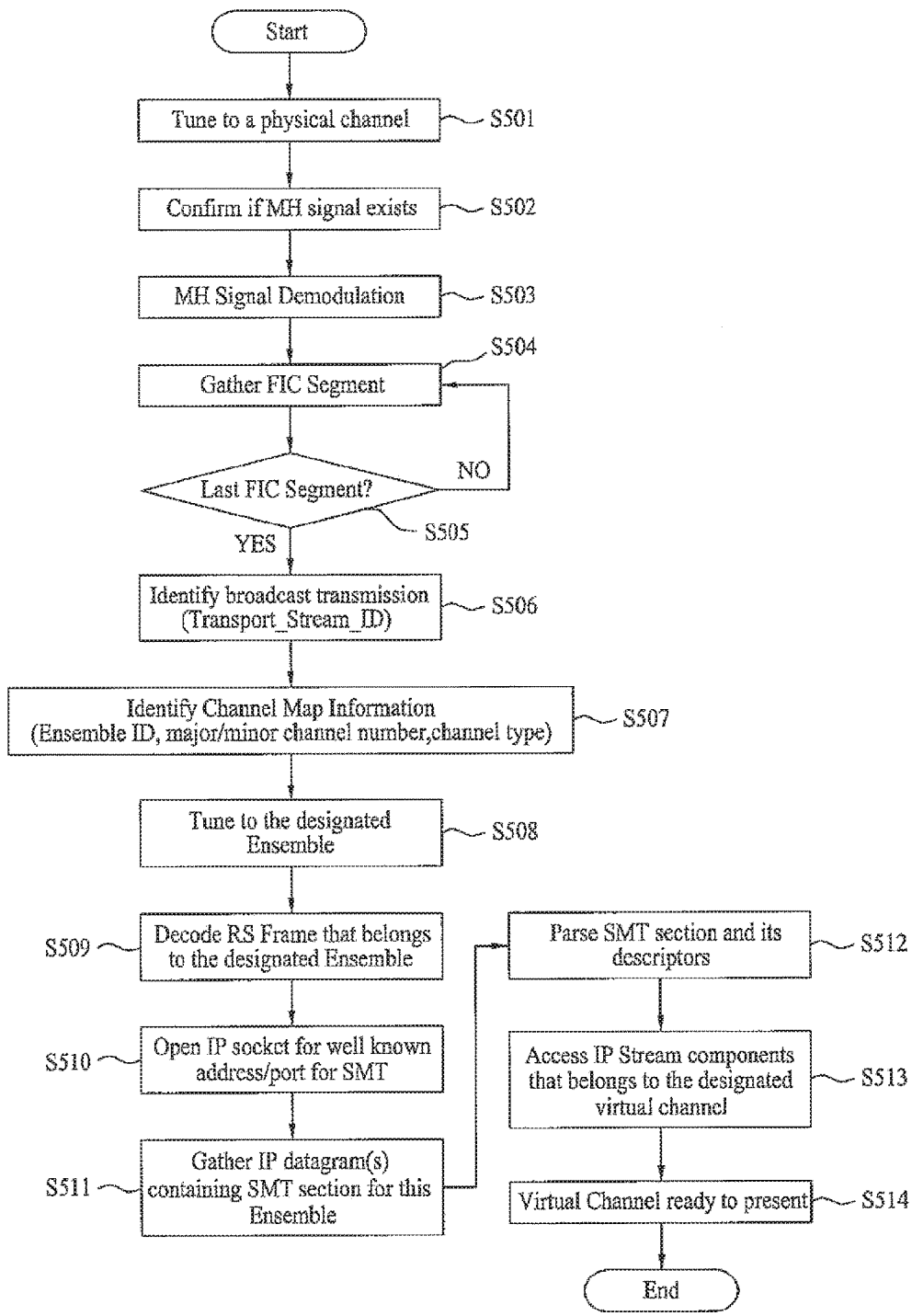
FIG. 24 illustrates a flow chart for accessing a virtual channel using FIC and SMT according to the present invention.

FIG. 24 illustrates a flow chart for accessing a virtual channel using FIC and SMT according to the present invention. More specifically, a physical channel is tuned (S501). And, when it is determined that an MH signal exists in the tuned physical channel (S502), the corresponding MH signal is demodulated (S503). Additionally, FIC segments are grouped from the demodulated MH signal in sub-frame units (S504 and S505). According to the embodiment of the present invention, an FIC segment is inserted in a data group, so as to be transmitted. More specifically, the FIC segment corresponding to each data group described service information on the MH ensemble to which the corresponding data group belongs.

When the FIC segments are grouped in sub-frame units and, then, deinterleaved, all service information on the physical channel through which the corresponding FIC segment is transmitted may be acquired. Therefore, after the tuning process, the receiving system may acquire channel information on the corresponding physical channel during a sub-frame period. Once the FIC segments are grouped, in S504 and S505, a broadcast stream through which the corresponding FIC segment is being transmitted is identified (S506). For example, the broadcast stream may be identified by parsing the transport_stream_id field of the FIC body, which is configured by grouping the FIC segments. Furthermore, an ensemble identifier, a major channel number, a minor channel number, channel type information, and so on, are extracted from the FIC body (S507). And, by using the extracted ensemble information, only the slots corresponding to the designated ensemble are acquired by using the time-slicing method, so as to configure an ensemble (S508).

Subsequently, the RS frame corresponding to the designated ensemble is decoded (S509), and an IP socket is opened for SMT reception (S510). According to the example given in the embodiment of the present invention, the SMT is encapsulated to UDP, while including a target IP address and a target UDP port number within the IP datagram. More specifically, the SMT is first segmented into a predetermined number of sections, then encapsulated to a UDP header, and finally encapsulated to an IP header. According to the embodiment of the present invention, by informing the receiving system of the target IP address and target UDP port number, the receiving system parses the SMT sections and the descriptors of each SMT section without requesting for other additional information (S511).

The SMT section provides signaling information on all virtual channel included in the MH ensemble including the corresponding SMT section. At least one SMT section describing the MH ensemble is included in each RS frame included in the corresponding MH ensemble. Also, each SMT section is identified by an ensemble_id included in each section. Furthermore each SMT provides IP access information on each virtual channel subordinate to the corresponding MH ensemble including each SMT. Finally, the SMT provides IP stream component level information required for the servicing of the corresponding virtual channel. Therefore, by using the information parsed from the SMT, the IP stream component belonging to the virtual channel requested for reception may be accessed (S513). Accordingly, the service associated with the corresponding virtual channel is provided to the user (S514).

Hereinafter, transmission/reception of service data having a format different from the existing MH format in an MH system according to another embodiment of the present invention will be described. At this time, the service having the different format includes a MediaFLO™ service for providing a mobile broadcasting service of a subscription base via a single physical channel. Hereinafter, for convenience of description, for example, the MediaFLO™ service will be described, but the present invention is not limited thereto.

In order to transmit/receive data for the MediaFLO™ service in the MH system, the data for the MediaFLO™ service should be changed to a transmission/reception format of the MH system. In addition, for conditional access, an interface between layers on the existing MH system and layers for the MediaFLO™ service should be performed.

Hereinafter, a protocol stack for transmitting/receiving data for a MediaFLO™ service in an MH system under conditional access will be described.

Figure 25:
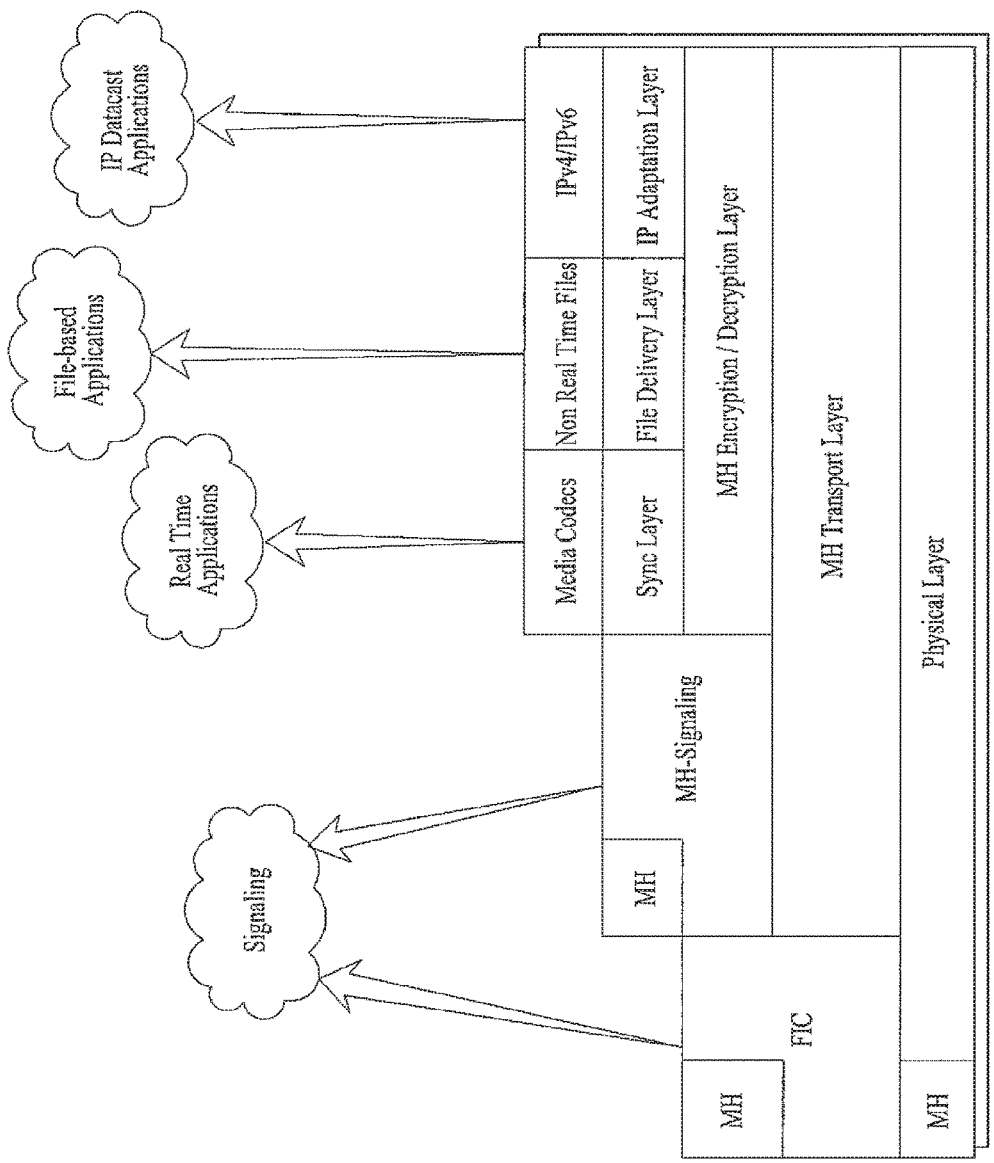
FIG. 25 is a view showing a protocol stack of an MH system according to another embodiment of the present invention.

FIG. 25 is a view showing a protocol stack of an MH system according to an embodiment of the present invention.

Hereinafter, referring to FIG. 25, for transmission/reception of the MediaFLO™ service data in the MH system under the conditional access, a specific layer for an interface between an MH transport layer and a media adaptation layer of the MediaFLO™ will be defined and signaling data associated with the transmission/reception will be defined. At this time, the specific layer is called an MH encryption/decryption layer.

The embodiment of the protocol stack in the MH system shown in FIG. 25 is the structure that data for the MediaFLO™ service is interfaced via a sync layer, a file delivery layer and an IP adaptation layer in association with the MediaFLO™ service and the interfaced data is interfaced in the MH encryption/decryption layer again in association with the conditional access and is transmitted via an MH transport layer and an MH physical layer. The protocol stack deals with signaling, that is, an MH signaling layer, in association with the interface in the MH system of the MediaFLO™ service data.

The protocol stack shown in FIG. 25 includes a media codecs layer, a non-real time files layer and an IPv4/IPv6 layer, all of which are used to transmit the data for the MediaFLO™ service, and includes the sync layer, the file delivery layer and the IP adaptation layer, all of which enable the data for the MediaFLO™ service downloaded from the layers to be interfaced with the MH system.

The media codecs layer is a layer for a real-time applications service, a non-real time files layer is a layer for a file-based applications service, and the IPv4/IPv6 layer is a layer for an IP datacast applications service. At this time, the detailed description of the layers associated with the MediaFLO™ service will refer to, for example, the TIA-1130 (media adaptation layer) and will be omitted herein, for convenience of description. In association with the MediaFLO™ service, the non-real time files layer, the file delivery layer, the IPv4/IPv6 layer and the IP adaptation layer may be defined in the existing MH format and may be transmitted.

In the protocol stack, the FIC layer and the MH-signaling layer are layers for signaling in the MH system. The MH transport layer and the MH physical layer are layers for packetizing the data for the interfaced MediaFLO™ service and transmitting the packetized data.

The detailed description of the interface and the signaling associated with the protocol stack of the MH system will be described later.

Figure 26:
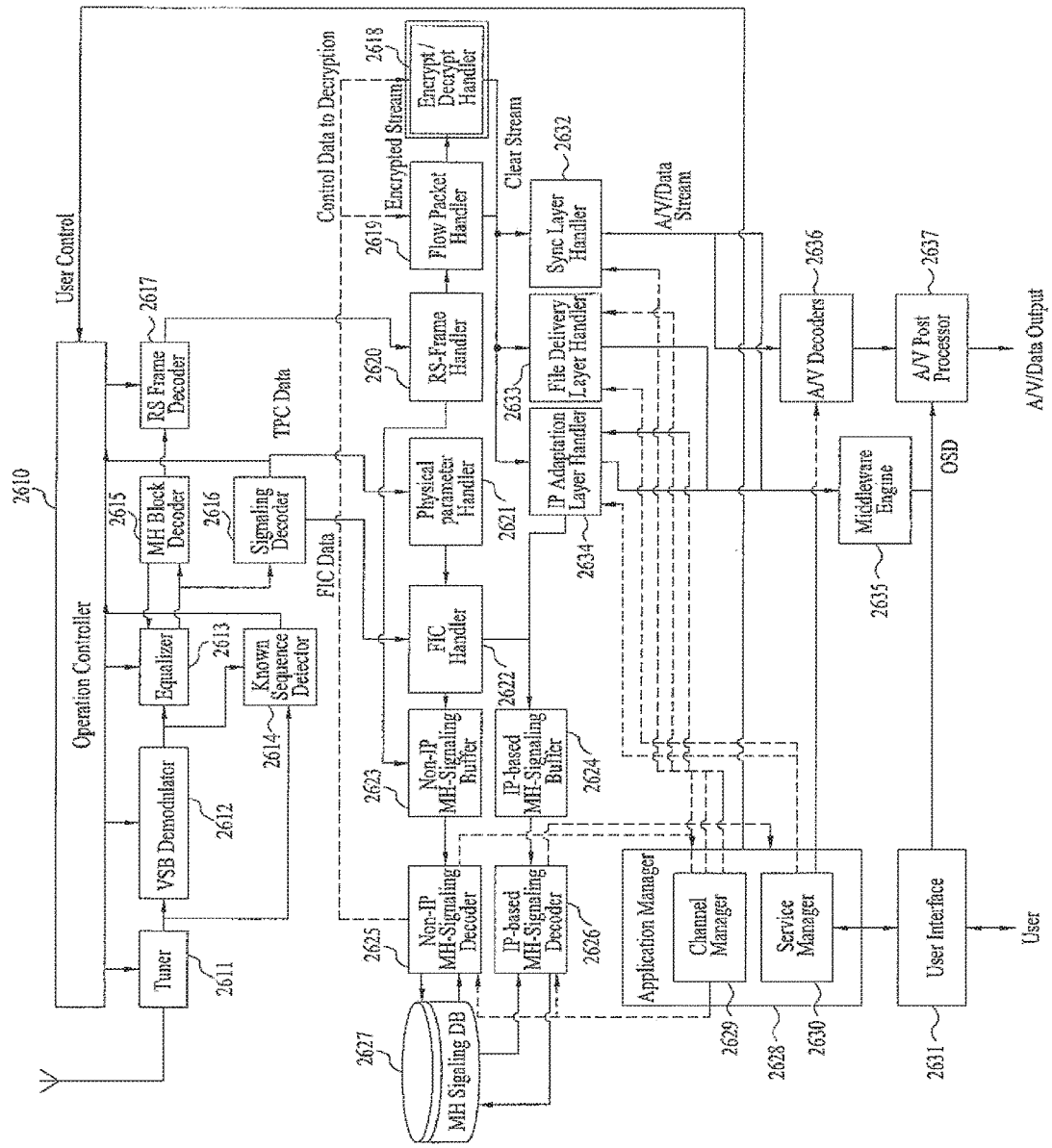
FIG. 26 is a conceptual block diagram of an MH receiver according to another embodiment of the present invention.

FIG. 26 is a conceptual block diagram of an MH receiver according to another embodiment of the present invention.

Referring to FIG. 26, the MH receiver according to another embodiment of the present invention includes an encrypt/decrypt handler 2618, an RS-frame handler 2620, a physical parameter handler 2621, an FIC handler 2622, a non-IP MH-signaling decoder 2625, an IP-based MH-signaling decoder 2626, a sync layer handler 2632, a file delivery layer handler 2633, an IP adaptation layer handler 2634, an MH-signaling database 2627, a channel manager 2629, and a service manager 2630.

Hereinafter, a process of receiving and processing data for a MediaFLO™ service transmitted according to the protocol stack shown in FIG. 25 in the MH system and the configuration thereof will be mainly described. The same portions as the configuration of the MH receiver according to the embodiment of the present invention shown in FIG. 1 will cite the above description. In particular, control data necessary for performing encryption/decryption associated with the function of the encrypt/decrypt handler will be described in association with the conditional access. A dotted line of FIG. 26 denotes the flow of control data and a solid line denotes the flow of actual data. The below-described layers indicate the layers of the protocol stack of FIG. 25.

The RS-frame handler 2620 processes an RS-frame which is output from the MH physical layer. The signaling information associated with the MediaFLO™ service in the processed RS-frame is transmitted to the non-IP MH signaling buffer 2623 and a flow packet associated with the MediaFLO™ service is transmitted to the flow packet handler 2619.

The flow packet handler 2619 receives the flow packet from the RS-frame handler 2620, extracts type information in the header of the received flow packet, and selects a handler associated with the flow packet from the sync layer handler 2632, the file delivery layer handler 2633 and the IP adaptation layer handler 2634 according to the extracted type information. The flow packet handler 2619 transmits the received flow packet so as to be processed by the selected handler.

The encrypt/decrypt handler 2618 receives an encrypted stream from the flow packet handler 2619, receives control data to decryption from the non-IP MH-signaling decoder 2625, decrypts the encrypted stream, transmits the decrypted stream to the layer handlers, that is, the sync layer handler 2632, the file delivery layer handler 2633 and the IP adaptation layer handler 2634.

The physical parameter handler 2621 processes a physical layer parameter required by a management layer or higher layer.

The FIC handler 2622 processes FIC data. At this time, in order to process the FIC data, parameters of the physical layer are necessary. The parameters of the physical layer are obtained from TPC data, which is decoded and transmitted by the signaling decoder 2616, by the physical parameter handler 2621.

The non-IP MH-signaling decoder 2625 receives and processes MH-signaling information transmitted via the FIC handler 2622 and non-IP MH-signaling information transmitted by the RS-frame.

The IP-based MH-signaling decoder 2626 processes the MH-signaling information transmitted via the FIC handler 2622 and IP-based MH-signaling information transmitted by the RS-frame.

The sync layer handler 2632 receives and processes the flow packet in which the conditional access of data, to which the conditional access is applied in the MH encryption/decryption layer, is released by the encrypt/decrypt handler 2618 via the sync layer, among the flow packets configuring the RS-frame.

The file delivery layer handler 2633 receives and processes the flow packet in which the conditional access of data, to which the conditional access is applied in the MH encryption/decryption layer, is released by the encrypt/decrypt handler 2618 via the file delivery layer, among the flow packets configuring the RS-frame.

The IP adaptation layer handler 2634 receives and processes the flow packet in which the conditional access of data, to which the conditional access is applied in the MH encryption/decryption layer, is released by the encrypt/ decrypt handler 2618 via the IP adaptation layer, among the flow packets configuring the RS-frame.

The MH-signaling database 2627 serves to store the signaling data received in the non-IP or IP format.

The channel manager 2629 manages a user input such as channel setting by the MH user interface.

The service manager 2630 manages the user input such as service setting using an EPG display and an MPG by the MH user interface.

The MH receiver of FIG. 26 requires a variety of supplementary information such as authentication of a device and a user, a reception right level of the user, and a control word (key) used for performing encryption/decryption. The supplementary information necessary for performing the conditional access is also called control data. In order to acquire the control data, for example, an entitlement management message (EMM), an entitlement control message (ECM) and other data necessary for the conditional access may be required. The control data may be, for example, transmitted in a state of being included in a service map table or an electronic service guide (ESG), but the present invention is not limited thereto. That is, the control data may be transmitted by other methods. The MH receiver according to another embodiment of the present invention can receive the EMM, the ECM and the other data and obtain information required for the configuration of the control data from the transmitted data.

In FIG. 26, the MH receiver may store the received control data in, for example, the MH-signaling database 2627. Alternatively, the control data may be stored in a separate storage space or may be received, extracted and used in real time according to the characteristics of the control data. For example, if the MediaFLO™ service to which the conditional access is applied is used according to the request of the user, the MH receiver stores the control data associated with the service in the MH-signaling database 2627 or a separate stable storage space and extracts the data or extracts the data in real time, and transmits the data to the encrypt/decrypt handler 2618. The encrypt/decrypt handler 2618 releases the conditional access of the service using the extracted control data so as to enable the MediaFLO™ service data to be processed by the layer handlers 2632 to 2634.

Figure 27:
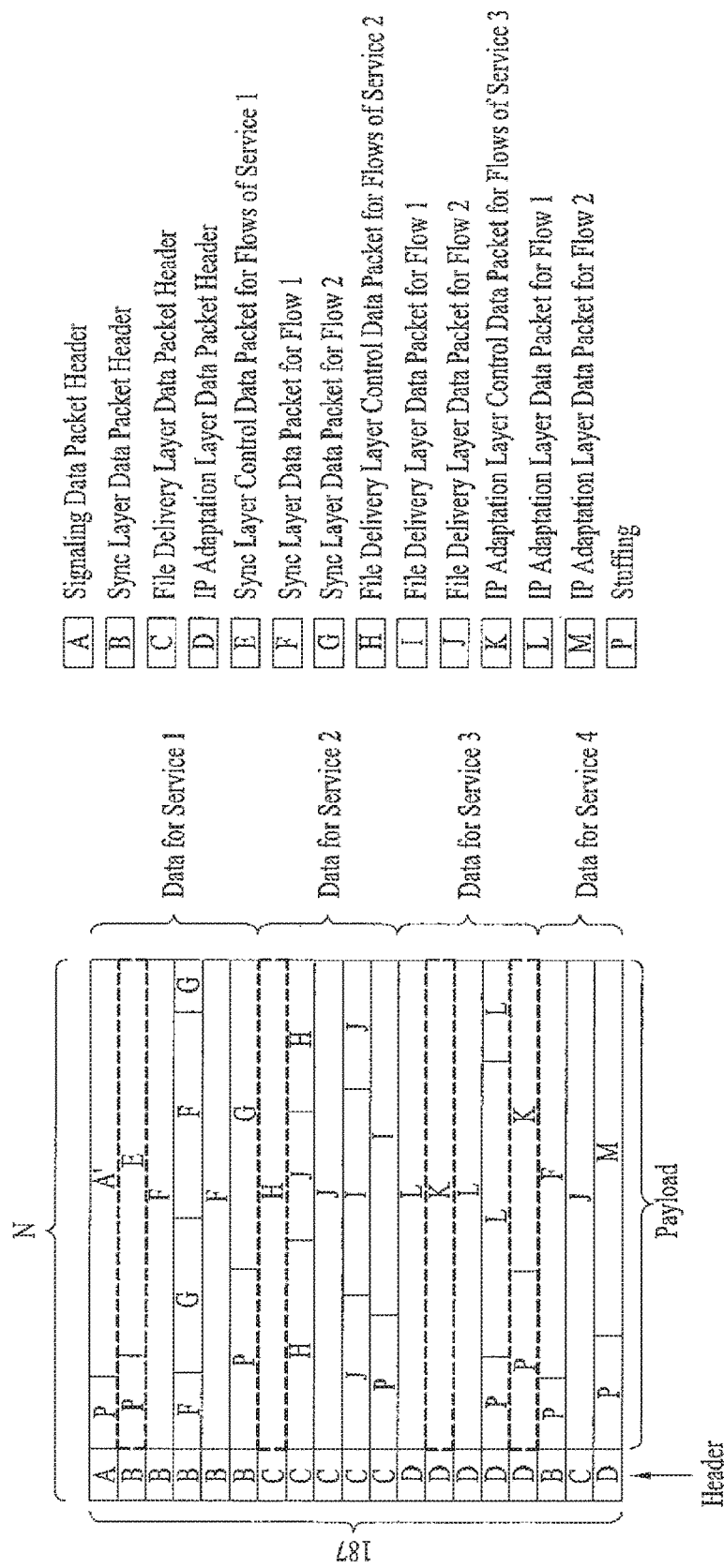
FIG. 27 is a view showing the structure of an RS frame including a multiplexed data packet according to another embodiment of the present invention.

Next, the structure of the RS frame and packet multiplexing according to another embodiment of the present invention will be described. FIG. 27 is a view showing the structure of an RS frame including a multiplexed packet according to another embodiment of the present invention.

FIG. 27 shows, for example, the format of the RS frame for transmitting data corresponding to an MH ensemble per MH frame as the output of an MH physical layer subsystem.

One RS frame may transmit a plurality of MH services. Data configuring one MH service may be continuously transmitted in the RS frame in a state of forming one zone. One MH service may be configured by a plurality of flow packets.

The RS frame is configured in the form of a two-dimensional byte array of 187×N bytes. Accordingly, in the MH transport layer, each row of the RS frame configures the MH transport packet (MH TP).

Figure 28:
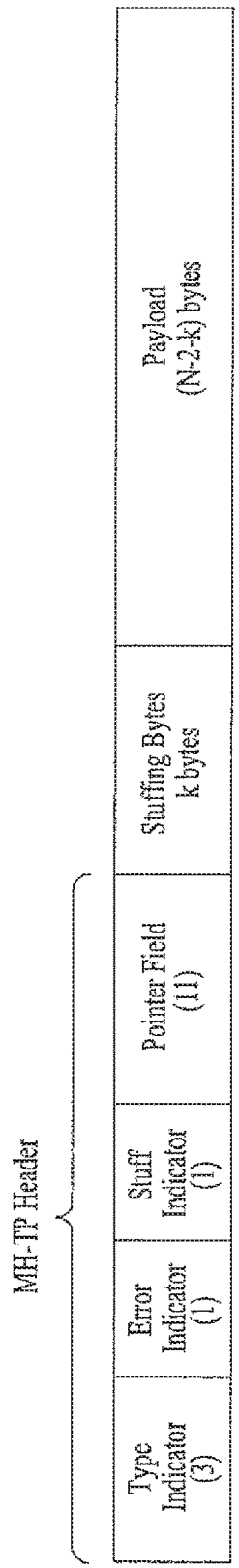
FIG. 28 is a view showing the structure of an MH transport packet (MH TP) according to an embodiment of the present invention.

FIG. 28 is a view showing the structure of an MH TP according to an embodiment of the present invention.

Referring to FIG. 28, one MH TP is configured by an MH transport packet header (MH TP header) (2 bytes) and an MH transport packet payload (MH TP payload) (N−2 bytes).

The MH TP header includes, for example, a type indicator field, an error indicator field, a stuff indicator field and a pointer field. Hereinafter, the fields will be described.

First, the type indicator field (3 bits) indicates the type of the data carried in a payload portion of the MH TP. At this time, the field value and the meaning thereof may be defined as shown in Table 4.

TABLE 4

| Type Indicator | Meaning |
| --- | --- |
| 000 | MH Signaling Data |
| 001 | IP Datagram |
| 010 | Sync Layer Data |
| 011 | File Delivery Layer Data |
| 100 | IP Adaptation Layer Data |
| 101-111 | Reserved |

Referring to Table 4, the type of the data carried in the payload of the MH TP is MH signaling data if the value of the type indicator field is "000", the type of the data carried in the payload of the MH TP is IP datagram if the value of the type indicator field is "001", the type of the data carried in the payload of the MH TP is sync layer data if the value of the type indicator field is "010", the type of the data carried in the payload of the MH TP is file delivery layer data if the value of the type indicator field is "011", and the type of the data carried in the payload of the MH TP is IP adaptation layer data if the value of the type indicator field is "100". The values of the type indicator field of "101" to "111" are reserved for future use.

The type of the service transmitted/received in the MH system may be identified by the value of the type indicator field. For example, if the value of the type indicator field is "010" to "100", the receiver can know that the data for the MediaFLO™ service is transmitted via the MH TP, from the value of the field. If the value of the field is "000" which indicates the MH signaling data, or "001" which indicates the IP datagram, the data is included in the MH TP having the existing MH format and the detailed description thereof will cite the above description.

The error indicator field (1 bit) is an indicator indicating whether or not an error is included in the MH TP. At this time, it is indicated that the error is not found if the value of the error indicator field is "0" and it is indicated that the error is found if the value of the error indicator field is "1", thereby indicating the existence/nonexistence of the error.

The stuff indicator field (1 bit) is an indicator indicating whether or not stuffing bytes are included in the MH TP. At this time, it is indicated that the stuffing bytes do not exist if the value of the stuff indicator field is "0" and it is indicated that a start portion of the packet payload is the stuffing field if the value of the stuff indicator field is "1", thereby indicating the existence/nonexistence of the stuffing field. The stuffing bytes indicate the stuffing bytes (K bytes) which are included in one MH TP, if necessary, and the stuffing field including the K bytes may be the start portion of the packet payload. If the length of the stuffing field is 1 byte, the value of a first byte of the stuffing field may be set to "0xFF". If the length of the stuffing field is 2 bytes, the value of the first byte of the stuffing field is set to "0xFE" and the value of the second byte of the stuffing field is set to "0xFF". If the length of the stuffing field is 2 bytes or more, the value of first two bytes of the field may indicate the number of bytes in the stuffing byte field.

The pointer field (11 bits) indicates the start point of a new packet in the payload of the MH TP. The start point of the new packet may indicate, for example, the start point of the flow packet header.

The values of the fields in the MH TP header are exemplary for convenience of description and the present invention is not limited thereto.

Next, one MH TP includes a stuffing portion (K bytes) and a payload portion (N−2−K bytes) in addition to the MH TP header. At this time, the stuffing portion and the payload portion may be collectively called a payload.

For example, referring to the protocol stack of FIG. 25, if the flow packet to which the conditional access is applied is included in the flow packets of the sync layer, the file delivery layer and the IP adaptation layer associated with the MediaFLO™ service, additional control data for controlling the flow packet to which the conditional access is applied is transmitted together. As the control data, the ECM including the control word (key) necessary for performing the decryption of the encrypted flow packet and the control data necessary for the other conditional access are transmitted.

The structure of the RS frame in which a plurality of packets for the MediaFLO™ service shown in FIG. 27 is multiplexed will be described. In the RS frame, data packets A to P are multiplexed.

In the structure of the RS frame, the type of the data packet included in the RS frame payload portion of each row is described in a left column called the RS frame header. For example, in the RS frame shown in FIG. 27, the RS frame header portion of a first row is represented by A, which indicates that the signaling data packet header is included in the payload portion of the first row. If any one of B to D is represented in the RS frame header of a specific row of the RS frame in the same manner, it is indicated that the data packet indicated by any one of B to D is included in the RS frame payload of the specific row.

FIG. 27 shows an example of multiplexing data for four services 1 to 4. That is, Service 1 is a service including a sync layer packet, Service 2 is a service including a file delivery layer packet, Service 3 is a service including an IP adaptation layer packet, and Service 4 is a service in which the above-described packets are multiplexed. It can be seen that the service packets are transmitted via different flow packets.

Figure 29:
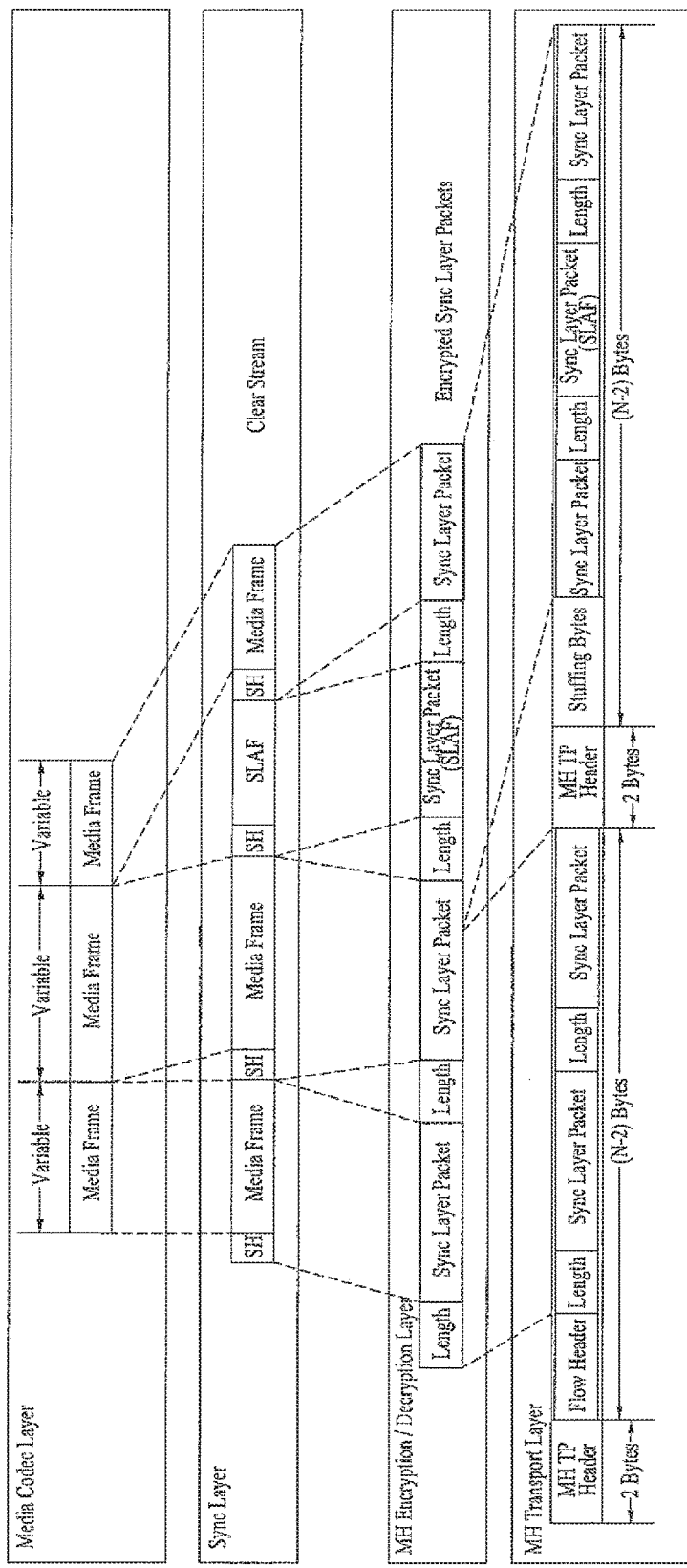
FIG. 29 is a view showing a process of packetizing sync layer packets according to an embodiment of the present invention.
Figure 30:
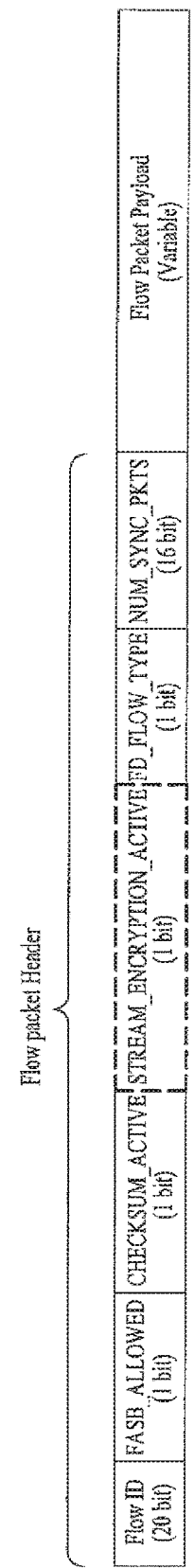
FIG. 30 is a view showing a process of packetizing sync layer packets in an MH transport layer according to an embodiment of the present invention.

Next, a process of encrypting, packetizing and transmitting data associated with a sync layer in association with the MediaFLO™ service will be described. FIG. 29 is a view showing a process of packetizing sync layer packets according to an embodiment of the present invention. FIG. 30 is a view showing the format of a flow packet according to an embodiment of the present invention.

The sync layer functions as an interface between a media codecs layer and an MH transport layer, for transmission of data for real-time applications in an MH system as described above. At this time, the real-time applications include, for example, a video, an audio, and a timed text.

FIG. 29 shows a process of packetizing media frames downloaded from the media codec layer in the sync layer so as to configure sync layer packets and packetizing the configured sync layer packets to MH transport packets (TPs) in an MH transport layer via the encryption/decryption layer, for the conditional access function.

In the sync layer, the media frames having variable lengths are downloaded from the media codec layer. The sync headers are prefixed to the downloaded media frames so as to configure the sync layer packets. At this time, a packet configured by prefixing a header to a sync layer adaptation frame (SLAF) may be inserted between the sync layer packets.

The sync header may include a media type (MT), a media common header (MCH), a media specific header (MSH) and a sync layer adaptation type (SLAT). For example, in FIG. 29, each of the headers prefixed in the process of packetizing the media frames includes the MT, the MCH and the MSH. The header for packetizing the SLAF includes the MT indicating the media type and the SLAT.

In the MH encryption/decryption layer, the sync layer packets downloaded from the sync layer are encrypted. In the MH encryption/decryption layer, the values of the lengths of the sync layer packets encrypted in the encryption process are inserted. Since the decryption cannot be performed when the receiver does not know the lengths of the encrypted sync layer packets encrypted in the MH encryption/decryption layer, the values of the lengths are necessary for decryption. In FIG. 29, zones to which the encryption is applied are considered as sync layer packet zones denoted by a dotted line in the MH encryption/decryption layer.

In the MH transport layer, the encrypted sync layer packets are downloaded from the MH encryption/decryption layer and are packetized to the MH TP which can be transmitted via the MH system.

The packetized MH TP may be configured by prefixing a flow packet header to the encrypted sync layer packets and the flow packet payload including the length values of the sync layer packets so as to a flow packet and prefixing an MH TP header to the configured flow packet.

The MH TP header may have 2 bytes and the flow packet corresponding to the remaining MH transport packet payload may have (N−2) bytes. Referring to FIG. 30, the flow packet is divided into a 5-byte flow packet header and an N−2−5-byte flow packet payload.

Referring to FIG. 29, one MH TP (N bytes) may include one flow packet (N−2 byte) and one flow packet (N−2 bytes) may include the encrypted sync layer packets and the flow packet payload (N−2−5 bytes) including the length value except for the flow packet header (5 bytes).

Referring to FIG. 30, the flow packet header (5 bytes) includes a Flow ID field (20 bits) for identifying the flow packet, a CHECKSUM_ACTIVE field (1 bit) indicating whether or not cyclic redundancy check (CRC) is applied to the flow packet, an NUM_SYNC_PKTS field (1 bit) indicating the number of sync layer packets transmitted via the flow packet payload, an FD_FLOW_TYPE field (1 bit) indicating the type of the flow packet, an FASB_ALLOWED field (1 bit) indicating whether or not the flow packet is transmitted over at least one RS frame, and a STREAM_ENCRYPTION_ACTIVE field (16 bits) indicating whether or not encryption is applied to the flow packet payload. If the flow packet is a real-time application flow packet, the value of the FASB_ALLOWED field may be set to "FALSE".

In the present invention, if the encryption for conditional access is applied to the sync layer packets included in the flow packet payload, among the fields configuring the flow packet header shown in FIG. 30, the STREAM_ENCRYPTION_ACTIVE field may be set to "1". Here, "1" is arbitrarily set by the applicant, for indicating whether or not encryption is applied, and other expressions indicating whether or not encryption is applied may be used.

However, if the encryption for conditional access is not applied to the sync layer packets included in the flow packet payload, the sync layer packets bypass the MH encryption/decryption layer, are packetized to the MH TPs in the MH transport layer and are transmitted to the physical layer. In this case, the sync layer functions as the interface for the MediaFLO™ service. The value of the STREAM_EN-CRYPTION_ACTIVE in the flow packet header is set to a value different from that of the case where the encryption for the conditional access is applied, for example, "0", thereby indicating whether or not the encryption is applied to the sync layer packets. This becomes important information which can determine whether or not the decryption of the data in the MH TPs received by the receiver is performed. The formats of the multiplexed MH TPs may be equal regardless of whether or not the encryption is applied.

Accordingly, the RS frame handler 2620 of the receiver shown in FIG. 26 searches for the MH TP header having the above-described configuration, parses the MH TPs of which the type indicator of the header is "010", sends the packets to the flow packet handler 2619. The flow packet handler 2619 extracts and sends the sync layer packets to the sync layer handler 2632. If the packet to which the encryption is applied is included in the packets delivered to the flow packet handler 2619 via the RS frame handler 2620, the packet is decrypted by the encrypt/decrypt handler 2618 and the decrypted packet is delivered to the sync layer handler 2632.

Figure 31A:
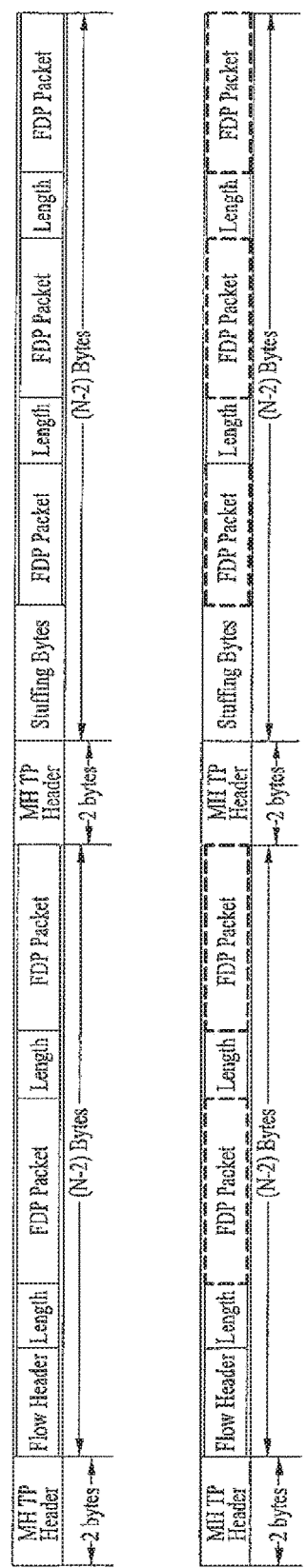
FIGS. 31A and 31B are views showing the configuration of encrypted file delivery protocol (FDP) and file delivery control protocol (FDCP) packets packetized in an MH transport layer according to an embodiment of the present invention.
Figure 31B:
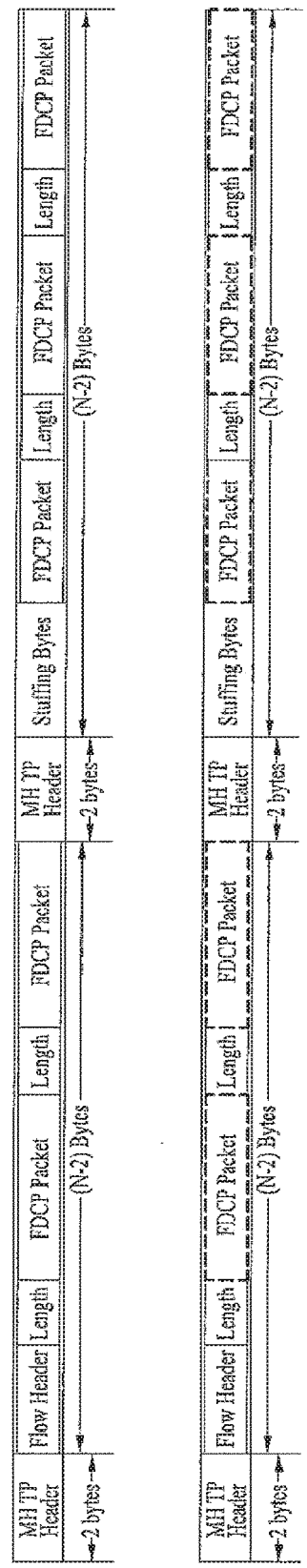
Figure 32:
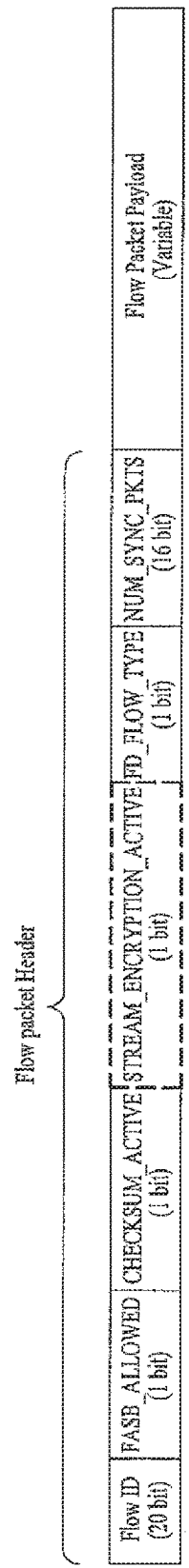
FIG. 32 is a view showing the header of an MH transport packet associated with FIGS. 31A and 31B.

Subsequent to the process of packetizing the sync layer packets, a process of packetizing file delivery layer packets will be described. FIGS. 31A and 31B are views showing the configuration of a file delivery protocol (FDP) packet and a file delivery control protocol (FDCP) packet packetized in an MH transport layer according to an embodiment of the present invention. FIG. 32 is a view showing the header of an MH transport packet associated with FIGS. 31A and 31B.

The file delivery layer functions as an interface between an MH transport layer and a non-real time files layer, for transmission of data for non-real time applications.

The file delivery layer may deliver the FDP packet and the FDCP packet for file delivery control to the MH transport layer as different flow packets. At this time, the FDP and the FDCP packets are packetized to the MH TPs via the MH encryption/decryption layer and the configurations thereof are shown in FIG. 31A (FDP packet) and FIG. 31B (FDCP packet). In FIGS. 31A and 31B, portions denoted by a dotted line denote zones to which the encryption is applied.

Since the process of applying the encryption to the FDP and FDCP packets in the MH encryption/decryption layer and packetizing the FDP and the FDCP packets in the MH transport layer is similar to the process associated with the sync layer packets of FIGS. 29 and 30, the common portions will cite the above description and the detailed description thereof will be omitted. Accordingly, referring to FIG. 32, the STREAM_ENCRYPTION_ACTIVE field of the flow packet header is set to "1" if the encryption is applied and is set to "0" if the MH encryption/decryption layer is bypassed, similar to the sync layer. The flow packet payload having the variable length includes the FDP packet and the length information of the FDP packet or the FDCP packet and the length information of the FDCP packet.

Figure 33:
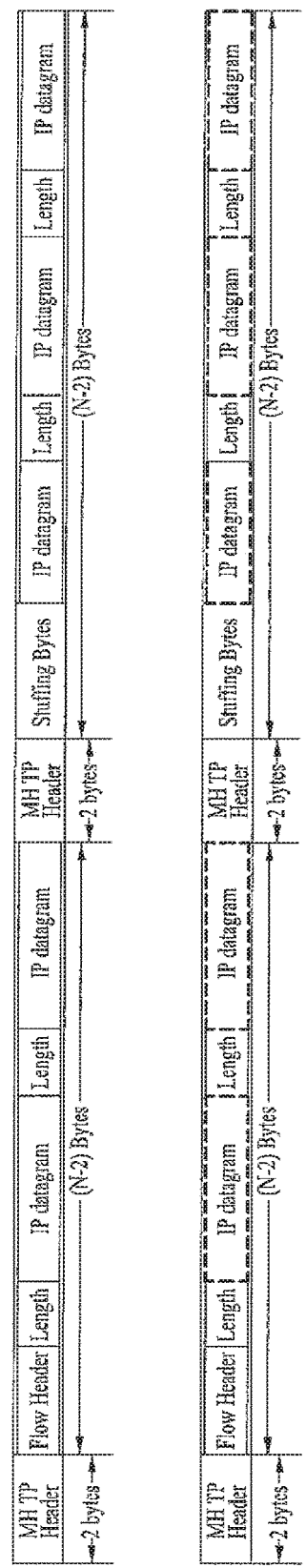
FIG. 33 is a view showing IP datagram packets packetized and encrypted in an MH transport layer according to an embodiment of the present invention.
Figure 34:
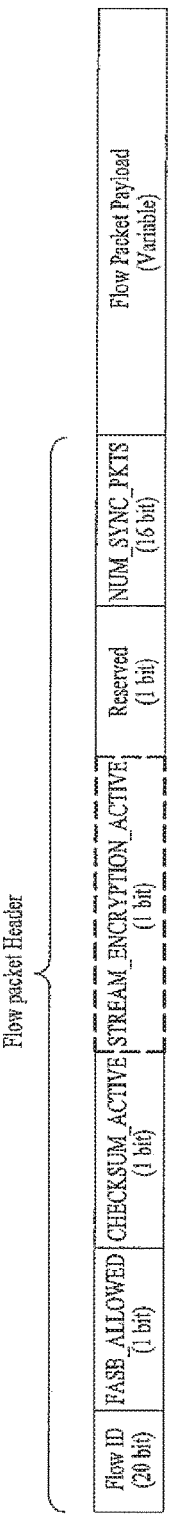
FIG. 34 is a view showing the header of the MH TP associated with FIG. 33.

Finally, subsequent to the process of packetizing the file delivery layer packets, a process of packetizing IP adaptation layer packets will be described. FIG. 33 is a view showing IP datagram packets encrypted and packetized in an MH transport layer according to an embodiment of the present invention. FIG. 34 is a view showing the header of the MH TP associated with FIG. 33.

The IP adaptation layer functions as an interface between the IPv4/IPv6 layer and the MH transport layer, for transmission of data for the IP datacast applications.

The IP adaptation layer may deliver the IP datagrams to the MH transport layer as different packets. The IP datagrams are packetized to the MH TPs via the MH encryption/decryption layer. FIG. 33 shows the configuration of the packetized IP datagrams. In FIG. 33, portions denoted by a dotted line denote zones to which the encryption is applied.

The process of applying the encryption to the IP datagrams in the MH encryption/decryption layer and packetizing the IP datagrams in the MH transport layer is similar to the process associated with the sync layer packets, the common portions will cite the above description and the detailed description thereof will be omitted. Referring to FIG. 34, the STREAM_ENCRYPTION_ACTIVE field of the flow packet header is set to "1" if the encryption is applied and is set to "0" if the MH encryption/decryption layer is bypassed. The flow packet payload includes the IP datagram and the length information of the IP datagram.

Figure 35B:
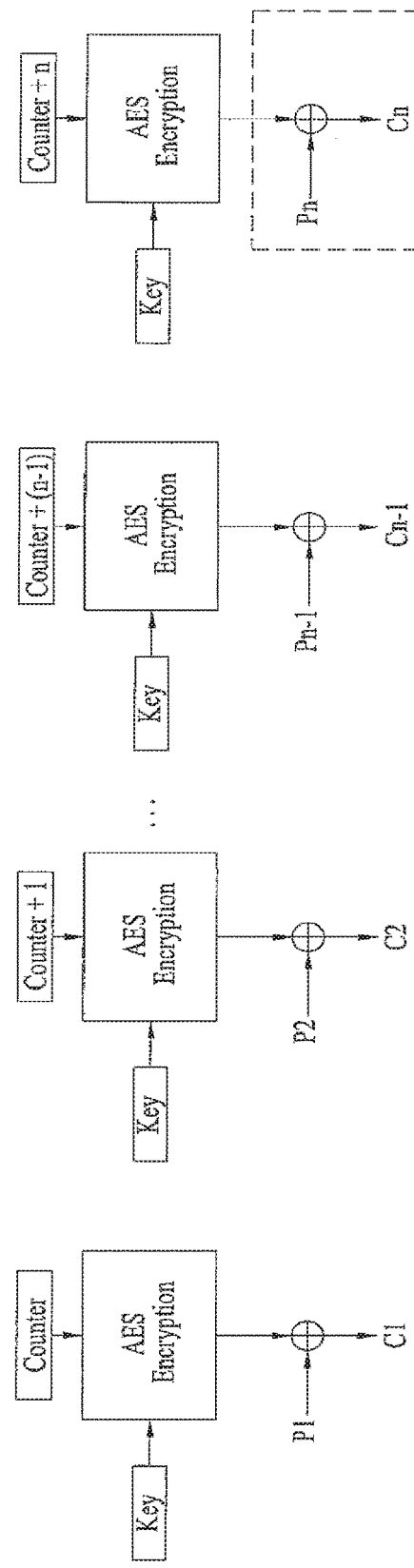
Figure 36A:
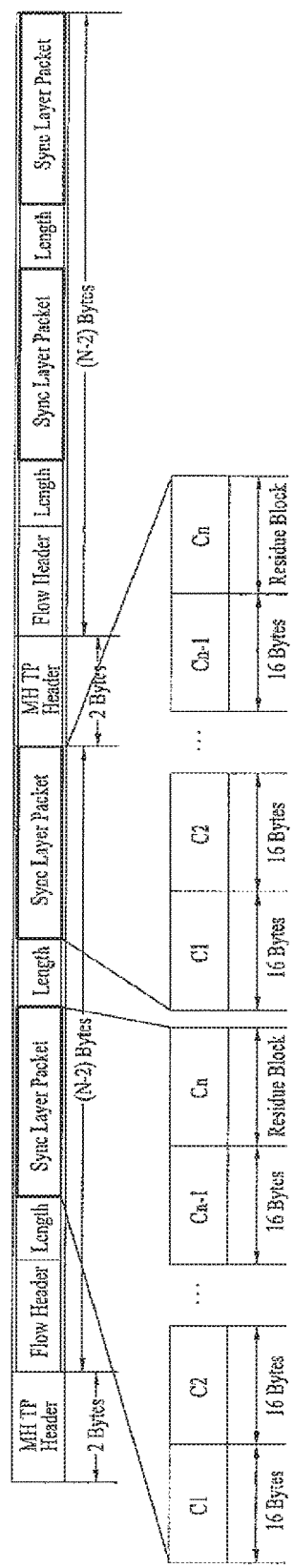
FIGS. 36A to 36B are views showing a decryption algorithm according to an embodiment of the present invention.
Figure 36B:
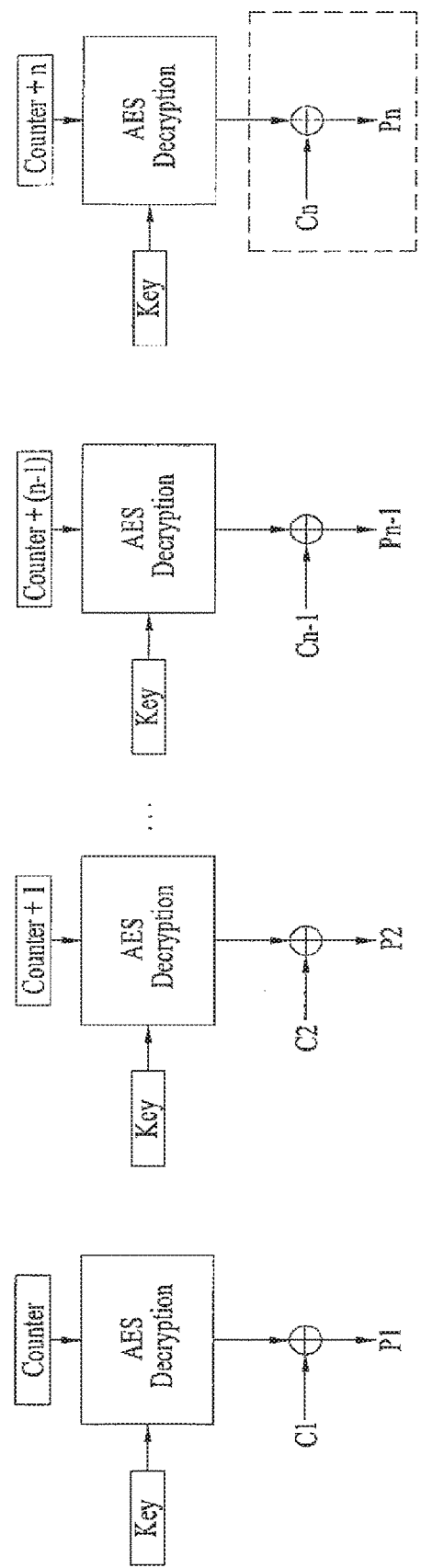

Next, the encryption and decryption algorithm will be described in detail. FIGS. 35A and 35B are views showing an encryption algorithm according to an embodiment of the present invention, and FIGS. 36A to 36B are views showing a decryption algorithm according to an embodiment of the present invention;

In association with the conditional access of the present invention, the encryption/decryption applied to the service channel may be performed according to various algorithms. In the present specification, for convenience of description, an advanced encryption standard (AES) is described and the detailed contents associated with the AES refers to FIPS-197 which will be omitted herein.

In the AES, any one of 128 bits, 192 bits or 256 bits may be used as a key size. Hereinafter, in the description of the encryption and decryption algorithm according to the present invention, for facilitation of implementation, it is assumed that the key size of 128 bits is used and a counter (CTR) mode of the operation modes of the AES is used.

In the CTR mode, the encryption and the decryption are performed as shown in FIGS. 35A and 35B and FIGS. 36A and 36B.

The encryption according to the embodiment of the present invention will now be described with reference to FIGS. 35A and 35B. The stream shown in an uppermost portion of FIG. 35A is, for example, sync layer packets to which the encryption is not applied. In the lengths and the sync layer packets configuring the stream, the encryption is applied to the sync layer packets except for the lengths.

Each of the sync layer packets is divided into P1 to Pn each having 16 bytes and Pn indicates a residue block. P1 to Pn are encrypted using AES encryption modules (of which the number is n) corresponding thereto. That is, the AES encryption modules receive counter values and key values and output values associated with the encryption using the counter values and the key values. The output values are exclusive-OR (XOR) with the packets P1 to Pn so as to perform the encryption C1 to Cn.

Hereinafter, the decryption corresponding to the encryption according to the embodiment of the present invention will be described with reference to FIGS. 36A and 36B. An uppermost portion of FIG. 36A shows MH TPs including the decrypted sync layer packets. C1 to Cn configuring one sync layer packet shown in FIG. 36A indicate packets encrypted in the process of FIG. 35B.

The decryption process of the present invention is performed in a manner inverse to the encryption process of FIG. 35A. That is, AES decryption modules receive counter values and key values and output values associated with the decryption. The output values are exclusive-OR (XOR) with the encrypted packets C1 to Cn so as to obtain the decrypted packets P1 to Pn. The obtained packets P1 to Pn are equal to the initial packets P1 to Pn which are not encrypted as shown in FIG. 35A, respectively.

Figures 37, 38:
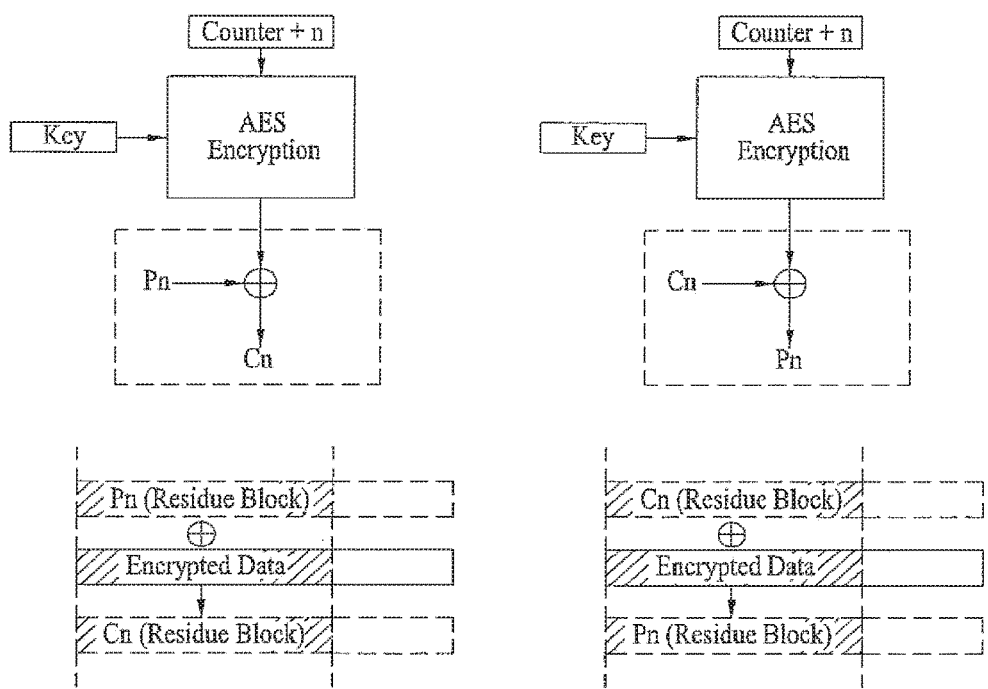
FIG. 37 is a view showing an initial counter value according to an embodiment of the present invention.
FIG. 38 is a view explaining a process of encrypting and decrypting a residue data block according to an embodiment of the present invention.

In order to perform the encryption and decryption processes in the CTR mode, for example, initial counter values shown in FIG. 37 of the AES-CTR mode configured according to the embodiment of the present invention are necessary.

Referring to FIG. 37, for example, the counter value is "0" if the key size is 0 to 72 bits, is "Type Indicator" if the key size is 73 to 75 bits, is "System Time" if the key size is 76 to 107 bits, and is "Flow ID" if the key size is 108 to 127 bits. The type indicator indicates the type of the encrypted stream. The system time defines the system time of a super frame. The flow ID identifies the flow packet ID of the encrypted stream.

FIG. 38 is a view explaining a process of encrypting and decrypting a residue data block according to an embodiment of the present invention.

The encrypted and decrypted packets are divided into 128-bit blocks. If a last data block does not have 128 bits, the AES encryption/decryption module outputs are exclusive-OR (XOR) by the residue data block from an upper bit thereof so as to perform the encryption and the decryption.

Next, in association with signaling information for the process of the data for the MediaFLO™ service, a service map table (SMT-MH) according to another embodiment of the present invention will be described. FIG. 39 is a view showing the syntax of the bitstream of a service map table according to another embodiment of the present invention.

Among the MH TPs transmitted via the RS frame shown in FIG. 27, an MH TP of which a type indicator is set to "000" is located at a foremost side of the RS frame, and a service map table including signaling data describing the data structure of the RS frame is transmitted via the MH TP located at the foremost side of the RS frame.

The service map table delivers information on the flow packets belonging to the MH services transmitted via the RS frame to the receiver. The service map table may be processed by the non-IP MH signaling decoder 2625 of the MH receiver of FIG. 26.

The service map table delivers information on the start and the end of the MH TPs belonging to the MH services transmitted via the RS frame so as to enable the RS frame handler 2620 to extract desired MH service data although the receiver does not have the IDs of the MH services.

The embodiment of the service map table of FIG. 39 is written according to the MPEG-2 short form, but is not mandatory and may be written according to other short forms. The same contents as the service map table of FIG. 17 will cite the above description and the portions associated with the present embodiment will be mainly described.

In the channel to which the conditional access is applied, additional information necessary for the conditional access and a control word (key) for description is necessary. Accordingly, a transmitter for transmitting a service should transmit additional information indicating from where the control word necessary for the decryption of the channel is transmitted and other information necessary for the conditional access.

The information necessary for the conditional access may be, for example, defined in the service map table. The information necessary for the conditional access may be defined by a descriptor of a descriptor( ) or additional_descriptor( ) zone of the service map table. Hereinafter, the descriptor including the information necessary for the conditional access is called MH_CA_descriptor( ).

Referring to FIG. 39, a first_MH_TP_num field indicates a first MH TP among several MH TPs including the flow packets and a last_MH_TP_num field indicates a last MH TP. This distinguish the MH transport packet to which MH_CA_descriptor( ) is applied included in a corresponding section.

Next, the MH_CA_descriptor( ) according to an embodiment of the present invention will be described. The syntax of the bitstream of the MH_CA_descriptor( ) will now be described. FIG. 40 is a view showing the syntax of the bitstream of the MH_CA_descriptor( ) according to an embodiment of the present invention. At this time, the MH_CA_descriptor( ) is written in the MPEG-2 short form, but may be written in other forms.

Hereinafter, the fields of the MH_CA_descriptor will be described.

A descriptor_tag field (8 bits) indicates that the descriptor is the MH_CA_descriptor( ).

A descriptor_length field (8 bits) indicates the length (in bytes) immediately following this field up to the end of this descriptor.

A CA_System_ID field identifies a conditional access system type applied to the ECM and the other information necessary for the conditional access.

An MH_CA_Flow_ID field defines the flow ID for identifying the flow packet via which the information necessary for the ECM and the conditional access are transmitted.

In the case where a plurality of channels is included in the service, the information necessary for the conditional access associated with the channels is defined if the MH_CA_descriptor( ) is included in the descriptor( ) zone of the service map table section, and the information necessary for the conditional access of all the channels for providing the service is defined if the additional_descriptor( ) zone is included in the MH_CA_descriptor( ).

Figure 41:
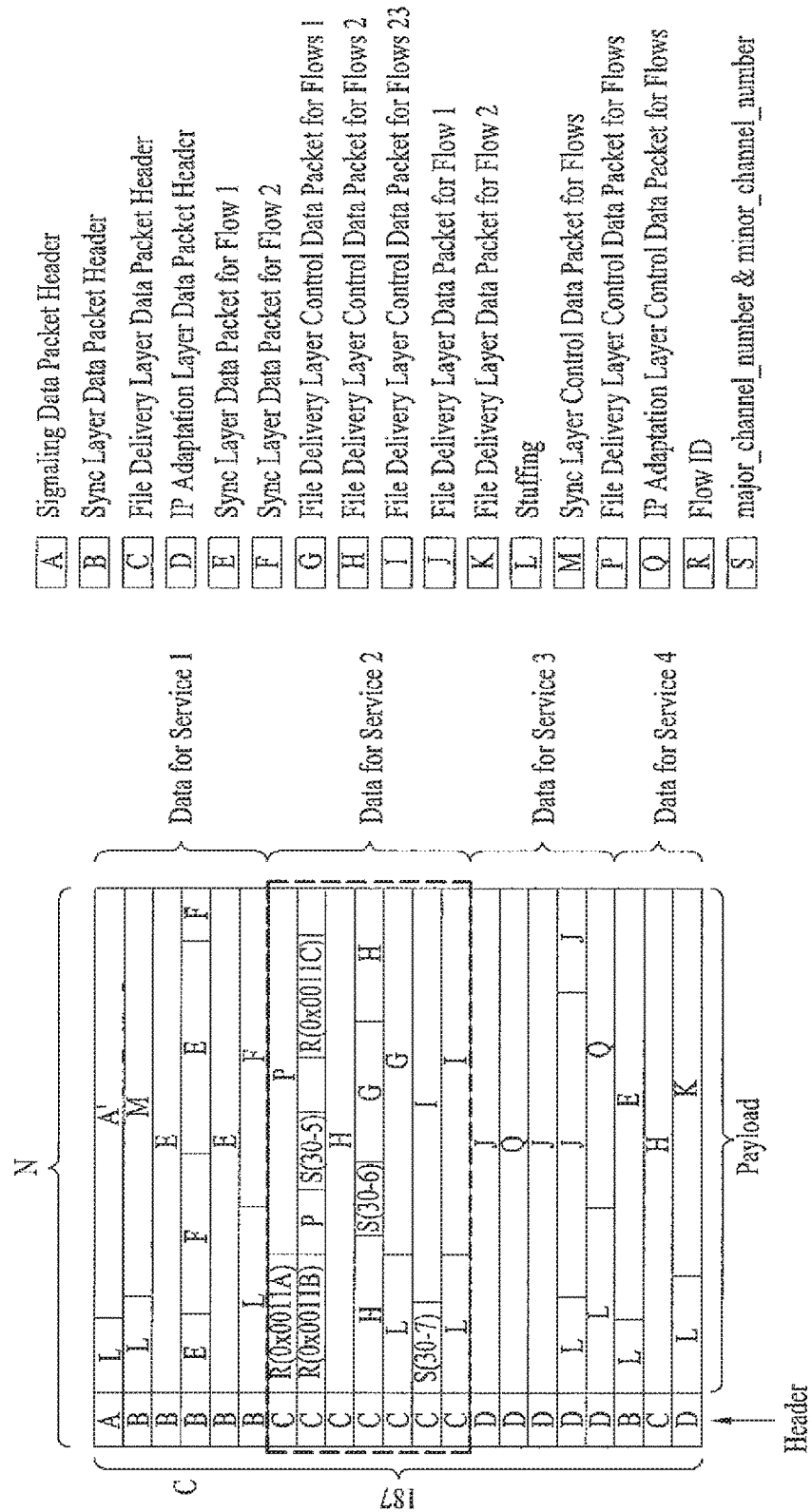
FIG. 41 is a view showing the structure of an RS frame to which conditional access is applied, according to another embodiment of the present invention.

Next, the structure of the RS frame to which the conditional access is applied according to another embodiment of the present invention will be described. FIG. 41 is a view showing the structure of the RS frame to which conditional access is applied, according to another embodiment of the present invention, and FIG. 42 is a view showing another embodiment of a service map table (SMT-MH) configured by the structure of FIG. 41.

The structure of the RS frame to which the conditional access is applied to the packets for Service 2 among the data for Service 1 to Service 4 shown in FIG. 41 will be described.

Figure 42:
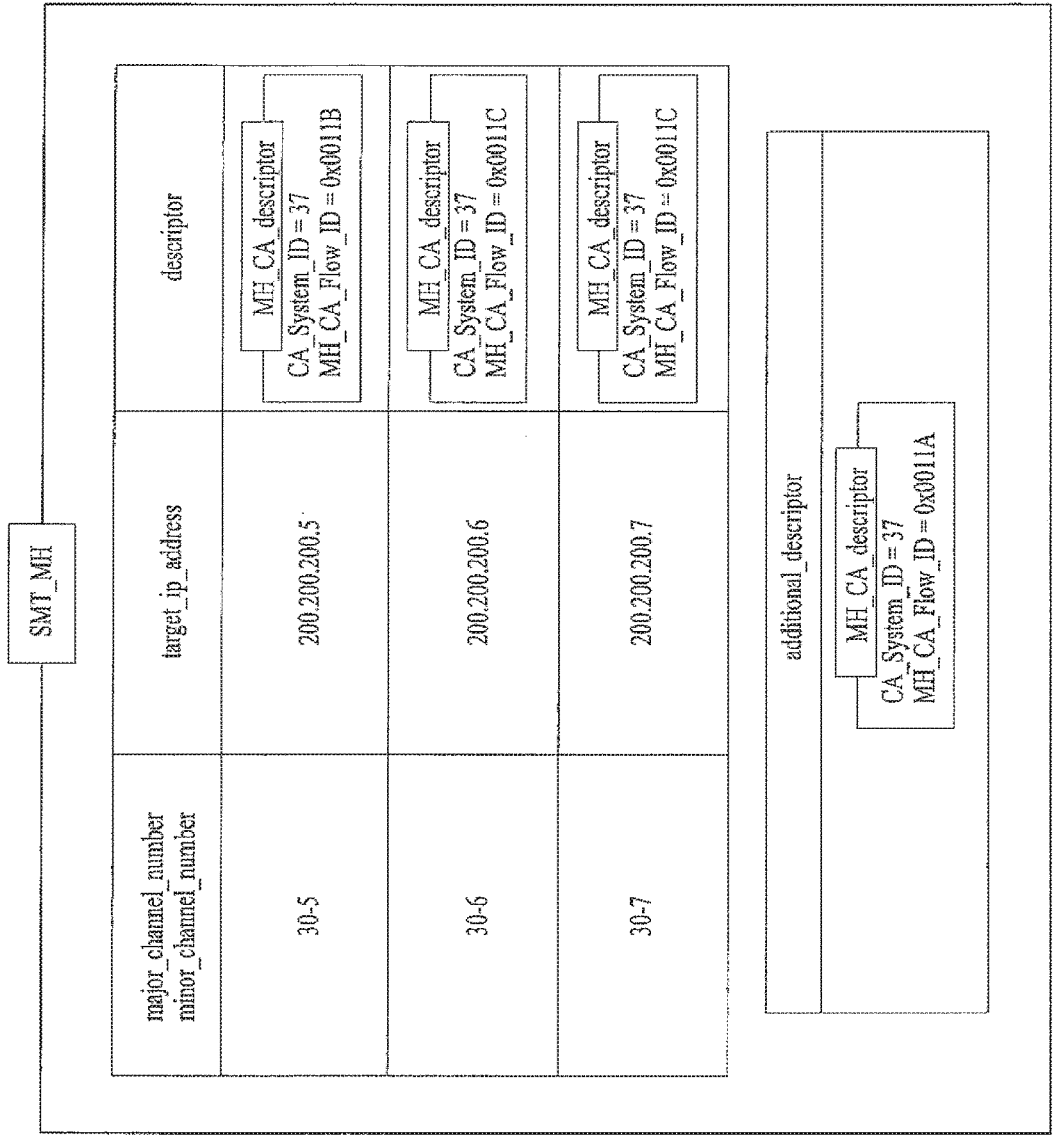
FIG. 42 is a view showing another embodiment of a service map table (SMT-MH) configured by the structure of FIG. 41.

FIG. 42 shows an example of the SMT-MH of Service 2 in the structure of the RS frame of FIG. 41. In FIG. 42, a major channel number, a minor channel number, a target IP address and a descriptor are shown. In the lower portion FIG. 42, it can be seen that the additional_descriptor is transmitted.

For example, if a channel 30-5 is selected by the user, the contents of the MH_CA_descriptor corresponding to the channel 30-5 should be checked in FIG. 42. Accordingly, it can be seen that control data necessary for releasing the conditional access of the channel 30-5 is transmitted by the flow packet having a flow ID value of "0x0011 B" in the service and the target IP address is "200.200.200.5". The values shown in FIG. 42 are only exemplary and the present invention is not limited to the values.

Accordingly, referring to FIGS. 39 to 42, if a specific channel is set by the user using the SMT-MH defined according to the embodiment of the present invention, although the conditional access is applied to the service transmitted via the specific channel, it is determined via which flow packet the control data necessary for releasing the conditional access is transmitted, by checking the contents of the MH_CA_descriptor in the service map table section corresponding to the specific channel. Accordingly, the conditional access of the channel is released and the channel is provided to the user.

Figure 43:
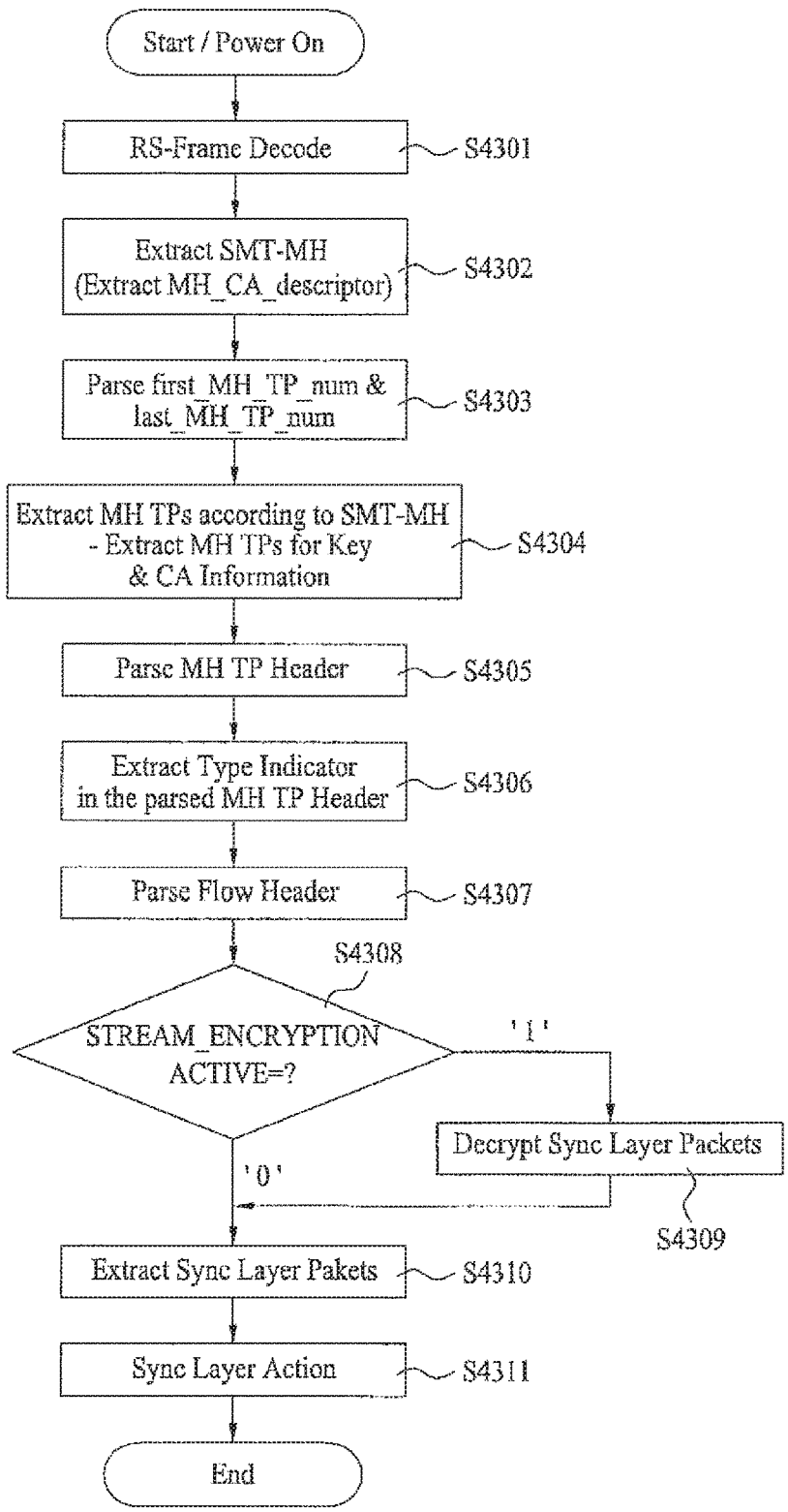
FIGS. 43 to 45 are flowcharts illustrating a process of extracting data according to an embodiment of the present invention.
Figure 44:
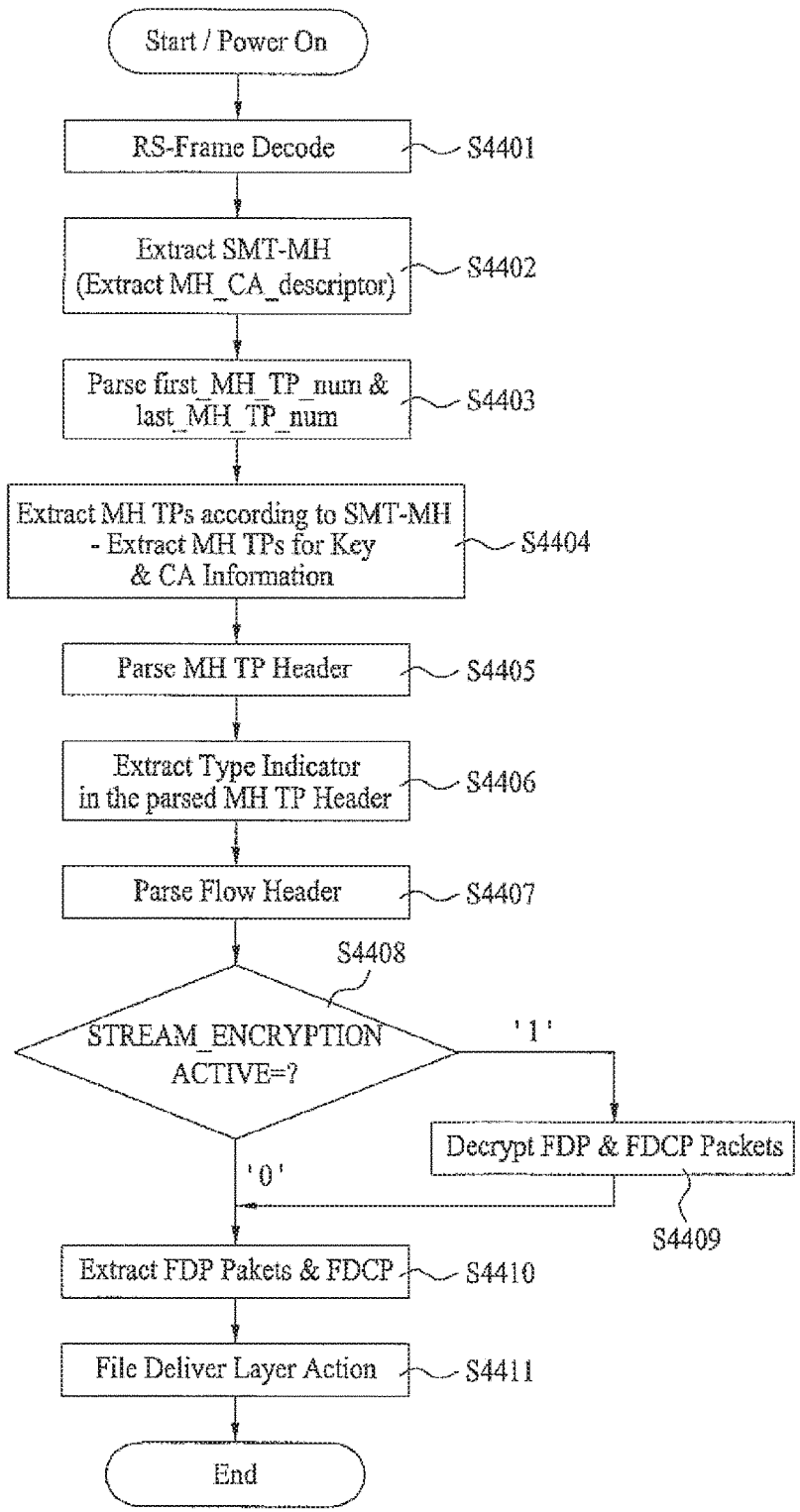
Figure 45:
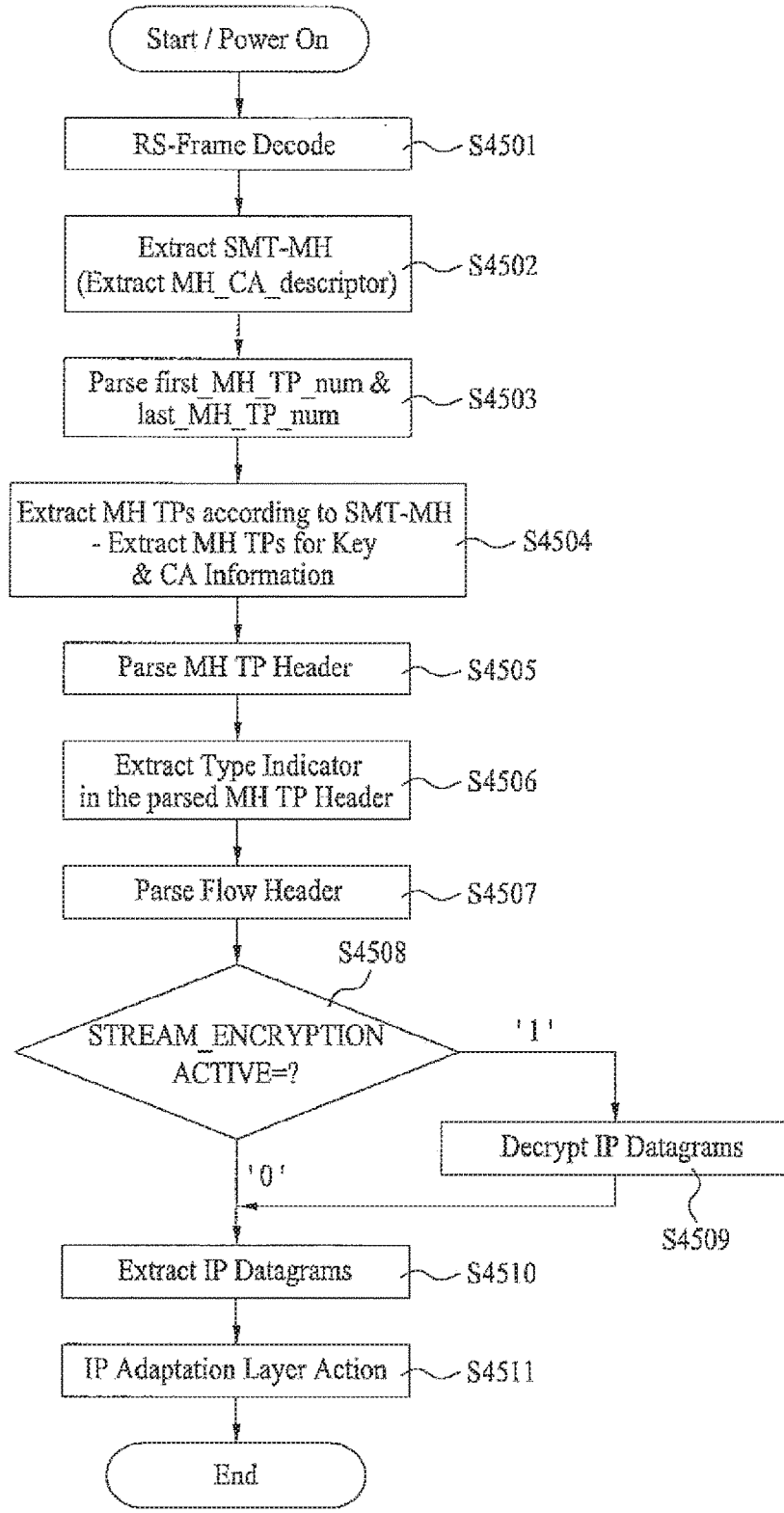

Hereinafter, a process of extracting data transmitted via the MH TP layer in the MH receiver in order to provide a broadcast or service to which the conditional access is applied will be described. FIGS. 43 to 45 are flowcharts illustrating a process of extracting data according to an embodiment of the present invention.

When the power of the MH receiver is turned on, the RS frame in the received broadcast or service is decoded (S4301).

The SMT-MH including the signaling information of the data for the MediaFLO™ service is extracted from the decoded RS frame and the MH_CA_descriptor in the extracted MT-MH is extracted (S4302).

The steps S4301 to S4302 may be, for example, performed by the RS frame handler 2620 of the MH receiver shown in FIG. 26.

If the SMT-MH including the signaling information is extracted in the step S4302, the first_MH_TP_num field and the last_MH_TP_num field are parsed from the extracted SMT-MH section (S4303).

The step S4303 may be, for example, performed by the non-IP MH signaling decoder 2625 of the MH receiver shown in FIG. 26.

The MH TPs are extracted from the RS frame on the basis of the extracted SMT-MH and the parsed first_MH_TP_num field and last_MH_TP_num field. At this time, at least one MH TP including the conditional access information and the key is extracted from the extracted MH TPs in association with the MH TPs including the flow packet to which the conditional access is applied (S4304).

The header of the at least one MH TP including the conditional access information and the key is parsed (S4305).

The steps S4304 to S4305 may be, for example, performed by the RS frame handler 2620 of the MH receiver shown in FIG. 26.

In the step S4304, the header of the MH TP is parsed and the type indicator field is extracted. The flow packet header is parsed on the basis of the value of the extracted type indicator (S4306). For example, the flow packet includes the sync layer packets if the value of the extracted type indicator is "010", includes the FDP packet and the FDCP packet if the value of the extracted type indicator is "011", and includes the IP datagram packets if the value of the extracted type indicator is "100".

Hereinafter, the flow packet of which the type indicator is "010", that is, the flow packet including the sync layer packets, will be described with reference to FIG. 43.

That is, it is determined whether the value of the STREAM_ENCRYPTION_ACTIVE field in the flow packet header including the parsed sync layer packets is "1" or "0" (S4307).

If it is determined that the value of the STREAM_ENCRYPTION_ACTIVE field is "1", the sync layer packets included in the flow packet are the encrypted packets and thus are decrypted by the above-described method (S4308).

The decryption may be, for example, performed by the encryption/decryption handler 2168 of the MH receiver shown in FIG. 26.

After the decryption is performed or if it is determined that the value of the STREAM_ENCRYPTION_ACTIVE field is "0" in the step S4307, the sync layer packets in the flow packet are extracted (S4309).

The steps S4306 to S4309 except for S4308 may be, for example, performed by the flow packet handler 2619 of the MH receiver shown in FIG. 26.

If the encrypted sync layer packets are decrypted and extracted from the flow packet in the step S4309, a sync layer action is performed (S4310).

The sync layer action may be, for example, performed by the sync layer handler 2632 of the MH receiver shown in FIG. 26.

By performing the above-described process, the real time applications can be provided to the user via the MH transport layer.

Next, the flow packet, of which the extracted type indicator is "011" and includes the FDP packet and the FDCP packet, will be described with reference to FIG. 44. The steps S4401 to S4406 of FIG. 44 are equal to the steps S4301 to S4306 and will cite the description of FIG. 43. Hereinafter, the description will be made from the step S4306.

Instead of the sync layer packets, if the FDP packet and the FDCP packet are included in the flow packet according to the value of the extracted type indicator, the headers of the flow packets including the FDP packet and the FDCP packet are extracted and parsed (S4406).

It is determined whether the value of the STREAM_ENCRYPTION_ACTIVE field in the flow packet header including the parsed FDP and the FDCP packets is "1" or "0" (S4407).

If it is determined that the value of the STREAM_ENCRYPTION_ACTIVE field is "1", the FDP and the FDCP packets included in the flow packet are the encrypted packets and thus are decrypted by the above-described method (S4408).

After the decryption is performed in the step S4408 or if it is determined that the value of the STREAM_ENCRYPTION_ACTIVE field is "0" in the step S4407, the FDP and the FDCP packets in the flow packet are extracted (S4409).

If the encrypted FDP and the FDCP packets are decrypted and extracted from the flow packet in the step S4409, a file delivery layer action is performed (S4410).

By performing the above-described process, the file-based applications can be provided to the user via the MH transport layer.

Finally, the flow packet of which the extracted type indicator is "100", that is, the flow packet including the IP datagrams, will be described with reference to FIG. 45. The steps S4501 to S4506 of FIG. 45 are equal to the steps S4301 to S4306 and will cite the description of FIG. 43. Hereinafter, the description will be made from the step S4507.

Instead of the sync layer packets, if the IP datagrams are included in the flow packet according to the value of the extracted type indicator, the headers of the flow packets including the IP datagrams are extracted and parsed (S4507).

It is determined whether the value of the STREAM_ENCRYPTION_ACTIVE field in the flow packet header including the parsed IP datagrams is "1" or "0" (S4508).

If it is determined that the value of the STREAM_ENCRYPTION_ACTIVE field is "1", the IP datagrams included in the flow packet are the encrypted packets and thus are decrypted by the above-described method (S4509).

After the decryption is performed in the step S4509 or if it is determined that the value of the STREAM_ENCRYPTION_ACTIVE field is "0" in the step S4508, the IP datagrams in the flow packet are extracted (S4510).

If the encrypted IP datagrams are decrypted and extracted from the flow packet in the step S4510, an IP adaptation layer action is performed (S4511).

By performing the above-described process, the IP datacast applications can be provided to the user via the MH transport layer.

The blocks configuring the MH receiver for performing the steps of FIG. 45 are equal to the blocks described with reference to FIG. 43.

According to the present invention, the protocol stack for encrypting/decrypting the data having other formats instead of the existing MH format can be defined and thus the conditional access function of the data can be performed. The encrypted service data and control data can be signaled in the physical layer and can be transmitted via the MH transport layer. The control word and the additional control data necessary for the conditional access can be signaled and stored or can be extracted and used from a storage space in real time. The service which does not require the conditional access is bypassed and is transmitted via the MH transport layer without having an influence on the existing system.

As a result, according to the present invention, when the broadcast is serviced via the MH system, the conditional access can be applied. Accordingly, it is possible to allow the broadcast to be viewed by an authorized user using the receiver.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing data in a broadcast transmitter, the method comprising:
   encapsulating one or more first data packets that carry broadcast service data for a broadcast service into a second data packet having a second data packet header and a second data packet payload, the second data packet header including information indicating a number of first data packets included in the second data packet payload of the second data packet;
   encoding data of the second data packet;
   encoding physical layer parameters; and
   transmitting a transmission frame including the encoded data, the encoded physical layer parameters and signaling information that is carried in a payload of IP (Internet Protocol) packets with a well-known address and a well-known port number,
   wherein the signaling information includes information indicating whether the broadcast service is hidden and an address and port number for the broadcast service data.

2. The method of claim 1, wherein the signaling information further includes identification information identifying the broadcast service.

3. The method of claim 1, wherein the signaling information further includes type information identifying a type of the broadcast service.

4. The method of claim 1, wherein the physical layer parameters include information related to the transmission frame.

5. The method of claim 1, wherein:
   the broadcast service data are encrypted; and
   the signaling information further includes encryption information of the broadcast service data.

6. A broadcast transmitter for processing data, the broadcast transmitter comprising:
   a packet generator to encapsulate one or more first data packets that carry broadcast service data for a broadcast service into a second data packet having a second data packet header and a second data packet payload, the second data packet header including information indicating a number of first data packets included in the second data packet payload of the second data packet;
   a first encoder to encode data of the second data packet;
   a second encoder to encode physical layer parameters; and
   a transmitter to transmit a transmission frame including the encoded data, the encoded physical layer parameters and signaling information that is carried in a payload of IP packets with a well-known address and a well-known port number,
   wherein the signaling information includes information indicating whether the broadcast service is hidden and an address and a port number for the broadcast service data.

7. The broadcast transmitter of claim 6, wherein the signaling information further includes identification information identifying the broadcast service.

8. The broadcast transmitter of claim 6, wherein the signaling information further includes type information identifying a type of the broadcast service.

9. The broadcast transmitter of claim 6, wherein the physical layer parameters include information related to the transmission frame.

10. The broadcast transmitter of claim 6, wherein:
    the broadcast service data are encrypted; and
    the signaling information further includes encryption information of the broadcast service data.

* * * * *